United States Patent
Koorapati et al.

(10) Patent No.: US 9,479,567 B1
(45) Date of Patent: Oct. 25, 2016

(54) SYNCHRONIZATION PROTOCOL FOR MULTI-PREMISES HOSTING OF DIGITAL CONTENT ITEMS

(71) Applicant: Dropbox, Inc., San Francisco, CA (US)

(72) Inventors: Nipunn Koorapati, San Francisco, CA (US); Christopher Rude, Seattle, WA (US); Marcio von Muhlen, San Francisco, CA (US); Nils Bunger, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/979,234

(22) Filed: Dec. 22, 2015

Related U.S. Application Data

(63) Continuation of application No. 62/248,085, filed on Oct. 29, 2015.

(51) Int. Cl.
  *G06F 15/16* (2006.01)
  *H04L 29/08* (2006.01)
  *H04L 29/12* (2006.01)

(52) U.S. Cl.
  CPC .......... *H04L 67/06* (2013.01); *H04L 61/1582* (2013.01); *H04L 67/1097* (2013.01)

(58) Field of Classification Search
  CPC ................. G06F 17/30864; G06F 17/30554; G06F 17/30867; G06F 17/30899; H04L 67/10; H04L 67/1095
  USPC ........ 709/203, 217, 204; 707/610, 612, 622, 707/626, 633
  See application file for complete search history.

(56) References Cited

U.S. PATENT DOCUMENTS

| | | | |
|---|---|---|---|
| 5,926,821 A * | 7/1999 | Hirose | G06F 3/0619 |
| 6,108,703 A | 8/2000 | Leighton et al. | |
| 6,470,329 B1 | 10/2002 | Livschitz | |
| 6,560,591 B1 * | 5/2003 | Memmott | G06F 17/30864 707/752 |
| 6,728,723 B1 * | 4/2004 | Kathail | H04L 29/06 |
| 6,915,315 B2 | 7/2005 | Autrey | |
| 7,035,847 B2 | 4/2006 | Brown | |
| 7,308,545 B1 | 12/2007 | Kekre | |
| 7,512,638 B2 | 3/2009 | Jhaveri et al. | |
| 7,685,171 B1 * | 3/2010 | Beaverson | G06F 11/1451 707/999.202 |
| 7,716,180 B2 * | 5/2010 | Vermeulen | G06F 17/30212 707/626 |
| 7,814,499 B2 | 10/2010 | Straube | |

(Continued)

FOREIGN PATENT DOCUMENTS

JP    FR 2924244 A1 *  5/2009  .......... G06F 9/4448

OTHER PUBLICATIONS

Zhu et al., "Let's ChronoSync: Decentralized Dataset State Synchronization in Named Data Networking", IEEE, dated 2013, 10 pages.

(Continued)

*Primary Examiner* — Kostas Katsikis
(74) *Attorney, Agent, or Firm* — Hickman Palermo Becker Bingham LLP; Adam C. Stone

(57) ABSTRACT

A synchronization protocol for multi-premises hosting of digital content items. In one embodiments, for example, a method, comprising: detecting creation or modification of a content item; determining a content item namespace to which the content item belongs; obtaining an identifier of a block server to which the content item namespace is assigned; and uploading any content item blocks of the content item to the block server that are not already stored at the block server.

18 Claims, 34 Drawing Sheets

(56) References Cited

U.S. PATENT DOCUMENTS

| | | | |
|---|---|---|---|
| 7,865,571 B2 | 1/2011 | Ho | |
| 7,953,785 B2 | 5/2011 | Li et al. | |
| 8,019,900 B1 | 9/2011 | Sekar | |
| 8,082,231 B1* | 12/2011 | McDaniel | G06F 11/1453 707/681 |
| 8,112,505 B1 | 2/2012 | Ben-Shaul | |
| 8,140,473 B2 | 3/2012 | Sun | |
| 8,503,984 B2 | 8/2013 | Winbush, III | |
| 8,661,428 B2 | 2/2014 | Clark | |
| 8,805,793 B2* | 8/2014 | Patiejunas | G06F 17/30289 707/687 |
| 8,825,597 B1 | 9/2014 | Houston et al. | |
| 8,874,799 B1* | 10/2014 | Derbeko | G06F 3/061 710/5 |
| 8,880,538 B1* | 11/2014 | Petersson | H03M 7/707 707/756 |
| 8,949,179 B2 | 2/2015 | Besen | |
| 8,949,208 B1* | 2/2015 | Xu | G06F 3/0641 707/661 |
| 8,959,067 B1* | 2/2015 | Patiejunas | G06F 17/30377 707/696 |
| 9,037,556 B2* | 5/2015 | Castellano | G06F 17/30587 707/703 |
| 9,043,567 B1 | 5/2015 | Modukuri | |
| 9,183,303 B1* | 11/2015 | Goel | G06F 17/30864 |
| 9,213,709 B2* | 12/2015 | Patiejunas | G06F 17/30371 |
| 9,253,166 B2 | 2/2016 | Gauda | |
| 9,384,226 B1* | 7/2016 | Goel | G06F 17/30321 |
| 2002/0078174 A1 | 6/2002 | Sim | |
| 2002/0112058 A1* | 8/2002 | Weisman | G06F 9/4411 709/227 |
| 2003/0018878 A1 | 1/2003 | Dorward | |
| 2004/0064488 A1 | 4/2004 | Sinha | |
| 2004/0162900 A1 | 8/2004 | Bucher | |
| 2005/0289237 A1 | 12/2005 | Matsubara | |
| 2007/0136308 A1* | 6/2007 | Tsirigotis | H04L 67/1097 |
| 2007/0250552 A1 | 10/2007 | Lango | |
| 2007/0294366 A1* | 12/2007 | Ozzie | G06F 17/30578 709/217 |
| 2008/0005195 A1 | 1/2008 | Li | |
| 2008/0212616 A1* | 9/2008 | Augustine | H04L 67/02 370/503 |
| 2008/0267221 A1* | 10/2008 | Ozzie | G06F 17/30581 370/503 |
| 2009/0037514 A1* | 2/2009 | Lankford | H04L 45/00 709/201 |
| 2009/0083394 A1 | 3/2009 | Diot | |
| 2009/0138529 A1* | 5/2009 | Bellessort | G06F 9/4448 |
| 2009/0144784 A1 | 6/2009 | Li | |
| 2009/0271502 A1 | 10/2009 | Xue | |
| 2009/0300071 A1 | 12/2009 | Arcese | |
| 2009/0313353 A1 | 12/2009 | Lou | |
| 2010/0011088 A1 | 1/2010 | Gautier | |
| 2010/0146569 A1 | 6/2010 | Janardhan | |
| 2010/0332401 A1* | 12/2010 | Prahlad | G06F 17/3002 705/80 |
| 2011/0225293 A1* | 9/2011 | Rathod | G06F 17/30867 709/224 |
| 2012/0084379 A1 | 4/2012 | Peng et al. | |
| 2012/0203817 A1 | 8/2012 | Hu | |
| 2013/0041872 A1 | 2/2013 | Aizman | |
| 2013/0094445 A1 | 4/2013 | De Foy | |
| 2013/0218837 A1 | 8/2013 | Bhatnagar | |
| 2013/0318229 A1* | 11/2013 | Bakre | G06F 17/30132 709/224 |
| 2014/0025948 A1 | 1/2014 | Bestler | |
| 2014/0053227 A1 | 2/2014 | Ruppin | |
| 2014/0074663 A1* | 3/2014 | Alsina | G06Q 30/0601 705/27.1 |
| 2014/0074783 A1* | 3/2014 | Alsina | G06Q 10/10 707/624 |
| 2014/0143446 A1* | 5/2014 | Jacobson | H04L 67/1095 709/248 |
| 2014/0173027 A1 | 6/2014 | Kappes | |
| 2014/0250073 A1* | 9/2014 | Zalpuri | G06F 17/30174 707/636 |
| 2014/0330874 A1 | 11/2014 | Novak | |
| 2014/0358860 A1 | 12/2014 | Wautier | |
| 2015/0006475 A1 | 1/2015 | Guo | |
| 2015/0019432 A1 | 1/2015 | Burns | |
| 2015/0113222 A1 | 4/2015 | Naik | |
| 2015/0207844 A1* | 7/2015 | Tataroiu | H04L 67/02 709/219 |
| 2015/0227757 A1 | 8/2015 | Bestler | |
| 2015/0254320 A1 | 9/2015 | Cowling | |
| 2015/0288754 A1* | 10/2015 | Mosko | H04L 67/1095 709/248 |
| 2015/0288755 A1* | 10/2015 | Mosko | H04L 67/1095 709/248 |
| 2016/0021172 A1* | 1/2016 | Mahadevan | G06F 17/30598 709/204 |
| 2016/0044126 A1* | 2/2016 | Mahadevan | H04L 67/2842 709/213 |
| 2016/0055248 A1* | 2/2016 | Goel | G06F 17/277 707/770 |
| 2016/0078068 A1 | 3/2016 | Agrawal | |

OTHER PUBLICATIONS

Koorapati, Nipunn, "Streaming File Synchronization", Dropbox Tech Blog, dated Jul. 11, 2014, 14 pages.
Dee, Matt, "Inside LAN Sync", DropBox Tech Blog, dated Oct. 13, 2015, 9 pages.
Camacho et al., "A Cloud Enviroment for Backup and Data Storage", 2014 International Conference on (CONIELECOMP), IEEE, dated 2014, 7 pages.
Tridgell et al., "TR-CS-96-05 The Rsync Algorithm", dated Jun. 1996, 8 pages.
Syncovery: "Blocking Level Copying", Synovery, from the internet www.synovery.com/block-level-copying/>, dated May 22, 2014, 2 pages. Barr, Jeff, AWS Official Blog, "Amazon S3: Multipart Upload", dated Nov. 10, 2010, 3 pages
U.S. Appl. No. 14/979,256, filed Dec. 22, 2015, Notice of Allowance.
U.S. Appl. No. 14/979,226, filed Dec. 22, 2015, Office Action.

* cited by examiner

SYNCHRONIZATION PROTOCOL FOR MULTI-PREMISES HOSTING OF DIGITAL CONTENT ITEMS

PRIORITY CLAIM

This application claims the benefit of Provisional Appln. 62/248,085, filed Oct. 29, 2015, the entire contents of which is hereby incorporated by reference as if fully set forth herein, under 35 U.S.C. §119(e).

TECHNICAL FIELD

The present Application relates to management of digital content items. More specifically, the example embodiment(s) of the present invention described below relate to the management of digital content items hosted with an online content management service.

BACKGROUND

Traditionally, businesses have stored their digital content items (e.g., documents, files, and other digital information) on network file servers they own and operate. Such file servers are typically located on-premises behind a network firewall that prevent unauthorized network access to the file servers. This arrangement works well when most or all of the network access to the file server is by computers that are also behind the network firewall such as, for example, connected to the same Local Area Network (LAN) as the file server. In some cases, network access to the file server from outside the firewall (e.g., over the Internet) is facilitated by a Virtual Private Network (VPN). The VPN, in effect, makes a computer outside the firewall appear to the file server as if it is behind the firewall.

Today, however, the workforce is more global and more mobile. This is spurred, in large part, by the wide availability of broadband Internet connectivity and also the availability of relatively inexpensive, yet powerful, portable personal computing devices such as, for example, mobile phones, laptop computers, and tablet computers. The result is employees can work virtually anywhere and do not need to be physically present in the office to get their work done (e.g., they can work remotely).

Recently, online content management services have become available for storing content items "online" where they are accessible on the Internet or other network. A business can use an online content management service to "host" their content items on servers operated by the service. One example of an online content management service is the "Dropbox" service provided by Dropbox, Inc. of San Francisco, Calif.

Online storage of content items can provide a number of benefits to businesses and their employees alike. Dropbox, for instance, offers the ability to synchronize and share hosted content items among multiple devices and users. This flexibility, which stems from storing content items both at end-user devices and on Dropbox servers, supports a variety of different on-site and remote working arrangements, providing convenience to employees and increased employee productivity for employers.

Given the increasing amount of digital information generated by businesses, hosting of content items by businesses with online content management services can only be expected to increase. However, due to the sensitive nature of some of the hosted information, users of such services, including business users, would appreciate improvements to the services that provide a greater level of control over the content items they host with the services. In addition, while broadband Internet connectivity is pervasive among businesses today, uploading and downloading content items over the Internet can still take longer than users expect or desire.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DESCRIPTION OF THE EXAMPLE EMBODIMENT(S)

Figure 1:
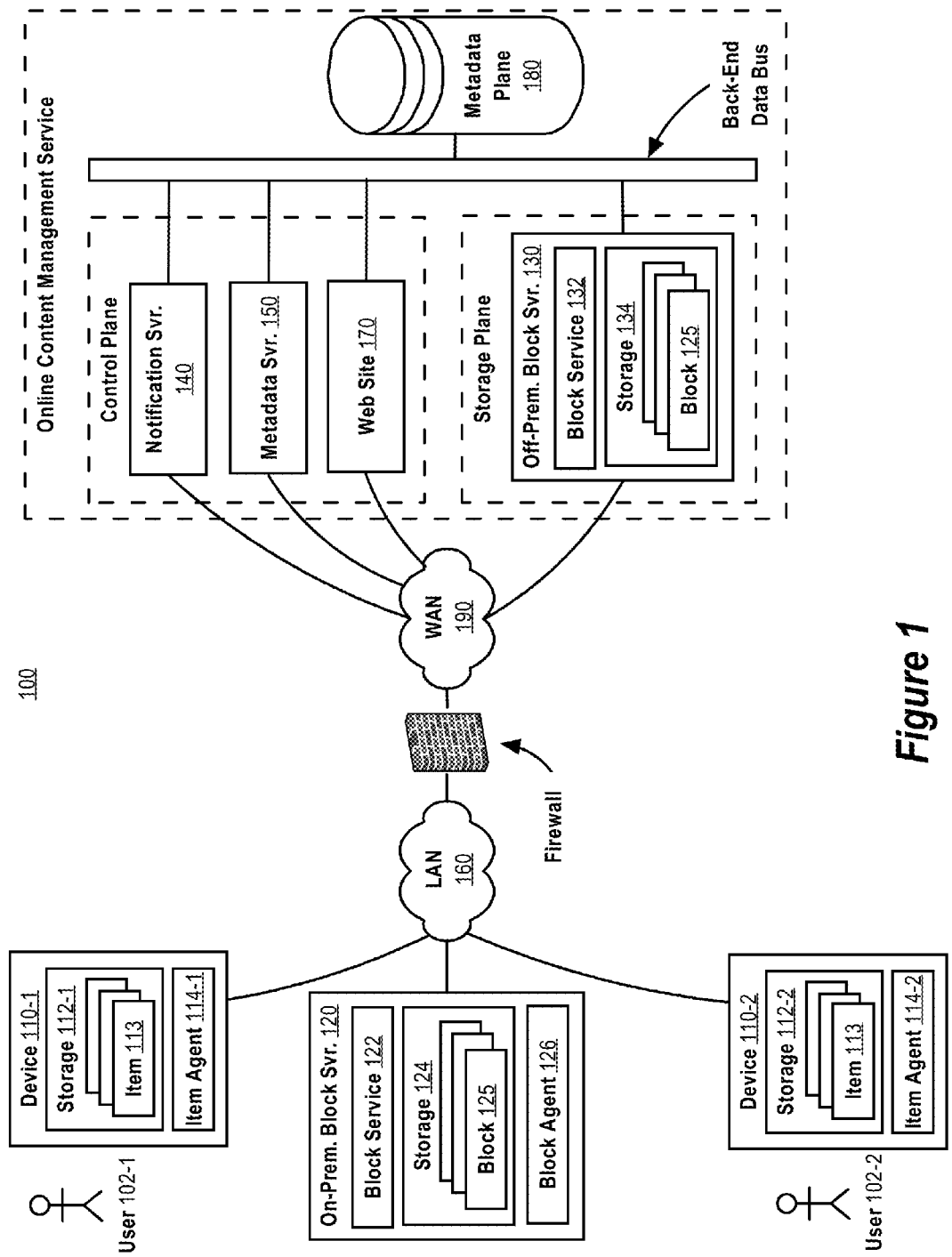
FIG. 1 is a block diagram of an example system environment in which some example embodiments of the present invention are implemented.

In the following description, for the purposes of explanation, numerous specific details are set forth in order to provide a thorough understanding of the example embodiment(s) the present invention. It will be apparent, however, that the example embodiment(s) can be practiced without these specific details. In other instances, well-known structures and devices are shown in block diagram form in order to avoid unnecessarily obscuring the example embodiment(s).

The example embodiments are described according to the following outline:
1.0 ILLUSTRATIVE EXAMPLES
2.0 EXAMPLE SYSTEM ENVIRONMENT
3.0 FIRST EXAMPLE SYNCHRONIZATION PROTOCOL OPERATION
   3.1 UPLOADING A CONTENT ITEM
      3.1.1 USER ACCOUNT AND CONTENT ITEM NAMESPACE METADATA
      3.1.2 CONTENT ITEM NAMESPACE MOUNT INFORMATION
      3.1.3 CONTENT ITEM SERVER JOURNAL
      3.1.4 EXAMPLE UPLOAD INTERACTIONS
   3.2 DOWNLOADING A CONTENT ITEM
      3.2.1 LINKED DEVICE METADATA
      3.2.2 EXAMPLE DOWNLOAD INTERACTION
4.0 SECOND EXAMPLE SYNCHRONIZATION PROTOCOL OPERATION
   4.1 UPLOADING PROCESS
      4.1.1 CONTENT ITEM SERVER JOURNAL
      4.1.2 EXAMPLE UPLOAD INTERACTIONS
   4.2 DOWNLOADING PROCESS
      4.2.1 EXAMPLE DOWNLOAD INTERACTION
5.0 STREAMING DOWNLOAD OPTIMIZATION
   5.1 FIRST EXAMPLE SYNCHRONIZATION PROTOCOL
   5.2 SECOND EXAMPLE SYNCHRONIZATION PROTOCOL
6.0 PEER-TO-PEER OPTIMIZATION
   6.1 DISCOVERY PROCESS
   6.2 PEER DOWNLOAD ADVERTISEMENT
   6.3 PEER DEVICES TABLE
   6.4 PEER-TO-PEER DOWNLOAD PROCESS
7.0 CONTENT ITEM BLOCK REPLICATION
   7.1 REPLICATION METADATA
   7.2 SERVER JOURNAL
   7.3 REPLICATION LOG
   7.4 PROVIDING REPLICATION TASKS
   7.5 PROCESSING REPLICATION TASKS
8.0 DELETING CONTENT ITEM BLOCKS
9.0 CONTENT ITEM BLOCK REPLICATION WHEN ASSIGNMENT OCCURS
10.0 ON-PREMISES CONTENT MANAGEMENT SERVICE
11.0 SELECTIVE CONTENT ITEM SYNCHRONIZATION
12.0 DISTRIBUTED BLOCK CACHING OPTIMIZATION
13.0 BASIC COMPUTING HARDWARE AND SOFTWARE
   13.1 BASIC COMPUTING DEVICE
   13.2 BASIC SOFTWARE SYSTEM
14.0 EXTENSIONS AND ALTERNATIVES 1.0 ILLUSTRATIVE EXAMPLES Example embodiments of the present invention provide users of online content management services with greater control over where their content items are hosted with such services. In the following, a number of computer-implemented processes and network interactions are described. To help in describing those process and network interactions, some illustrative example users will now be introduced. The examples will be used to illustrate features of some example embodiments of the present invention and to aid in describing certain features of some example embodiments of the present invention. The examples are not intended to be limiting and are merely provided for illustration.

A first example user is referred to herein as "Corporation Alpha." As a first example, Corporation Alpha has a number of employees that use an online content management service to synchronize content items stored on their work computers with content items stored on servers on the Internet operated by the service. Corporation Alpha likes that, because the content items are stored at their work computers, the employees have access to the content items when their work computers are not connected to the Internet. At the same time, Corporation Alpha also likes that the content items are synced to online content management service servers for backup and sharing purposes. Corporation Alpha also prefers, when possible, to reduce the time needed to synchronize content item changes between employee work computers.

As a second example, the employees of Corporation Alpha may be distributed geographically. For example Corporation Alpha's headquarters may be in San Francisco but may also have satellite offices in New York, Austin, and Seattle. Teams within Corporation Alpha may also be distributed geographically. For example, employees in the San Francisco and Austin offices may be collaborating on a project together. Corporation Alpha would prefer that changes to content items that the team collaborates on are quickly synchronized between computers at the San Francisco and Austin offices.

As a third example, the project the employees of Corporation Alpha in San Francisco and Austin are collaborating on together may be highly sensitive (e.g., confidential). In this case, Corporation Alpha may prefer to retain more control and oversight over the content items associated with the project. For example, Corporation Alpha may prefer that the project content items be stored on-premises only and not on servers operated by the online content management service.

Using features of the present invention, users such as Corporation Alpha and other users can control where their content items managed by an online content management service are hosted. In particular, example embodiments allow users to host their content items on-premises only, off-premises only, or both on-premises and off-premises. When hosting content items on-premises, users can use their own content item storage hardware (although some example embodiments involve the online content management service providing on-premises content item storage hardware). Example embodiments allow end-user devices to synchronize content item changes made at the end-user devices to on-premises storage, to off-premises storage, or to both on-premises storage and off-premises storage. Example embodiments also allow end-user devices to synchronize content item changes made by other end-user devices from on-premises storage, from off-premises storage, or from both on-premises storage and off-premises storage.

These illustrative examples are used in conjunction with some of the following description to aid in describing features of some example embodiments of the present invention.

2.0 EXAMPLE SYSTEM ENVIRONMENT

Features of some example embodiments of the present invention will now be described by reference to FIG. 1, which is a block diagram of an example system environment 100 in which some example embodiments of the present invention may be implemented. As shown, a user (e.g., 102-1) can have or use a personal computing device (e.g., 110-1). A personal computing device can have a local storage (e.g., 112-1) and a content item synchronization agent (e.g., 114-1). A local storage of a personal computing device can store one or more content items 113. An on-premises block server 120 can be composed of a block service 122, block storage 124, and a block management agent 126. The block storage 124 can store one or more content item blocks 125. An online content management service can be composed of a control plane, a storage plane, and a data plane. The control plane can include a notification server 140, a metadata server 150, and a web site 170. The storage plane can include an off-premises block server 130.

The off-premises block server 130 can be composed of a block service 132 and block storage 134. The block storage 124 of the off-premises block server 130 can store one or more content item blocks 125. A back-end data bus can be composed of a collection of computing devices, networks, and network devices that facilitate network communications and movement of data within and between the control plane and the storage plane, including the servers 130, 140, 150, and 170 thereof. The back-end data bus can also facilitate access to the metadata plane 180 by the control plane and the storage plane, including the servers 130, 140, 150, and 170 thereof. The data plane 180 can be composed of one or more volatile or non-volatile memory-based, possible distributed, database systems for retrieving and storing data (e.g., memcache, a RDBMS, a distributed key-value store, etc.)

In the example of FIG. 1, the system environment 100 includes user 102-1 and user 102-2 having or using personal computing device 110-1 and personal computing device 110-2, respectively. The personal computing device 110-1 has a local storage 112-1 and a content item synchronization agent 114-1. The personal computing device 110-2 also has a local storage 112-2 and a content item synchronization agent 114-2. It should be understood that while FIG. 1 depicts only two users (102-1 and 102-2) and two personal computing devices (110-1 and 110-2) in the system environment 100 for purposes of providing a clear example, the system environment 100 may contain more than two users and more than two personal computing devices, each having a local storage and a content item synchronization agent. For example, system environment 100 may have hundreds or thousands or millions of users or more and hundreds or thousands or millions of personal computing devices or more. Further, there is no requirement of a one-to-one correspondence between users and personal computing devices. For example, a single personal computing device may be used by multiple users and a single user may have or use multiple personal computing devices.

Pursuant to some example embodiments of the present invention, the user 102-1 can use the personal computing device 110-1 to add or modify a content item 113 in the local storage 112-1 of the personal computing device 110-1. The content item synchronization agent 114-1 at the personal computing device 110-1 then automatically detects the addition or modification of the content item 113 to the local storage 112-1 and uploads the content item 113 to on-premises block server 120 or to off-premises block server 130. According to some of the example embodiments, the upload is facilitated by network communications between the content item synchronization agent 114-1 and a metadata server 150 in accordance with a content item synchronization protocol, example embodiments of which are described in greater detail below.

Pursuant to some example embodiments of the present invention, another personal computing device 110-2 automatically downloads the added or modified content item 113 to the local storage 112-2 of the personal computing device 112-2. Initially, a notification server 140 notifies the content item synchronization agent 114-2 at the personal computing device 112-2 that a new version of a content item 113 is available. Then, as directed by network communications between the synchronization agent 114-2 and the metadata server 150 in accordance with the content item synchronization protocol, the content item synchronization agent 114-2 downloads the new version of the content item 113 from on-premises block server 120 or from off-premises block server 130. After downloading, the new version of the content item 113 is available to the user 102-2 in local storage 112-2.

A personal computing device (e.g., 110-1 or 110-2) can be a stationary or portable personal computing device. For example, a personal computing device can be a desktop computer, a workstation computer, a mobile telephone, a laptop computer, a tablet computer, or other stationary or portable personal computing device. A personal computing device may be composed of one or more basic hardware components such as, for example, those of basic computing device 2800 described below with respect to FIG. 28. A personal computing device may also be configured with a basic software system such as, for example, software system 2900 described below with respect to FIG. 29.

A local storage (e.g., 112-1 or 112-2) can be an electronic, magnetic, or optical data storage mechanism that is connected to the bus of a personal computing device 110 by a physical host interface (e.g., Serial Attached SCIS, Serial ATA, PCI Express, Fibre Channel, USB, or the like). For example, the data storage mechanism can be a hard disk, a solid state drive, or an optical drive of a personal computing device. Alternatively, a local storage can be a network drive, such as, for example, a network data storage device on a local area network (LAN) that is "mounted" on a personal computing device. By mounting the network drive, data stored in the network drive appears to a user and applications executing on a personal computing device to be stored at the personal computing device (i.e., on a physical drive of the device), even though the network drive is physically located across the network separate from the device. Once mounted, a personal computing device typically reads and writes data from and to the network drive in accordance with a network file system protocol such as, for example, the network file system (NFS) protocol for UNIX or the server message block (SMB) protocol for WINDOWS.

A local storage of a personal computing device may store content items 113. A "content item" is a collection of digital information. When stored in a local storage, a content item can correspond to a file in a file system. For example, a content item can be a document file (e.g., a word processing document, a presentation document, a spreadsheet document, or other type of document), an image file (e.g., a.jpg, .tiff, .gif, or other type of image file), an audio file (e.g., a.mp3, .aiff, .m4a, .wav, or other type of audio file), a video file (e.g., a.mov, .mp4, .m4v, or other type of video file), a web page file (e.g., a.htm, .html, or other type of web page file), a text or rich-text file (e.g., a.txt, .rtf, or other type of text or rich-text file), or other type of file. When stored in a local storage, a content item can have a file system path within a file-folder hierarchy of the file system. For example, the file system path for a content item stored in a local storage might be expressed as the character string "C:\folder1\folder2\my.file" where "C:\" refers to a root of the file system, "folder1" refers to a file system folder at the root of the file system, "folder2" refers to a file system folder with the "folder1" file system folder, and "my.file" refers to a file in the "folder2" file system folder corresponding to the content item. The "\" character is used in the character string expression to delineate the different file system folder and file references in the character string expression.

Personal computing devices 110-1 and 110-2 and on-premises block server 120 can be connected to a local area network (LAN) 160. For example, LAN 160 can be an IEEE 802-based network including, but not limited to, an IEEE 802.3 or IEEE 802.11-based network, or combination of multiple such networks. The LAN 160 may be protected from a wide area network (WAN) 190 by a network firewall. In an embodiment, the WAN 190 is the Internet or other public network. In particular, the network firewall can prohibit devices connected to WAN 190, including servers 130, 140, 150, and 170, from initiating establishment of a network connection with devices connected to LAN 160, including personal computing devices 110-1 and 110-2 and on-premises block server 120. However, the network firewall can be configured to allow certain types of network connections originating from devices connected to LAN 160, including personal computing devices 110-1 and 110-2 and on-premises block server 120, to be established with devices connected to WAN 190, including servers 130, 140, 150, and 170. Typically, LAN 160 has lower network latency and higher network bandwidth when compared to WAN 190 but there is no requirement that this be the case in a given implementation.

Any and all of on-premises block server 120, off-premises block server 130, notification server 140, metadata server 150, web site 170, and metadata plane 180 may be implemented by one or more server computing devices, each of which may be composed of one or more basic hardware components such as, for example, those of basic computing device 2800 described below with respect to FIG. 28, and each of which may also be configured with a basic software system such as, for example, software system 2900 described below with respect to FIG. 29. If implemented by more than one server computing device, the server computing devices may be configured in a load balanced, clustered, or other distributed computing arrangement.

The functionality described herein of each of the content item synchronization agent, the block service 122, the block agent 126, the block service 132, the notification server 140, the metadata server 150, the web site 170, and the metadata plane 180 may be implemented as one or more computer programs configured with instructions for performing the functionality when executed by one or more computing devices. However, the functionality can be implemented in hardware (e.g., as one or more application specific integrated circuits (ASICS) or one or more field programmable gate arrays (FPGAs)) or a combination of hardware and software according to the requirements of the particular implement at hand.

While the example of FIG. 1 depicts only a single on-premises block server 120 for the purpose of providing a clear example, the system environment 100 may include tens or hundreds or thousands or millions or more on-premises block servers, depending on the number of related groups of users of the online content management service. For example, the online content management service may support millions of users or more that belong to various different organizations, businesses, corporations, schools, universities, and other groups. Each one of those organizations, business, corporations, schools, universities, and groups may have or use one or more on-premises block servers.

The term "on-premises" as used herein is intended to be relative to one or more personal computing devices and the online content management service and, in particular, the off-premises block server 130 of the online content management service. While an on-premises block server (e.g., 120) may be located in the same facility or the same building as a personal computing device, there is no requirement that this be the case. Nor is there a requirement that an on-premises block server be connected to the same local area network (e.g., 160) as a personal computing device, although they may be. Accordingly, reference to an "on-premises" block server herein means that the block server is closer in terms of geography and/or the network to a given personal computing device than the off-premises block server 130 is to the given personal computing device. A personal computing device may be closer to an on-premises block server than the off-premises block server 130 on a network if the network connecting the personal computing device to the on-premises block server generally provides lower network latency and/or higher network bandwidth capability than the network connecting the personal computing device to the off-premises block server 130.

A personal computing device may make a network request, or just "request", of various servers including, for example, on-premises block server 120, off-premises block server 130, metadata server 150, and web site 170. And servers 120,130, 150, and 170 may return a network response, or just "response", to a request from a personal computing device. The request typically includes a header and a payload. The request header typically provides context for the request payload to the server receiving the request. The response to a request typically also includes a header and a payload. The header of a response typically provides context for the response payload to the personal computing device receiving the response. A request from a personal computing device and a response returned thereto by a server may be sent over one or more networks (e.g., 160 and 190) and made in accordance with a request-response networking protocol such as, for example, the HyperText Transfer Protocol (HTTP). A request and a response thereto may be sent over a network connection established by a personal computing device and a server according to a connection-oriented networking protocol such as, for example, the Transmission Control Protocol (TCP). The network connection may be long-lived in the sense that more than one request and response pair is sent over the network connection. The network connection may also be encrypted according to a cryptographic networking protocol such as, for example, Transport Layer Security (TLS) or Secure Sockets Layer (SSL). However, no particular networking protocol or particular set of networking protocols is required by the example embodiments and protocols other than HTTP, TCP, TLS, or SSL may be used according to the requirements of the particular implementation at hand.

3.0 FIRST EXAMPLE SYNCHRONIZATION PROTOCOL OPERATION

A first example operation of the content item synchronization protocol will now be described with respect to FIGS. 2-9. In particular, operation of the synchronization protocol according to the first example is explained with an example of uploading a content item to an on-premises block server (e.g., 120) or the off-premises block server 130 and an example of downloading a content item from an on-premises block server or the off-premises block server.

3.1 Uploading a Content Item

Figure 2:
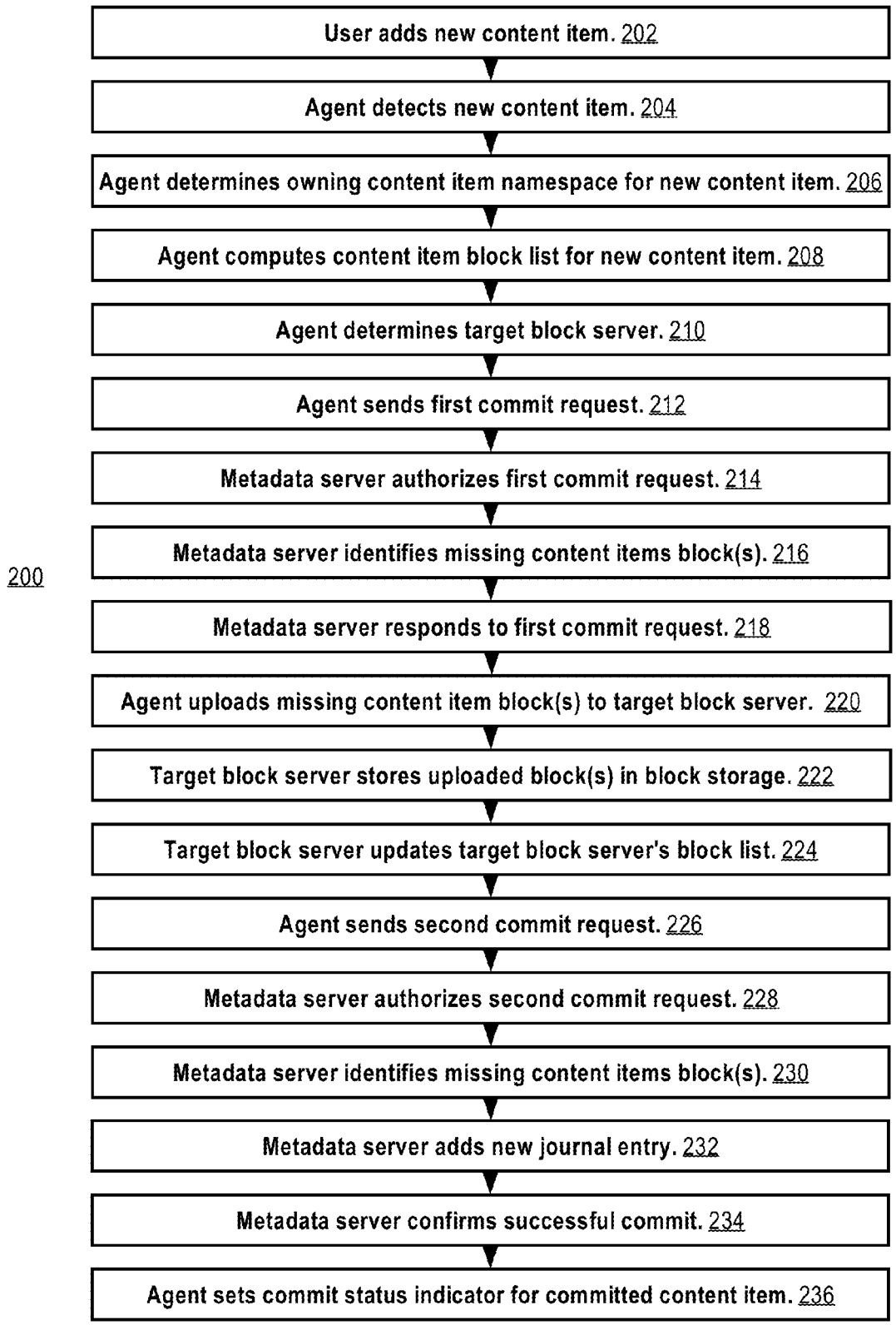
FIG. 2 is a flow diagram of a process for uploading a content item to a target block server, according to some example embodiments of the present invention.
Figure 3:
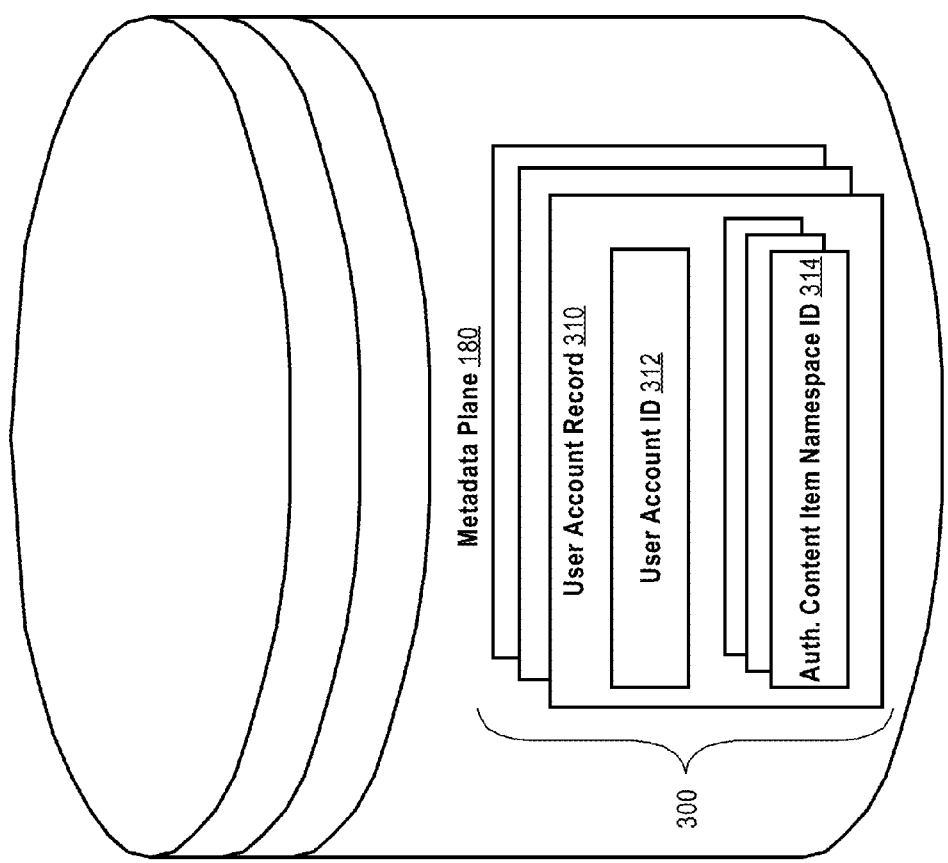
FIG. 3 is a block diagram of user account and content item namespace metadata, according to some example embodiments of the present invention.

Turning now to FIG. 2, it is a flow diagram illustrating a process 200 for uploading a new or modified content item from personal computing device 110-1 to a "target" block server (e.g. on-premises block server 120 or off-premises block server 130), according to some example embodiments of the present invention. While steps are described below and depicted in FIG. 2 in a certain order, no particular order for the steps is required, unless explicitly stated or implied otherwise. Further, there is no requirement that all steps be performed separately in time, and some steps may be performed concurrently with each other or overlap each other in time. Further still, some steps may be omitted entirely and additional steps included according to the requirements of the particular implementation at hand.

At step 202, a user 102-1 adds or modifies a "new" content item in local storage 112-1 of a personal computing device 110-1. For example, the user 102-1 may create or modify a file in the local storage 112-1 or copy, download, or edit a file in the local storage 112-1. The added or modified content item may be considered "new" in the sense that the addition or modification results in a "new" version of the content item. In the case of addition, the new version can be the first or initial version of the content item. In the case of modification, the new version can be based on an existing version of the content item. Hereinafter, references are made to a "new" content item. Such references are intended to encompass any new version of a content item that results from creating the first version of a content item or modifying an existing version of a content item.

At step 204, a content item synchronization agent 114-1 at the personal computing device 110-1 detects the new content item in the local storage 112-1. For example, the content item synchronization agent 114-1 can use an application programing interface (API) offered by an operating system of the personal computing device 110-1 to watch for or be notified of changes to a file system of the local storage 112-1. When a change to the file system is made, such as when a new file is added to the file system or an existing file in the file system is modified or deleted, the operating system may notify the content item synchronization agent 114-1 via the API.

At step 206, the content item synchronization agent 114-1 determines the content item namespace, if any, to which the new content item belongs. As used herein, a "content item namespace" refers generally to a collection of one or more content items under management of the online content management service and to which one or more users have access according to user account and content item namespace metadata maintained by the online content management service. A content item namespace to which a particular content item belongs is sometimes referred to herein as the "owning" content item namespace for the particular content item. Before describing how a content item synchronization agent may determine the content item namespace, if any, to which a content item belongs, some background on the user account and content item namespace metadata stored in the metadata plane 180 will be provided.

3.1.1 User Account and Content Item Namespace Metadata

Turning briefly to FIG. 3 before returning to FIG. 2, FIG. 3 represents user account and content item namespace metadata 300 stored in the metadata plane 180. In particular, metadata plane 180 can store one or more user account records 310 corresponding to one or more user accounts held with the online content management service. In some example embodiments, metadata plane 180 stores hundreds, thousands, or millions of user account records 310 or more. Among other information, a user account record 310 can have a user account identifier 312 and one or more authorized content item namespace identifiers 314.

A user account identifier 312 of a user account record 310 identifies the user account record 310 in the metadata plane 180. In some example embodiments, a user account identifier 312 is a 128-bit value. For extra security, the user account identifier 312 of a user account record 310 may be changed (e.g., rotated) from time to time. Thus, the user account identifier 314 of a user account record 310 may change over the lifetime of the user account record 310.

However, there is no requirement that user account identifiers 312 be changed from time to time and a user account record 310 may have the same user account identifier 312 for the life of the user account.

An authorized content item identifier 314 of a user account record 310 identifies a content item namespace to which a user in possession of the user account identifier 312 of the user account record 310 is authorized to access. Thus, a user that holds a user account with the online content management service can have access to one or more content item namespaces associated with the user account. Further, multiple users may have access to the same content item namespace. Such a content item namespace is sometimes referred to as a "shared" content item namespace or, more colloquially, a "shared folder", because the content item namespace is accessible by more than one user account. However, it is also possible for a content item namespace to be accessible only by a single user account.

A user can acquire possession of a user account identifier 312 by providing valid authentication credentials (e.g., a valid username and password) associated with the user account identifier 312. For example, a user may provide authentication credentials to web site 170 through a web page served to a personal computing device by the web site 170. Validity of the authentication credentials provided by the user may be verified by the online content management service or a third-party authentication service or other identity provider.

Once the authentication credentials are verified, the user account identifier 312 is provided to the personal computing device of the user where it is stored locally, for example, in local storage. When stored locally, the user account identifier 312 may be encrypted for extra security. The content item synchronization agent and other applications (e.g., a web browser application) at the personal computing device may include the locally stored user account identifier 312 in network requests sent to the various servers 120, 130, 140, 150, and 170, thereby identifying a particular user account making the request.

3.1.2 Content Item Namespace Mount Information

Returning again to FIG. 2, at step 206, the content item synchronization agent 114-1 may have local access to information of a user account record 310. For example, after the user 102-1 provides valid authentication credentials associated with a user account identifier 312 of a user account record 310, information of the user account record 310 may be downloaded (e.g., from metadata server 150 or web site 170) to the personal computing device 110-1 and stored in local storage 112-1 where it is locally accessible to the content item synchronization agent 114-1. Such downloaded information may include the user account identifier 312 and the authorized content item namespace identifier(s) 314 of the user account record 310. When stored in local storage 112-1, the downloaded information may be encrypted for added security.

According to some example embodiments, determination by the content item synchronization agent 114-1 of the owning content item namespace of the new content item added or modified at step 202 is based on a file system path to the new content item in a hierarchical file system of the local storage 112-1. In particular, the content item synchronization agent 114-1 may have local access to content item namespace mount information. The content item namespace mount information may identify, for each of one or more authorized content item namespaces "mounted" on the file system, a file system path to a content item namespace "mount point" folder at which the authorized content item namespace is mounted. Thus, an authorized content item namespace may be considered to be "mounted" at a personal computing device if a content item namespace mount point folder exists for the authorized content item namespace in a file system of the personal computing device. It should be noted that there is no requirement that the content item namespace mount point folder for a content item namespace be the same at every personal computing device at which the content item namespace is mounted and the same content item namespace can be mounted at different content item namespace mount point folders at different personal computing devices. For example, content item namespace mount information stored at a personal computing device 110-1 may indicate that:

A content item namespace with identifier 'ABC123' is mounted at 'C:\My Work Content items\';

Another content item namespace with identifier 'DEF456' is mounted at 'C:\My Work Content Items\My Shared Items\'; and Another content item namespace with identifier 'GHI789' is mounted at 'C:\My Content Items\My Personal Content Items\'.

According to some example embodiments, the content item synchronization agent 114-1 determines the owning content item namespace of the new content item by identifying, in the locally stored content item namespace mount information, the file system path of the most nested content item namespace mount point folder to which the new content item belongs. Continuing the example above, if the file system path within the hierarchical file system to the new content item is 'C:\My Content Items\My Personal Content Items\Photos\photo_of_me_hiking.jpg', then content item synchronization agent 114-1 determines that the new content item belongs to content item namespace 'GHI789'. On the other hand, if the file system path to the new content item is 'C:\My Work Content Items\My Shared Items\Presentations\sales_preso.doc', then the content item synchronization 114-1 determines that the new content item belongs to content item namespace 'DEF456' as opposed to content item namespace 'ABC123' because the folder 'C:\My Work Content Items\My Shared Items\' is nested within the folder 'C:\My Work Content items\'.

While in the above-example the content item namespace mount information includes fully-qualified or absolute file system paths, the content item namespace mount information may include relative file system paths in other embodiments. In these other embodiments, a content item synchronization agent at a personal computing device can determine the owning content item namespace of a new content item based on a relative file system path to the new content item and a file system path to a parent mount point folder that is common to all content item namespace mount point folders at the personal computing device. For example, content item namespace mount information at personal computing device 110-1 may indicate that:

A content item namespace with identifier 'ABC123' is mounted at '\My Work Content items\';

Another content item namespace with identifier 'DEF456' is mounted at '\My Work Content Items\My Shared Items\'; and Another content item namespace with identifier 'GHI789' is mounted at '\My Personal Content Items\'.

In the above example, the parent mount point folder may be, for example, 'C:\My Content Items\'. In this case, if the fully qualified or absolute file system path to the new content item is 'C:\My Content Items\My Work Content Items\My Shared Items\Presentations\sales_preso.doc', then the content item synchronization agent 114-1 can determine that the new content item belongs to content item namespace 'DEF456' based on the relative file system path to the new content item of '\My Work Content Items\My Shared Items\Presentations\sales_preso.doc'.

At step 208, the content item synchronization agent 114-1 computes a content item block list for the new content item. In particular, the new content item is segmented into one or more content item blocks and cryptographic hashes of any new content item blocks are computed.

In the case of an added content item, it is more probable than in the case of a modified content item that all content item block(s) of the new content item will be new since the added content item can be the first version of the content item. In the case of a modified content item, all or less than all of the content item block(s) of the content item can be new. In either case, whether added or modified, each content item block may have a maximum predetermined size (e.g., 4 MB). However, the last (or first) content item block or the only content item block of the new content item can be a size that is less than the maximum predefined size if the total size of the new content item is not an even multiple of the maximum predetermined size.

The cryptographic hash function can be, for example, the Secure Hash Algorithm (SHA) that generates an almost-unique, fixed sized hash (e.g., a 256-bit hash) when applied to a content item block. Other hash functions may be used and the example embodiments are not limited to the SHA-256 hash function. In general, however, the hash function should be of sufficient bit-depth (e.g., 256 bits or more) such that collisions are rare given the number of unique content item blocks under management. Thus, the new content item can be represented as a list of one or more content item block hashes computed from the content item block(s) that make up the new content item. This type of list is also referred to herein generally as a "content item block list", or when referring to the content item block list for a particular content item, the "particular content item's block list". For a modified content item, a content item synchronization agent may use a rolling checksum approach to efficiently determine which content item block(s) of a modified content item are modified or new relative to a previous version of the content item. In this case, content item block hashes are computed only for new or modified content item blocks and the content item block hashes previously computed for unchanged blocks are reused in the modified content item's block list.

At step 210, the content item synchronization agent 114-1 determines the "target" content item block server to which to upload the content item block(s) of the new content item. According to some example embodiments, this determination is made based on the owning content item namespace of the new content item. To make this determination, the content item synchronization agent 114-1 may have access to namespace to block server assignments for the authorized content item namespaces mounted at the personal computing device 110-1. The namespace to block server assignments may be stored locally at a personal computing device. For example, the namespace to block server assignments may be stored in local storage 112-1. The namespace to block server assignments can specify, for all or some of the authorized content item namespaces mounted at a personal computing device, a block server to which the content item namespace is assigned. For example, the namespace to block server assignments at personal computing device 110-1 may indicate the following information in a suitable data format:

The authorized content item namespace having content item namespace identifier 'ABC123' is assigned to the block server with block server identifier 'JKL101';

The authorized content item namespace having content item namespace identifier 'DEF456' is assigned to the block server with block server identifier 'JKL101'; and The authorized content item namespace having content item namespace identifier 'GHI789' is assigned to the block server with block server identifier 'MNO112'.

For example, on-premises block server 120 may be the block server with block server identifier 'JKL101' and off-premises block server 130 may be the block server with block server identifier 'MNO112'. A block server identifier identifies a block server. A block server identifier may also be or be associated (e.g., via a mapping, configuration file, associative array, etc.) with a hostname (e.g., a resolvable DNS hostname) or network address (e.g., an IPv4 or IPv6 network address) of the block server which a content item synchronization agent can use to establish a network connection with the block server. Alternatively, a block server identifier itself may be or contain a hostname or network address of the block server.

It should be understood that the example identifiers provided herein, including the example block server identifiers and the example content item namespace identifiers, are merely provided for purposes of illustration and not intended to be limiting of the type or format of identifiers that may be used in an implementation of the invention.

The namespace to block server assignments stored at a personal computing device may be based on information stored in the metadata plane 180. In particular, the metadata plane may store namespace to block server assignments for all or some of the content item namespaces under management of the online content management service. These assignments may be created in the metadata plane 180 by users accessing web site 170 (e.g., by using a web browser or mobile application at a personal computing device). For example, by accessing the web site 170, a user with authorized access to a particular content item namespace can assign the particular content item namespace to a particular block server (e.g., on-premises block server 120 or off-premises block server 130). For example, the user may be an administrator of the particular content item namespace or the particular content item namespace may otherwise be associated with the user's account record 310 with the appropriate permissions allowing the user to assign the particular content item namespace to a block server.

A content item synchronization agent at a personal computing device may download namespace to block server assignments from the metadata server 150 or other server of the online content management server (e.g., web site 170). For example, the content item synchronization agent 114-1 may provide a user account identifier 312 to the metadata server 150 in a network request. The metadata server 150 may then consult the user account record 310 identified by the user account identifier 312 received in the request to determine the identifier(s) 314 of the authorized content item namespace(s) the user account is authorized to access. Using those identifier(s) 314, the metadata server 150 may consult the namespace to block server assignments stored in the metadata plane 180 to determine the assignment(s) for the authorized content item namespace(s). Those assignment(s) may then be returned to the content item synchronization agent 114-1 which can store the assignment(s) locally (e.g., in local storage 112-1) for subsequent access.

While in some example embodiments, a namespace to block server assignment is first created in the metadata plane 180 and then provided by the metadata server 150 or web site 170 to a content item synchronization agent of a personal computing device at which the content item namespace is mounted, a namespace to block server assignment may instead be first created at a personal computing device (e.g., through a user interface driven by the content item synchronization agent at the personal computing device) and then uploaded to the metadata server 150 or web site 170 for storage in the metadata plane 180. Thus, there is no requirement that a namespace to block server assignment be created through web site 170 or first created in the metadata plane 180.

While in some example embodiments, the metadata plane 180 stores a namespace to block server assignment for all content item namespaces under management of the online content management service, the metadata plane 180 stores a namespace to block server assignment for just a subset of all of the content item namespaces under management in other example embodiments. For example, the metadata plane 180 may store a namespace to block server assignment for just the content item namespaces under management that are assigned to an on-premises block server (e.g., 120) but not for content item namespaces assigned to the off-premises block server 130. Thus, in these embodiments, if an explicit namespace to block server assignment does not exist in the metadata plane 180 or at a personal computing device for a particular content item namespace, then it can be assumed that the particular content item namespace is assigned to the off-premises block server 130.

For example, if the new content item added at step 202 belongs to the authorized content item namespace with content item namespace identifier 'DEF456', and a namespace to block server assignment stored at the personal computing device 110-1 specifies that the content item namespace 'DEF456' is assigned to the on-premises block server 120 with block server identifier 'JKL101', then, at step 210, the content item synchronization agent 114-1 determines to upload the new content item to the on-premises block server 120. The block server to which an owning content item namespace is assigned is referred to hereinafter with respect to FIG. 2 as the "target" block server. In general, the target block server can be an on-premises block server (e.g., 120) or the off-premises block server 130 depending on the block server to which the owning content item namespace is assigned.

At this point in the process 200, the content item synchronization agent 114-1 has determined (step 206) the identifier (e.g., 'DEF456') of the owning content item namespace, has computed (step 208) the content item block list for the new content item, and has determined (step 210) the identifier (e.g., 'JKL101') of the target block server. Now, at step 212, the content item synchronization agent 114-1 sends a "commit" request to the metadata server 150 providing this information. In particular, the commit request, in addition to a user account identifier and/or an identifier of the personal computing device 110-1, may include all of the following information, or a subset or a superset thereof:
  The identifier (e.g., 'DEF456') of the owning content item namespace;
  The identifier (e.g., 'JKL101') of the target block server;
  The relative file system path of the new content item relative to a content item namespace mount point folder of the owning content item namespace. For example, if the fully qualified or absolute file system path of the new content item at the personal computing device 110-1 is 'C:\My Work Content Items\My Shared Items\Presentations\sales_preso.doc' and the file system path to the content item namespace mount point folder of the owning content item namespace is 'C:\My Work Content Items\My Shared Items\', then the relative file system path included in the commit request might be '\Presentations\sales_preso.doc'; and
  The content item block list for the new content item.

For extra security, the commit request may be sent via LAN 160 and WAN 190 over an encrypted network connection such as, for example, a network connection secured with Transport Layer Security (TLS) or Secure Sockets Layer (SSL).

At step 214, the metadata server 150 authorizes the commit request received from a content item synchronization agent 114-1. This authorizing may include verifying that content item namespace identifier of the owning content item namespace specified in the commit request is one of the authorized content item namespace identifier(s) 314 of the user account record 310 in the metadata plane 180 corresponding to the user account identifier in the commit request. If not, then the metadata server 150 may deny the commit request and return an appropriate error message to the content item synchronization agent 114-1.

Also as part of authorizing the commit request, the metadata server 150 may also verify that the target block server specified in the commit request is a block server to which the owning content item namespace is currently assigned. This verification may be performed by consulting the namespace to block server assignments in the metadata plane 180. If the owning content item namespace is not currently assigned to the target block server, then the metadata server 150 may deny the commit request and return an appropriate error message to the content item synchronization agent 114-1.

However, in some example embodiments, instead of returning an error message when the owning content item namespace is not currently assigned to the target block server specified in the commit request, the metadata server 150 instead returns an identifier of a block server to which the content item namespace is currently assigned, according to the namespace to block server assignments in the metadata plane 180. By doing so, the content item synchronization agent 114-1 can retry the commit request, this time specifying a new target block server. This also provides a mechanism for the metadata server 150 to inform the content item synchronization agent 114-1 when the block server assignment for a content item namespace is changed. This also allows a content item synchronization agent 114-1 to update its local namespace to block server assignments when informed of a new block server assignment for a content item namespace.

At step 216, assuming the commit request is authorized, the metadata server 150 determines, based at least in part on the content item block list for the new content item in the commit request, which, if any, of the content item block(s) of the new content item are not yet stored at the target block server. To do this, the metadata server 150 may consult the target block server's content item block list in the metadata plane 180. A block server's content item block list, or just "block list", identifies the content item blocks stored at a particular block server by the content item block hashes of the content item blocks. There may be a block server block list in the metadata plane 180 for each on-premises block server (e.g., 120) at which content item blocks are stored. There may also be a block server block list in the metadata plane 180 for the off-premises block server 130. Thus, there may be hundreds or thousands or more of block server block lists stored in the metadata plane 180. Although referred to herein as a block server block "list", the content item block hash of a block server block list may be stored in a list data structure or a data structure other than a list data structure. For example, a block server block list may be implemented as a B-tree data structure or other tree-based data structure. Further, it is also possible for a block server block list to be implemented by multiple data structures. For example, a first data structure may be optimized for looking up a given content item block hash in the block server block list and a second data structure may be optimized for adding new content item block hashes to the block server block list.

To determine which, if any, of the content item block(s) of the new content item are not yet stored in the target block server, the metadata server 150 consults the target block server's block list in the metadata plane 180. The metadata server 150 may identify the target block server's block list in the metadata plane 180 based on the block server identifier for the target block server. For each content item block hash in the content item block list for the new content item in the commit request, the metadata server 150 determines if the content item block hash is in the target block server's block list. If not, then the metadata server 150 determines that the corresponding content item block is missing from the target block server. Otherwise, the metadata server 150 determines that the corresponding content item block is already stored at the target block server.

At step 218, the metadata server 150 responds to the first commit request with a "need content item block list" response. The need content item block list response includes any content item block hashes in the content item block list for the new content item sent in the commit request that the metadata server 150 determined at step 216 were missing from the target block server's block list. Thus, the need content item block list response may specify all or a subset of the content item block hashes in the content item block list for the new content item sent in the commit request depending on which content item block(s) are missing at the target block server.

At step 220, the content item synchronization agent 114-1 stores any missing content item block(s) of the new content item to the target block server. This may involve the content item synchronization agent 114-1 making one or more "store" requests to the target block server. Each such store request may include one or more missing content item blocks and the content item block hash for each of the one or more missing content item blocks. The content item synchronization agent 114-1 may make more than one store request if the total size of the missing content item block(s) is sufficiently large. For example, the target block server may permit a single store request to upload only up to 8 Megabytes (MB) of content item block data (e.g., no more than two content item blocks at 4 MB per block). In this case, if the new content item is 16 MB in size, for example, then at least two store requests may be needed.

According to some example embodiments, instead of including the entire missing content item block in a store request, only the differences between a content item block that is already stored at the target block server and the missing content item block are included in the store request. This conserves consumption of network bandwidth and other computing resources. The differences may be computed according to a delta encoding approach such as, for example, the delta encoding approach used by the known rsync algorithm. Thus, reference herein to uploading a content item block to a block server encompasses both uploading the entire content item block to the block server and uploading just a delta between the content item block and another content item block to the block server. The delta can be the actual data differences between the two content item blocks, a representation (encoding) of the actual data differences, or a combination of actual data differences and a representation (encoding) of actual data differences.

At step 222, the block service (e.g., 122 or 132) of the target block server (e.g., 120 or 130) stores the missing content item block(s) in the target block server's block storage (e.g., 124 or 134). The implementation of the block storage of the target block server may vary depending on whether the target block server is an on-premises block server (e.g., 120) or the off-premises block server 130.

In some example embodiments, an on-premises block server may have sufficient data storage capacity to store content item blocks of the content items belonging to a subset of the all of the content item namespaces under management of the online content management service. The subset may be a set of content item namespaces that all belong to the same organization, or employees of the same corporation, or students at the same school, for example. On the other hand, the off-premises block server 130 may have sufficient data storage capacity store content item blocks for all content item namespaces under management of the online content management service. The different data storage requirements may drive different implementations in the on-premises block storage (e.g., 124) as compared to the off-premises block storage 134. For example, on-premises block storage may be implemented as an array of storage devices (e.g., disk drives) housed in one or a few number of machines that provides up to one to a few terabytes of data storage or more. While the off-premises block storage 134 may be implemented as a distributed computing system housed in one or more data center facilities providing up to many zettabytes of data storage or more.

At step 224, the target block server updates the target block server's block server block list in the metadata plane 180 with the content item block hash(es) of the uploaded content item block(s). The manner of updating may vary depending on whether the target block server is an on-premises block server 120 or the off-premises block server 130.

In the case of the off-premises block server 130, for each uploaded content item block successfully stored in block storage 134, the block service 132 updates the block list in the metadata plane 180 for the off-premises block server 130. Such updating may include adding the content item block hash(es) of the uploaded content item block(s) to the block list for the off-premises block server 130. Before updating the block list with a content item block hash of an uploaded content item block, the block service 132 may compute its own content item block hash of the uploaded content item block to compare against the content item block hash for the uploaded content item block received in the store request from a content item synchronization agent. If the content item block hashes do not match, the block service 132 may deny the store request and not store the uploaded content item block in the block storage 134 and not update the block list for the off-premises block server 130 in the metadata plane 180. According to some example embodiments, the block service 132 may require that the store request include a valid user account identifier 312 before storing any uploaded content item block(s) specified in the store request in the block storage 134.

In the case of an on-premises block server (e.g., 120), for uploaded content item block(s) successfully stored in on-premises block storage (e.g., 124), the block service (e.g., 122) of the on-premises block server may send one or more "have content item block" requests to the metadata server 150. The block service can send a have content item block request after each uploaded content item block is successfully stored in the block storage. Alternatively, the block service can send a have content item block request after multiple uploaded content item block(s) are successfully stored in the block storage. A have content item block request may include all of the following information, or a subset or a super set thereof:

A user account identifier 312. This can be the user account identifier 312 specified in the store request to the on-premises block server. Alternatively, this can be a user account identifier 312 of another user account such as, for example, a user account for the on-premises block server;

A block server identifier of the on-premises block server; and

One or more content item block hash(es) of one or more uploaded content item block(s) that were successfully stored in the block storage.

Upon receiving a have content item block request from an on-premises block server, the metadata server 150 can authorize the have content item block request by verifying that the on-premises block server is one of the block servers assigned a content item namespace 314 accessible to the user account identified by the user account identifier 312 in the have content item block request. If the request is authorized, the metadata server 150 can also update the block list in the metadata plane 180 for the on-premises block server to indicate that the uploaded content item block(s) are now stored in local block storage at the on-premises block server. After updating the block list in the metadata plane 180, the metadata server 150 may respond to the have content item block request that the request was successfully processed.

At this point, whether the target block server is an on-premises block server (e.g., 120) or the off-premises block server 130, the content item block(s) of the new content item that were missing at the target block server have now been uploaded to the target block server by the content item synchronization agent 114-1. In addition, the target server's block list in the metadata plane 180 has been updated to indicate that all of the content item block(s) of the new content item are now stored at the target block server.

At step 226, the content item synchronization agent 114-1 attempts the commit request of step 212 again. This second commit request may pass the same parameters that were passed in the first commit request including the owning content item namespace identifier, the target block server identifier, the relative path to the new content item, and the new content item's block list.

At step 228, the metadata server 150 authorizes this second commit request as it did with the first commit request in step 214.

At step 230, assuming the second commit request is authorized, the metadata server 150 determines if any content item block(s) identified in the new content item's block list are missing from the target block server according to the target block server's block list in the metadata plane 180. This time, since the missing content item block(s) were uploaded to the target block server after the first commit request, the metadata server 150 should determine that no content item block(s) for the new content item are missing at the target block server.

3.1.3 Content Item Server Journal

At step 232, after determining that no content item block(s) for the new content item are missing from the target block server, the metadata server 150 adds a new entry to the target block server's content item journal, or just "server journal", in the metadata plane 180. According to some example embodiments, adding the new entry "commits" the new content item to the online content management service. A server journal is used to track the versions of the content items committed to a particular block server. There may be a server journal for the off-premises block server 130 and a server journal for each on-premises block server. Thus, there may be hundreds or thousands or more server journals stored in the metadata plane 180.

Figure 4:
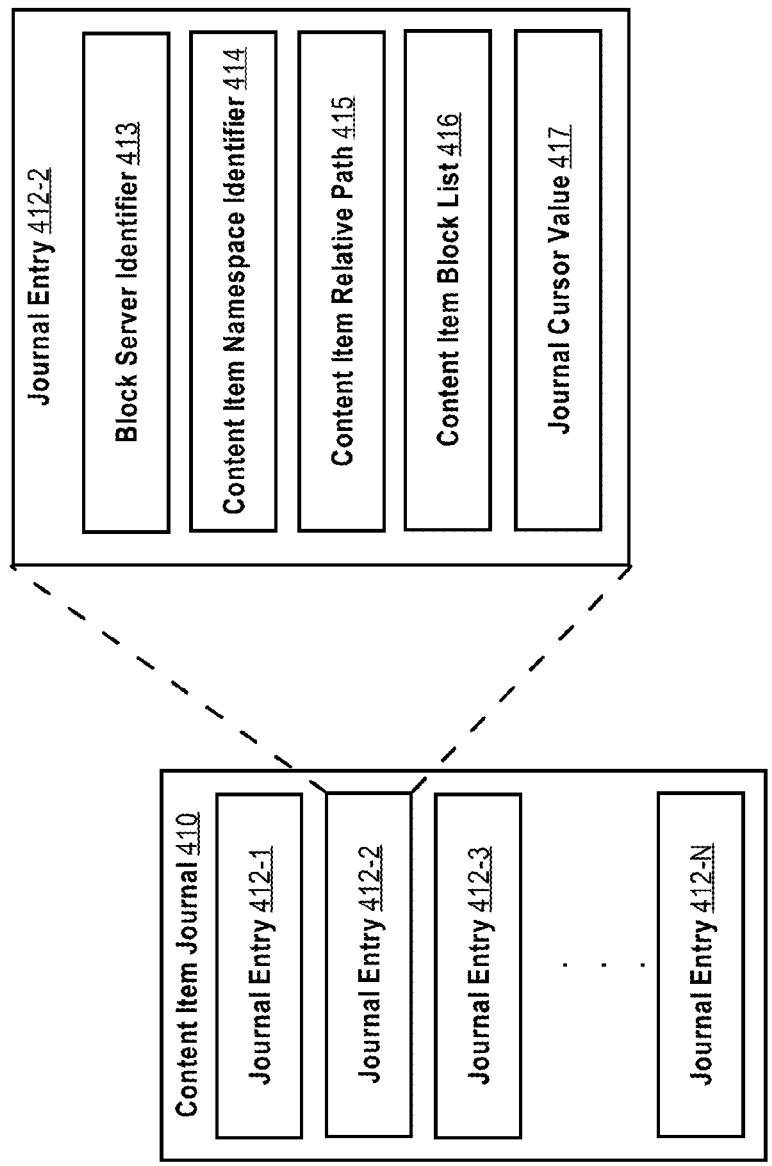
FIG. 4 is a block diagram of a content item server journal, according to some example embodiments of the present invention.

Turning briefly to FIG. 4, it is a block diagram of a server journal 410 composed of one or more server journals. The server journal 410 may be stored in the metadata plane 180. The server journal 410 includes a number of server journal entries 412. A new server journal entry 412 is added (e.g., appended) to the server journal 410 when a new version of a content item (including the first version of a new content item) is successfully and completely uploaded to a block server. For example, the metadata server 150 may add a new server journal entry 412 to the server journal 410 after determining in response to receiving the second commit request from the content item synchronization agent 114-1 that no content item block(s) for the new content item are missing from the target block server. Adding the new server journal entry 412 to the server journal 410 commits the new content item to the online content management service.

Each server journal entry 412 in the server journal 410 corresponds to a version of a content item. Each server journal entry 412 may include a block server identifier 413, a content item namespace identifier 414, a path 415, a content item block list 416, and a server journal cursor value 417. The block server identifier 413 identifies the block server to which the corresponding new version of the content item was uploaded to. The content item namespace identifier 414 identifies the content item namespace to which the corresponding new version of the content item belongs (i.e., the owning content item namespace). The path 415 specifies a relative file system path of the corresponding new version of the content item, relative to a mount point of the content item namespace to which the content item belongs. The content item block list 416 contains one or more content item block hashes identifying the one or more content item blocks that make up the corresponding new version of the content item.

The server journal cursor value 417 of a server journal entry 412 is content item namespace and block server specific. In particular, the metadata server 150 may maintain a separate server journal cursor for each unique content item namespace and block server combination. The server journal cursor for a corresponding content item namespace and a corresponding block server may be incremented when a new content item belonging to the corresponding content item namespace is successfully uploaded to the corresponding block server. For example, the server journal cursor for a corresponding content item namespace and a corresponding block server may be a monotonically increasing value.

For example, if the server journal cursor value 417 for the most recently added server journal entry 412 for content item namespace 'DEF456' and block server 'JKL101' is '17', then the new server journal entry 412 added at step 232 for a new version of a content item belonging to the same content item namespace and uploaded to same block server might have a server journal cursor value of '18'.

The server journal 410 can store server journals for multiple block servers. In particular, all of the server journal entries 412 in the server journal 410 having the same block server identifier 413 may be considered that block server's server journal. In some alternative embodiments, a physically separate server journal is stored in the metadata plane 180 for each block server. Other storage arrangements are possible including partitioning or sharding the server journal 410 over multiple server computing devices of the metadata plane 180. In this case, the block server identifier 413, the content item namespace identifier 414, or a combination of the block server identifier 413 and the content item namespace identifier 414 may be used as the partitioning key or the sharding key.

At step 234, after successfully adding a new server journal entry 412 to the server journal 410 for the new content item 113, the metadata server 150 responds to the second commit request. In particular, the metadata server 150 sends a response that indicates to the content item synchronization agent 114-1 that the new content item was successfully committed to the online content management service. The response may also include one or more of the block server identifier 413, the content item namespace identifier 414, or the server journal cursor value 417 of the added entry 412.

At step 236, the content item synchronization agent 114-1 may locally store (e.g., in local storage 112) the server journal cursor value received in the response to the second commit request for future reference. When storing locally, the content item synchronization 114-1 may associate the server journal cursor value with the owning content item namespace identifier and the target block server identifier to which the server journal cursor value pertains. In addition, now that new content item has been successfully committed to the online content management service, the content item synchronization agent 114-1 may update a commit status indicator for the new content item.

The commit status indicator for a content item may be visible to a user when viewing the content item as a file in a file system browser interface such as one provided by an operating system of a personal computing device. For example, the commit status indicator may be a graphic displayed on a filename or displayed on an icon representing file type of the content item as it appears in a file system browser or other graphical user interface for browsing, searching, or locating files in a file system.

According to some example embodiments, a commit status indicator for a content item may have at least four states: (1) uncommitted, (2) committing, (3) committed to off-premises block server, and (4) committed to on-premises block server. In the uncommitted state, there may be no commit status indicator displayed. Alternatively, a commit status indicator may be displayed that indicates that the content item is not committed to any block server. In the committing state, the commit status indicator may be animated or otherwise indicate that the content item is currently in the process of being committed to a target block server. For example, when in the committing state, the commit status indicator may animate in a continuous loop to indicate that the content item block(s) of the content item are currently being uploaded to a target block server. When committed to a block server, the commit status indicator for the committed content item may have a different appearance depending on whether the content item is committed to the off-premises block server 130 or to an on-premises block server (e.g., 120). For example, the commit status indicator may have different coloring or different iconography depending on whether the content item is committed to the off-premises block server 130 or an on-premises block server. A reason for the different appearance is to inform a user viewing the commit status indicator which block server the content item is committed to.

In some example embodiments, a content item must be committed to at least two block servers in order for the commit status indicator for the content item to indicate that the content item is committed. For example, a committed commit status indicator (e.g., a green check mark graphic) may be displayed only if the content item is committed to both block server 130 and block server 120, or only if the content item is committed to at least two on-premises block servers. According to some example embodiments, committed to a block server refers to at least the addition of an entry (e.g., 412-2) to a server content item journal (e.g., 410) indicating that all content item blocks of the content item (e.g., as specified by the content item block list 416 of the journal entry 412-2) were stored at the block server at the time of commit. Also in this context, there may not be separate commit status indicators for the committed to an on-premises block server state and for the committed to the off-premises block server states. Instead, there may be a single commit status indicator that represents the committed state for a content item (e.g., a green check mark) when the content item is committed to at least two block servers.

In some example embodiments, the number of (e.g., 1, 2, 3, etc.) or which block server(s) a content item must be committed to in order for a content item to be considered committed (and thus, be displayed with a commit status indicator indicated so) is configured on a per-content item namespace basis. For example, metadata may be stored in association with a content item namespace identifier that specifies a number of block server(s) or specifies which block server(s) (e.g., by block server identifier) that a content item belonging to the content item namespace must be committed to in order for the content item to be considered committed.

3.1.4 Example Upload Interactions

Figure 5:
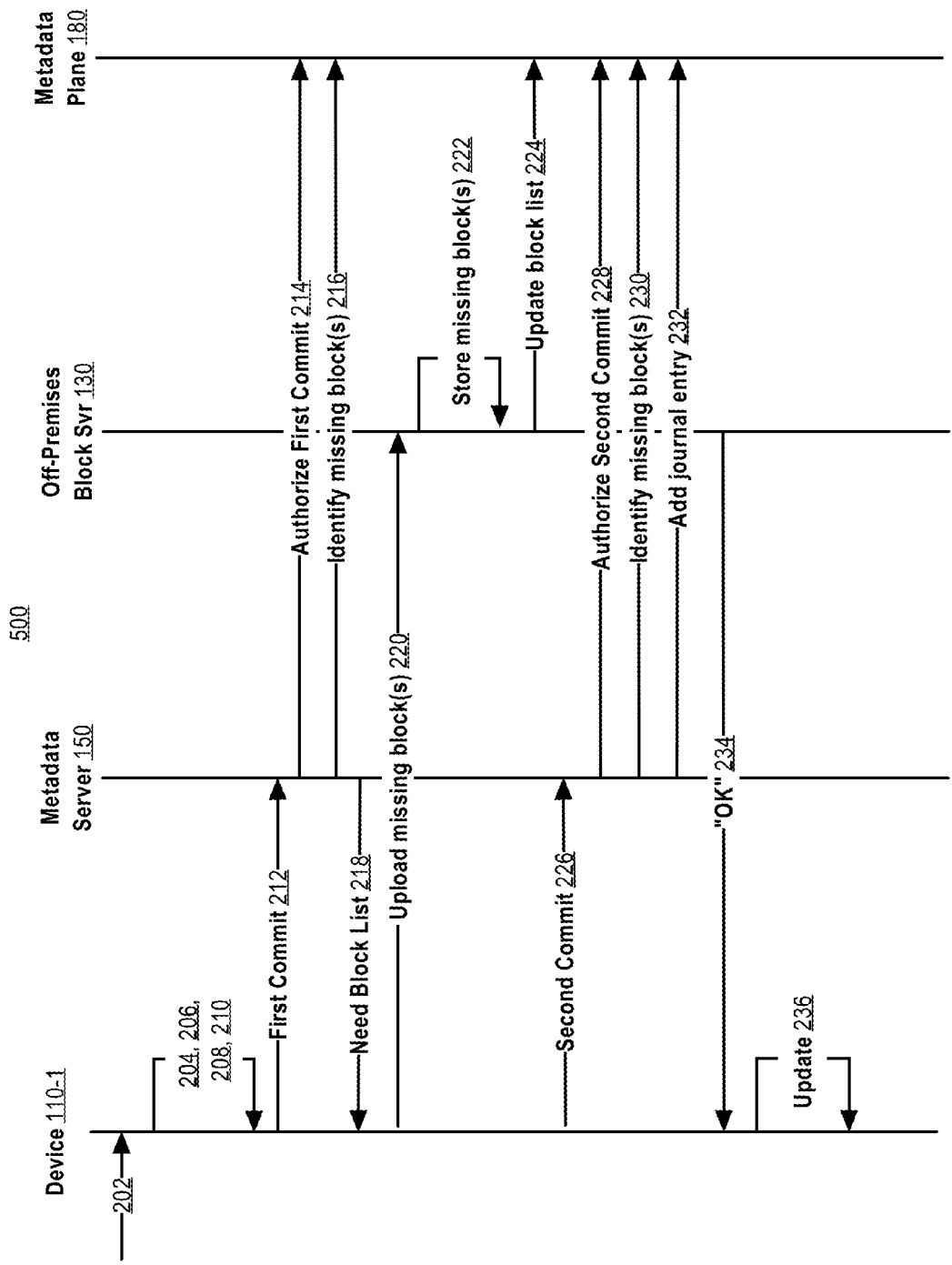
FIG. 5 is an interaction diagram of uploading a content item to an off-premises block server, according to some example embodiments of the present invention.

Turning now to FIG. 5, it is an interaction diagram 500 showing various interactions between personal computing device 110-1, the metadata server 150, the off-premises block server 130, and the metadata plane 180 when the process 200 of FIG. 2 is performed to upload a new content item to the off-premises block server 130, according to some example embodiments of the present invention.

At step 202, user 102-1 creates or modifies a content item at personal computing device 110-1. At step 204, the content item synchronization agent 114-1 at the personal computing device detects the new content item. At step 206, the content item synchronization agent 114-1 determines the owning content item namespace of the new content item. At step 208, the content item synchronization agent 114-1 computes a content item block list for the new content item. At step 210, the content item synchronization agent 114-1 determines that the off-premises block server 130 is the target block server. At step 212, the content item synchronization agent 114-1 sends a first commit request to the metadata server 150.

At step 214, the metadata server 150 authorizes the first commit request. At step 216, the metadata server 150 determines any content item block(s) of the new content item that are missing at the off-premises block server 130. At step 218, the metadata server 150 responds to the first commit request with a need content item block list response identifying the missing content item block(s).

At step 220, the content item synchronization agent 114-1 uploads the missing content item block(s) to the off-premises block server 130.

At step 222, the off-premises block server 130 stores the uploaded content item block(s) in block storage 134. At step 224, the off-premises block server 130 updates the block list in the metadata plane 180 for the off-premises block server 130 with the content item block hash(es) of the missing content item block(s).

At step 226, the content item synchronization agent 114-1 sends a second commit request.

At step 228, the metadata server 150 authorizes the second commit request. At step 230, the metadata server 150 determines any content item block(s) of the new content item that are missing at the off-premises block server 130. At step 232, upon determining no content item blocks are missing, the metadata server 150 adds a new server journal entry 412 to the server journal 410 for the new content item. The new server journal entry 412 identifies the owning content item namespace and the off-premises block server 130. At step 234, the metadata server 150 responds to the second commit request with confirmation that the commit was successful. The response may include a server journal cursor value 417 specific to the owning content item namespace and the off-premises block server 130.

At step 236, the content item synchronization agent 114-1 updates the commit status indicator for the new content item to indicate that the new content item is committed to the off-premises block server 130.

Figure 6:
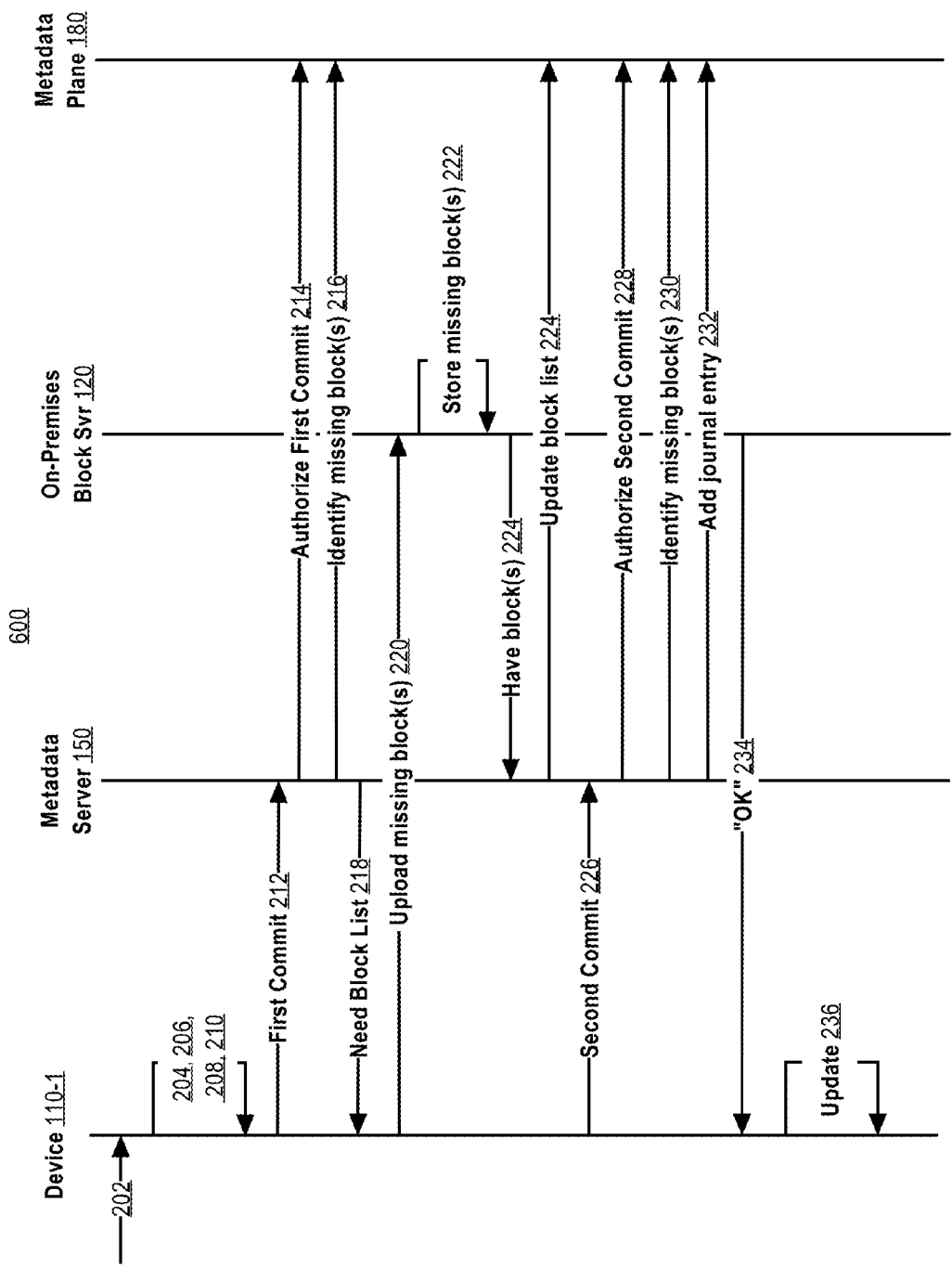
FIG. 6 is an interaction diagram of uploading a content item to an on-premises block server, according to some example embodiments of the present invention.

Turning now to FIG. 6, it is an interaction diagram 600 showing various interactions between personal computing device 110-1, the metadata server 150, on-premises block server 120, and the metadata plane 180 when the process 200 of FIG. 2 is performed to upload a content item to on-premises block server 120, according to some example embodiments of the present invention. The interaction depicted in diagram 600 is similar to the interaction depicted in diagram 500. However, there are some differences related to the target block server being an on-premises block server as opposed to the off-premises block server 130.

At step 202, user 102-1 creates or modifies a content item at personal computing device 110-1. At step 204, the content item synchronization agent 114-1 at the personal computing device detects the new content item. At step 206, the content item synchronization agent 114-1 determines the owning content item namespace of the new content item. At step 208, the content item synchronization agent 114-1 computes a content item block list for the new content item. At step 210, the content item synchronization agent 114-1 determines that on-premises block server 120 is the target block server. At step 212, the content item synchronization agent 114-1 sends a first commit request to the metadata server 150.

At step 214, the metadata server 150 authorizes the first commit request. At step 216, the metadata server 150 determines any content item block(s) of the new content item that are missing at the on-premises block server 120. At step 218, the metadata server 150 responds to the first commit request with a need content item block list response identifying the missing content item block(s).

At step 220, the content item synchronization agent 114-1 uploads the missing content item block(s) to the on-premises block server 120.

At step 222, the on-premises block server 120 stores the uploaded content item block(s) in block storage 124 of the on-premises block server 120. At step 224, the on-premises block server 120 sends one or more have content item block requests to the metadata server 150 for the missing content item block(s) successfully stored in the block storage 124. Also at step 224, the metadata server 150 updates the block list in the metadata plane 180 for the on-premises block server 120 with the content item block hash(es) of the missing content item block(s) specified in the have content item block request(s).

At step 226, the content item synchronization agent 114-1 sends a second commit request.

At step 228, the metadata server 150 authorizes the second commit request. At step 230, the metadata server 150 determines any content item block(s) of the new content item that are missing at the on-premises block server 120. At step 232, upon determining no content item blocks are missing, the metadata server 150 adds a new server journal entry 412 to the server journal 410 for the new content item. The new server journal entry 412 identifies the owning content item namespace and the on-premises block server 120. At step 234, the metadata server 150 responds to the second commit request with confirmation that the commit was successful. The response may include a server journal cursor value specific to the owning content item namespace and the on-premises block server 120.

At step 236, the content item synchronization agent 114-1 updates the commit status indicator for the new content item to indicate that the new content item is committed to the on-premises block server 120.

3.2 Downloading a Content Item

Figure 7:
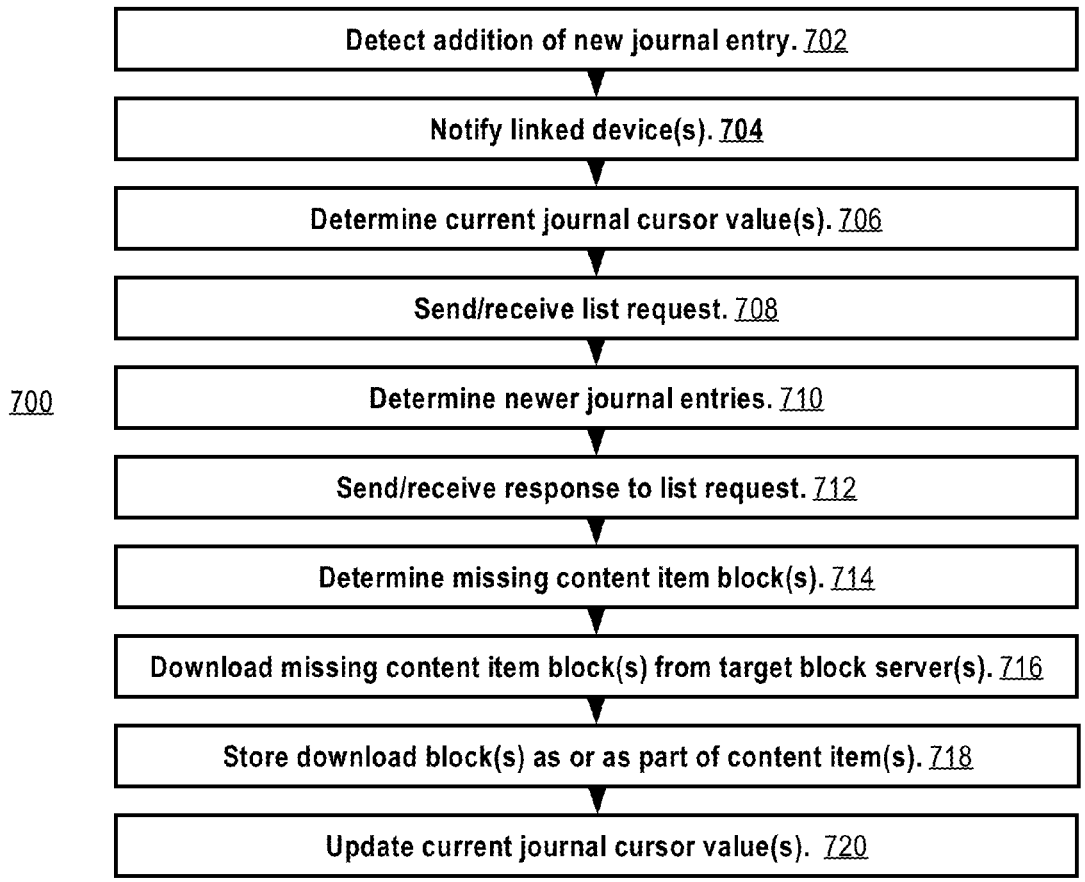
FIG. 7 is a flow diagram of a process for downloading a content item from a target block server, according to some example embodiments of the present invention.
Figure 8:
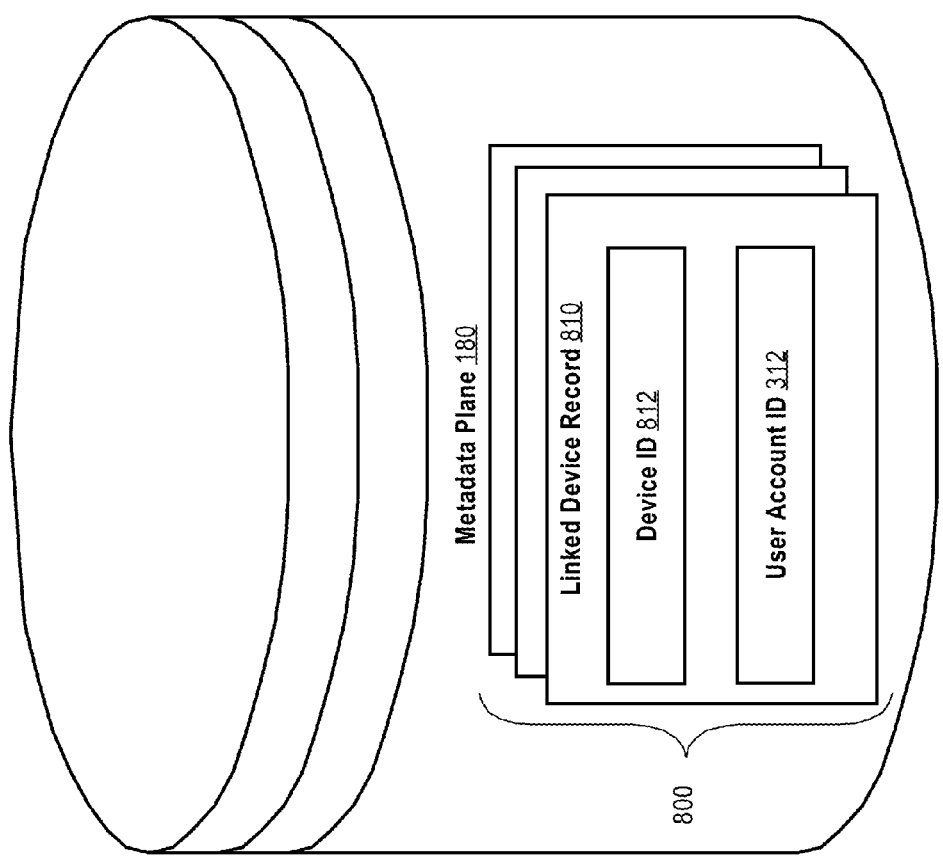
FIG. 8 is a block diagram of linked device metadata, according to some example embodiments of the present invention.

Turning now to FIG. 7, is a flowchart of a process 700 for downloading a content item from a target block server. The target block server can be an on-premises block server (e.g., 120) or the off-premises block server 130 depending on the block server to which the owning content item namespace is currently assigned. While steps are described below and depicted in FIG. 7 in a certain order, no particular order for the steps is required, unless explicitly stated or implied otherwise. Further, there is no requirement that all steps be performed separately in time, and some steps may be performed concurrently with each other or overlap each other in time. Further still, some steps may be omitted entirely and additional steps included according to the requirements of the particular implementation at hand.

At step 702, a new server journal entry 412 added to the server journal 410 is detected. Such detection can be performed by various components of the online content management service including, for example, the metadata server 150 or the notification server 140. For example, a network message may be generated by the metadata plane 180 and carried by back-end data bus to the metadata server 150 and/or the notification server 140 when a new server journal entry 412 is added to the server journal 410. The addition of the new server journal entry 412 represents a new content item belonging to an owning content item namespace that was uploaded to a block server. The new server journal entry 412 identifies the block server the new content item was uploaded to via the block server identifier 413 of the new entry 412 and identifies the owning content item namespace of the new content item via content item namespace identifier 414 of the new entry 412.

At step 704, the notification server 140 notifies the personal computing device(s) (e.g., personal computing device 110-2) at which the owning content item namespace of the new content item is mounted. To determine the personal computing device(s) at which a particular content item namespace is mounted, the metadata plane 180 may store information about "linked devices." In general, a "linked device" is a personal computing device (e.g., 110-2) that demonstrates to the online content management service that it is "in possession" of a valid user account identifier 312. The personal computing device can demonstrate that it is in possession of a valid user account identifier 312 by providing, from that personal computing device, valid authenticated credentials (e.g., a valid username and password) associated with the user account identifier 312 to the online content management service (e.g., metadata server 150 or web site 170), or an identity provider that provides authentication services to the online content management service.

3.2.1 Linked Device Metadata

Turning briefly to FIG. 8 before returning to FIG. 7, FIG. 8 is a block diagram of linked device metadata 800 stored in the metadata plane 180, according to some example embodiments of the present invention. Linked device metadata 800 comprises one or more linked device records 810. Each linked device record 810 can have a device identifier 812 that identifies a linked personal computing device. Each device record 810 can also have a user account identifier 312 that identifies a user account record 310. There may be multiple linked device records 810 with the same user account identifier 312 if, for example, the same user uses multiple personal computing devices to interact with the online content management service. However, it is also possible for there to be only a single linked device record 810 with a given user account identifier 312. A linked device record 810 may contain other information in addition to a device identifier 812 and a user account identifier 312. For example, a linked device record 810 may contain information about the type of linked device, the type of operating system installed on the linked device, the version of the content item synchronization agent installed on the linked device, among other device-specific information.

According to some example embodiments, a linked device record 810 is created in the metadata plane 180 for a personal computing device in response to a client application executing at the personal computing device sending a request to the web site 170 providing valid user authentication credentials associated with a user account identifier 312. For example, the client application can be a web browser executing at the personal computing device by which a user provides the valid user authentication credentials. In response to the request, the web site 170 may create a new linked device record 180 with a device identifier 812 that identifies that personal computing device and the valid user account identifier 312.

Returning to FIG. 7, at step 704, the content item synchronization 114-2 may maintain a long polling connection with the notification server 140. For example, the long polling connection can be a HTTP or HTTPS long polling connection. For each long polling connection maintained with a personal computing device, the notification server 140 may associate the device identifier 812 of the personal computing device with the connection. When a new server journal entry 412 is detected at step 702, the content item namespace identifier 414 of the new server journal entry 412 may be used to identify user account record(s) 310 in the metadata plane 180 that have the content item namespace identifier 414 as an authorized content item namespace 314. For each such identified user account record 310, the linked device records 810 of personal computing devices to notify can be identified based on the user account identifier(s) 312 of the identified user account record(s) 310. The notification server 140 then sends a "ping" message over each long polling connection associated with a device identifier 812 of the personal computing devices determined to require notification. The ping message serves to notify the content item synchronization agent at a personal computing device that updates to one or more content items in one or more content item namespaces mounted at the personal computing device are available.

At step 706, in response to receiving a ping message from the notification server 140, the content item synchronization agent 114-2 at personal computing device 110-2 determines the personal computing device's 110-2 current client journal cursor value(s) for the content item namespace(s) mounted at the personal computing device 110-2. A client journal cursor value, according to the first example operation of the synchronization protocol, may be content item namespace and block server specific. Accordingly, the personal computing device's 110-2 current client journal cursor value for a content item namespace and a block server reflects how up to date the personal computing device 110-2 is with respect to content item changes committed to that content item namespace and that block server. The personal computing device 110-2 may locally store at least one current client journal cursor value for each content item namespace mounted at the personal computing device 110-2. The content item synchronization agent 114-2 may update the current client journal cursor value for a content item namespace and a block server after successfully downloading a new content item belonging to that content item namespace from that block server.

At step 708, the content item synchronization agent 114-2 sends a "list" request to the metadata server 150. In addition to a user account identifier 312 and a device identifier 812, the list request may specify, for each of one or more content item namespaces mounted at the personal computing device 110-2, the personal computing device's 110-2 current client journal cursor value for the content item namespace. Since the personal computing device's 110-2 current client journal cursor values are also block server specific, the list request may also specify, in addition to a content item namespace identifier, the block server identifier of the block server to which the current client journal cursor value pertains. Thus, the list request may specify, in addition to possibly other information, one or more of the personal computing device's 110-2 current client journal cursor values and, for each of those current client journal cursor values, a content item namespace identifier and a block server identifier associated with the current client journal cursor value.

At step 710, the metadata server 150 receives the list request and processes it. Processing the list request may include consulting the server journal 410 in the metadata plane 180. In particular, for each of a personal computing device's 110-2 current client journal cursor values provided in the list request, the metadata server 150 determines any server journal entries 412 that are "newer" than the client journal cursor value provided in the list request. A newer server journal entry 412 can be one where the server journal cursor value 417 of the entry is numerically greater than the personal computing device's 110-2 current client journal cursor value and where the block server identifier 413 and the content item namespace identifier 414 of the entry 412 matches the block server identifier and the content item namespace identifier, respectively, associated with the personal computing device's 110-2 current client journal cursor value in the list request. The metadata server 150 may determine one or more newer server journal entries 412 for each of the personal computing device's 110-2 current client journal cursor values specified in the list request.

At step 712, the metadata server 150 responds to the list request. The response may include information from each newer server journal entry 412 identified at step 710. In particular, the response may include all of the following information for each newer server journal entry 412, or a subset or a super set thereof:

The block server identifier 413 of the newer server journal entry 412;

The content item namespace identifier 414 of the newer server journal entry 412;

The content item relative path 415 of the newer server journal entry 412;

The content item block list 416 of the newer server journal entry 412; and

The server journal cursor value 417 of the newer server journal entry 412.

If multiple newer server journal entries 412 identified at step 710 pertain to the same content item, then only the most recent of the multiple newer server journal entries 412 may be returned in the response to the list request. Multiple newer server journal entries 412 may be considered to pertain to the same content item if they have the same values for the block server identifier 413, the content item namespace identifier 414, and relative path 415 fields, but have different server journal cursor values 417. For example, two updates may have been made to the same content item since a last synchronization operation. In this case, the newer server journal entry 412 with the highest (most recent) server journal cursor value 417 of the multiple newer server journal entries 412 supersedes the others of the multiple newer server journal entries 412. That newer server journal entry 412 with the highest (most recent) server journal cursor value 417 may be returned in the response to the list request and the others not returned.

At step 714, the content item synchronization agent 114-2 determines the content item block(s) that are missing from local storage 112-2 of the personal computing device 110-2. This determination may be based on the content item block list(s) 416 of the newer entry or newer server journal entries 412 received in the response to the list request from the metadata server 150 at step 712. This determination may also be based on a content item client journal, or just "client journal", that the content item synchronization agent 114-2 maintains locally (e.g., in local storage 112-2) to track the content item block(s) stored in local storage 112-2 of the personal computing device 110-2. In particular, the client journal may store a content item block list for each current version of each content item belonging to a mounted content item namespace stored in local storage 112-2. The content item block list for a current version of a content item identifies the content item block(s) of the current version. Each block list in the client journal may be associated in the client journal with an identifier of the owning content item namespace and the relative path to the content item. For a given newer server journal entry 412 received from the metadata server 150 in response to the list request, the content item synchronization agent 114-2 can compare the block list 416 of the newer server journal entry 412 to a block list in the client journal that is associated in the client journal with the content item namespace identifier 414 of the newer server journal entry 412 and the content item relative path 415 of the newer server journal entry 412. Any content item block hash(es) in the newer server journal entry's 412 block list 416 that are not in the corresponding block list in the client journal correspond to content item block(s) that are missing from the current version of the corresponding content item stored in local storage 112-2 of the personal computing device 110-2.

At step 716, the content item synchronization agent 114-2 downloads any missing content item block(s) identified at step 714. The missing content item block(s) may be stored at different block servers or all at the same block server as specified in the response to the list request. To download one or more missing content item blocks from a block server, the content item synchronization agent 114-2 sends a "retrieve" request to the block server specifying the content item block hash(es) of the missing content item block(s) in the retrieve request.

At step 716, the content item synchronization agent 114-2 downloads the missing content item block(s) from one or more target block servers. In particular, each block server that receives a retrieve request from the content item synchronization agent 114-2 may return a response to the retrieve request containing the content item block(s) corresponding to the content item block hash(es) specified in the retrieve request. Downloading a content item block from a block server may proceed according to a delta encoding scheme such as, for example, the one employed by the known rsync algorithm. In this case, downloading a content item block from a block server may include downloading only a delta between the content item block as stored at the block server a content item block already stored at the personal computing device 110-2. Accordingly, reference to downloading a content item block from a block server encompasses both downloading the entire content item block from the block server, or just the delta between a content item block and another content item block.

At step 718, the content item synchronization agent 114-2 stores the downloaded content item block(s) as or as part of one or more files stored in a file system of local storage 112-2. This storing may involve creating new files in the file system and/or updating existing files in the file system based on the downloaded content item block(s). For example, for a given content item block downloaded from a block server for a content item corresponding to newer server journal entry 412 received in response to the list request, the content item synchronization agent 114-2 can determine the file in the file system to create or update with the given content item block based on the content item mount point folder at the personal computing device 110-2 of the content item namespace identified 414 in the newer server journal entry 412 and the relative path 415 in the newer server journal entry 412.

According to some example embodiments, content item(s) created or updated at step 718 based on one or more newer server journal entries 412 for a given content item namespace are created or updated in sequence and in order of the server journal cursor value(s) 417 of the newer server journal entries 412. For example, assume at step 708, the content item synchronization agent 114-2 sends a list request specifying a current client journal cursor value of '17' for content item namespace 'ABC123' and block server 'JKL101'. Further, assume that in response to the list request, the content item synchronization agent 114-2 receives, at step 712, in response to the list request, three newer server journal entries 412 for content item namespace 'ABC123' and block server 'JKL101' having server journal cursor values '18', '19', and '20', respectively. Then, after downloading any missing content item block(s) corresponding to the three newer server journal entries 412 from block server JKL101', the content item synchronization agent 114-2 may create or update the content item corresponding to the newer server journal entry 412 having server journal cursor value '18' first, followed by creating or updating the content item corresponding to the newer server journal entry 412 having server journal cursor value '19', and finally by creating or updating the content item corresponding to the newer server journal entry 412 having server journal cursor value '20'.

At step 720, the content item synchronization agent 114-2 updates the personal computing device's 110-2 current client journal cursor value(s) for successfully created or updated content item(s) in the local storage 112-2 based on the content item block(s) successfully downloaded and stored at steps 716 and 718. In particular, for a given content item created or updated in the local storage 112-2 based on a corresponding a newer server journal entry 412 received in response to a list request, the personal computing device's 110-2 current client journal cursor value for the content item namespace 414 and the block server 413 identified in the corresponding newer server journal entry 412 is updated so that it matches the server journal cursor value 417 of the corresponding newer server journal entry 412. As mentioned above, content item(s) created or updated at step 720 based on one or more newer server journal entries 412 for a given content item namespace may be created or updated in sequence and in order of the journal cursor value(s) 417 of the newer server journal entries 412. Similarly, the personal computing device's 110-2 current client journal cursor value for a given content item namespace may be incremented at step 722 in sequence and in order of the journal cursor value(s) 417 of the newer server journal entries 412.

3.2.2 Example Download Interaction

Figure 9:
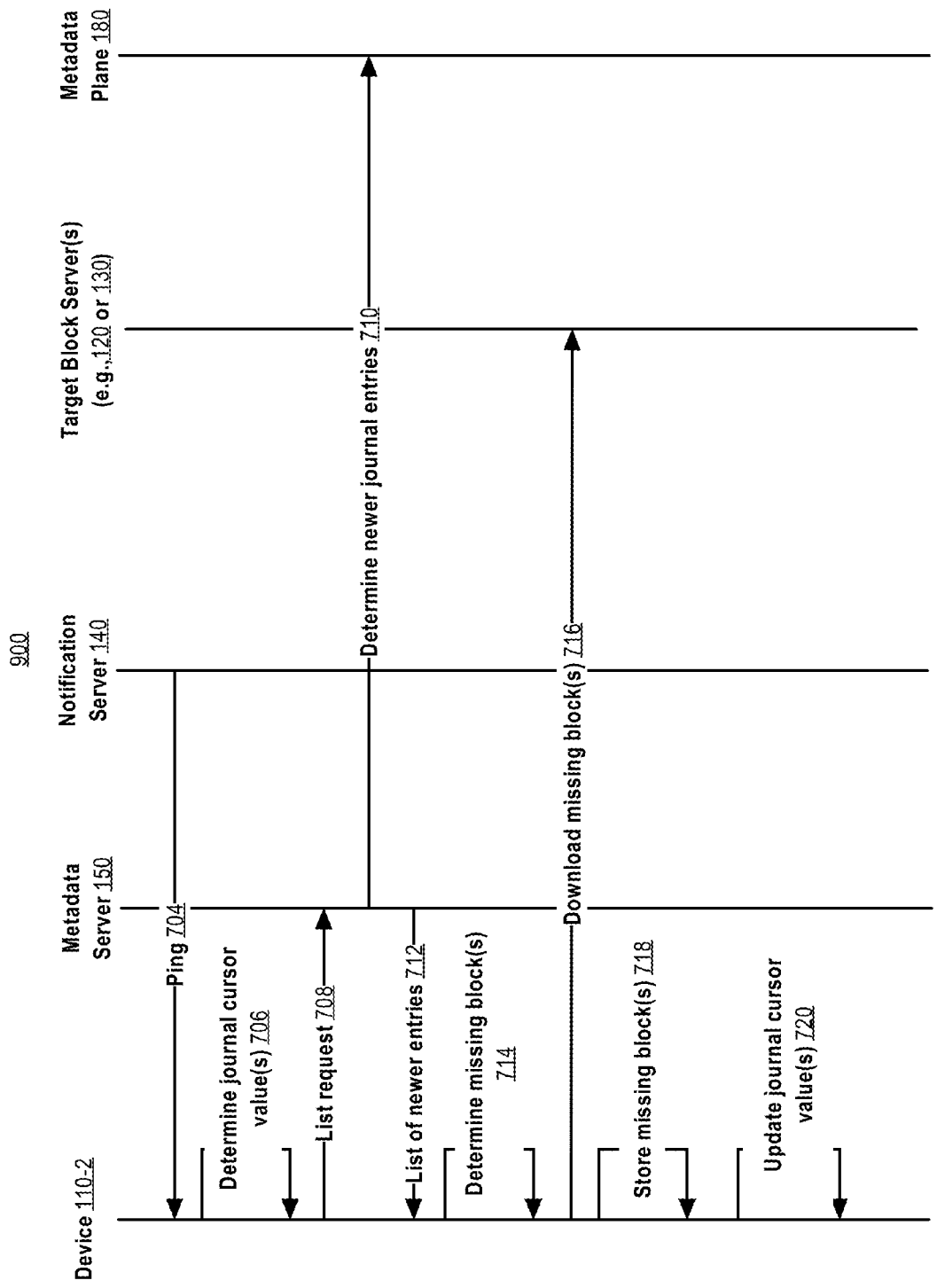
FIG. 9 is an interaction diagram of downloading a content item from a block server, according to some example embodiments of the present invention.

Turning now to FIG. 9, it is an interaction diagram 900 showing various interactions between personal computing device 110-2, the notification server 140, the metadata server 150, a target block server, and the metadata plane 180 when the process 700 of FIG. 7 is performed to download a content item from an on-premises block server (e.g., 120) or an off-premises block server 130, according to some example embodiments of the present invention.

As in step 704, the notification server 140 sends a ping message to the content item synchronization agent 114-2 at the personal computing device 110-2.

As in step 706, the content item synchronization agent 114-2 determines the current client journal cursor value(s) for one or more content item namespaces mounted at the personal computing device 110-2. Each such current client journal cursor value reflects how up to date the personal computing device 110-2 is with respect to changes to the content item namespace uploaded to a corresponding block server. As in step 708, the content item synchronization agent 114-2 sends a list request to the metadata server 150.

As in step 710, the metadata server 150 determines any newer journal entries 412 in the server journal 410 for each current client journal cursor value specified in the list request. As in step 712, the metadata server 150 sends the list of newer journal entries 412 to the device 110-2.

As in step 714, the content item synchronization agent 114-2 determines any content item block(s) specified in the newer journal entries 412 that are not already stored at the device 110-2. This determination may be based on comparing the content item block lists 416 of the newer journal entries 412 to content block list(s) of known content item block hashes for content item blocks that are already stored at the personal computing device 110-2. As in step 716, the content item synchronization agent 114-2 downloads any missing content item block(s) from one or more target block servers. In particular, for each newer journal entry 412 for which one or more content item blocks are missing at the personal computing device 110-2, the content item synchronization agent 114-2 attempts to download the missing content item block(s) from the block server identified 413 in the entry 412. As in step 718, the content item synchronization agent 114-2 creates or updates one or more content items in a local file system of the personal computing device 110-2 based on the download content item block(s). As in step 720, the content item synchronization agent 114-2 updates the current client journal cursor values when the newer journal entries 412 have been successfully processed.

4.0 SECOND EXAMPLE SYNCHRONIZATION PROTOCOL OPERATION

In a variation on the above-described first example synchronization protocol operation, client and server journal cursor values are specific only to content item namespaces and not combinations of a content item namespace and a block server as in the first example synchronization protocol operation described above. In this, the second variation, the metadata server 150 can respond to a commit request from a content item synchronization agent with options of one or more block servers to which the content item synchronization agent can upload missing content item blocks. Also in this variation, the metadata server 150 can respond to a list request from a content item synchronization agent with options of one or more computing devices from which missing content item blocks can be downloaded. In the case of a response to a list request, the computing device options can include other personal computing devices (e.g., 110-1, 110-2) in addition to or instead of block servers (e.g., 120 or 130), thereby facilitating peer-to-peer operations.

The synchronization protocol variant will now be described with emphasis on the differences between the variant and the uploading and downloading processes as described above with respect to FIG. 2 and FIG. 7.

4.1 Uploading Process

Figure 10:
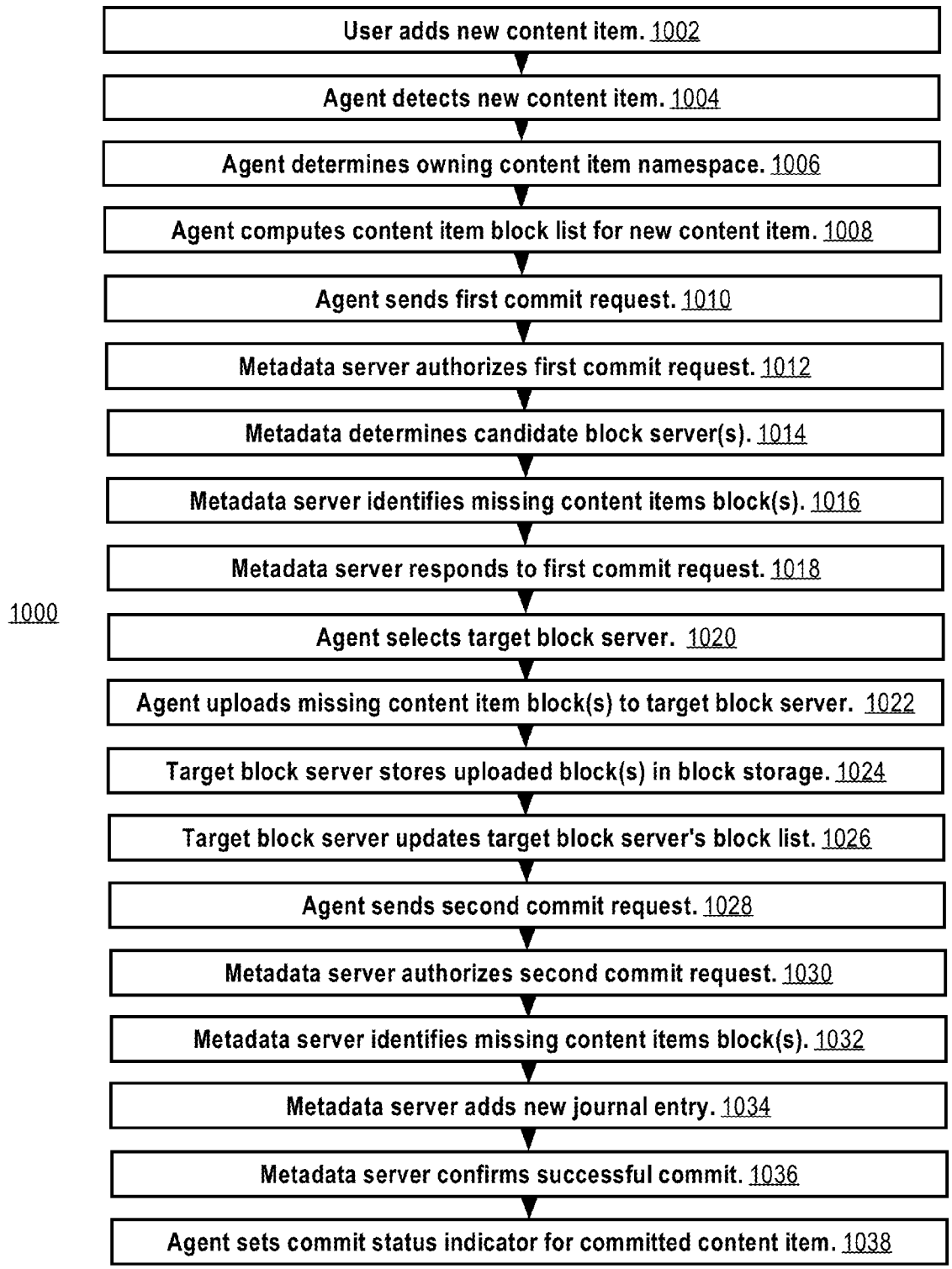
FIG. 10 is a flow diagram of a process for uploading a content item to a target block server, according to some example embodiments of the present invention.

Turning now to FIG. 10, it is a flow diagram illustrating a process 1000 for uploading a new content item from personal computing device 110-1 to a "target" block server, according to some example embodiments of the present invention. The target block can be an on-premises block server (e.g., 102) or the off-premises block server 130. While steps are described below and depicted in FIG. 10 in a certain order, no particular order for the steps is required, unless explicitly stated otherwise. Further, there is no requirement that all steps be performed separately in time, and some steps may be performed concurrently with each other or overlap each other in time. Further still, some steps may be omitted entirely and additional steps included according to the requirements of the particular implementation at hand.

At step 1002, user 102-1 adds or modifies a "new" content item in local storage 112-1 of personal computing device 110-1 as in step 202 described above with respect to FIG. 2.

At step 1004, the content item synchronization agent 114-1 at the personal computing device 110-1 detects the new content item in the local storage 112-1 as in step 204 described above with respect to FIG. 2.

At step 1006, the content item synchronization agent 114-1 determines the content item namespace, if any, to which the new content item belongs as in step 206 described above with respect to FIG. 2.

At step 1008, the content item synchronization 114-1 computes a content item block list for the new content item as in step 208 described above with respect to FIG. 2.

At this point in the uploading process 1000, the content item synchronization agent 114-1 has determined (step 1006) the identifier (e.g., 'DEF456') of the owning content item namespace of the new content item and has computed (step 1008) the content item block list for the new content item. In process 1000, a step like step 210 described above with respect to FIG. 2 is not required to be performed, although it may be. In particular, for upload process 1000, it is not necessary that namespace to block server assignments be stored at the personal computing device 110-1, although they can be.

At step 1010, the content item synchronization agent 114-1 sends a first "commit" request to the metadata server 150. In particular, the first commit request, in addition to a user account identifier 312 and a device identifier 812, may include all of the following information, or a subset or a superset thereof:

The identifier (e.g., 'DEF456') of the owning content item namespace;

The relative file system path of the new content item relative to the content item namespace mount point folder of the owning content item namespace at the personal computing device 110-1; and The content item block list for the new content item.

For extra security, the commit request sent at step 1010 may be sent via LAN 160 and WAN 190 over an encrypted network connection such as, for example, a network connection secured with Transport Layer Security (TLS) or Secure Sockets Layer (SSL).

At step 1012, the metadata server 150 authorizes the first commit request received from the content item synchronization agent 114-1. This authorizing may include verifying that content item namespace identifier 314 of the owning content item namespace specified in the first commit request is one of the authorized content item namespace identifier(s) 314 of the user account record 310 in the metadata plane 180 corresponding to the user account identifier 312 specified in the first commit request. If not, then the metadata server 150 may deny the first commit request and return an appropriate error message to the content item synchronization agent 114-1.

At step 1014, the metadata server 150 determines one or more "candidate" block servers to which the owning content item namespace specified in the first commit request is assigned. This determination may be made by consulting namespace to block server assignments stored in the metadata plane 180. The owning content item namespace may be assigned to just the off-premises block server 130, to just an on-premises block server (e.g., 120), to more than one on-premises block server, or to one or more on-premises block servers and the off-premises block server 130.

At step 1016, the metadata server 150 determines, for each of the one or more candidate block servers, which, if any, of the content item block(s) of the new content item are not yet stored at the candidate block server. To do this, the metadata server 150 may consult the candidate block server's block list in the metadata plane 180. The metadata server 150 may identify the candidate block server's block list in the metadata plane 180 based on the block server identifier for the candidate block server. For each content item block hash in the content item block list for the new content item in the first commit request, the metadata server 150 determines if the content item block hash is in the candidate block server's block list. If not, then the metadata server 150 determines that the corresponding content item block is missing from the candidate block server. Otherwise, the metadata server 150 determines that the corresponding content item block is already stored at the candidate block server.

At step 1018, the metadata server 150 responds to the first commit request with a response specifying one or more need content item block lists. The response may include one need content item block list for each candidate block server. The need content item block list for a candidate block server includes any content item block hashes in the content item block list for the new content item sent in the commit request that the metadata server 150 determines at step 1016 is missing from the candidate block server's block list. Thus, a need content item block list for a candidate block server may specify all or a subset of the content item block hashes in the content item block list for the new content item sent in the first commit request, depending on which content item block(s) are missing at the candidate block server.

At step 1020, the content item synchronization agent 114 selects a target block server to upload the new content item to. The selection may be based on information in the response to the commit request received from the metadata server 150. In particular, the response may include identifiers of one or more candidate block servers and associated with each such identifier a need content item block list. The response may include other information associated with a candidate block server identifier such as whether the candidate block server is an on-premises block server (e.g., 120) or the off-premises block server 130. The other information may also include network performance information and block server load information. The network performance information may include a qualitative or quantitative assessment of the current or historical performance of a network to which a candidate block server is connected. The block server load information may include a qualitative or quantitative assessment of the current or historical load on the computing resources (e.g., CPU, memory, storage, etc.) of a candidate block server. The content item synchronization 114-1 may also maintain locally (e.g., in local storage 112) network and block server performance information for various block servers. In particular, the performance information for a block server may be based on upload times for content item blocks uploaded to the block server in the past. For example, when the content item synchronization agent 114-1 makes a store request to a block server that includes one or more content item blocks, the content item synchronization agent 114-1 may measure the clock time between when the store request is sent and a response to the store request received from the block server. Based on these clock times, the content item synchronization agent 114-1 can calculate an average upload time and/or average throughput (e.g., in megabits per second) that reflects the performance of the network connecting the personal computing device 110-1 to the block server.

Based on all of the following information, or a subset or a superset thereof, the content item synchronization agent 114-1 selects one of the one or more candidate block servers as the target block server to upload the new content item to:

The number of candidate block servers. For example, if only one candidate block server is available, then that candidate block server may be selected as the target block server;

The number of content item blocks of the new content item that are missing from each candidate block server. For example, if multiple candidate block servers are available, the candidate block server that would require uploading the fewest number of content item blocks among all of the multiple candidate block servers may be selected as the target block server;

Network performance information for one or more of the candidate block servers provided by the metadata server 150 in the response to the first commit request;

Server load information for one or more of the candidate block servers provided by the metadata server 150 in the response to the first commit request;

A historical average content item block upload time for one or more of the candidate block servers; and/or A historical average content item block upload throughput for one or more of the candidate block servers.

According to some example embodiments, the content item synchronization agent 114-1 calculates an expected upload time for each candidate block server based on the number of content item blocks of the new content item to upload to the candidate block server and one or more network performance metrics pertaining to the candidate block server. Various different network performance metrics are possible. For example, a network performance metric can be a historical average content item block upload time for the candidate block server or a historical average content item block upload throughput for the candidate block server. For example, assume one hundred and one (101) content item blocks totaling 410,624 Bytes in size are missing from a candidate on-premises block server (e.g., 120) and fifty one (51) content item blocks totaling 205,824 Bytes in size are missing from the candidate off-premises block server 130. Further, assume that the historical average content item block upload throughput for the candidate on-premises block server is 20 Mbits/second and the historical average content item block upload throughput for the candidate off-premises block server 130 is 3 Mbits/second, the content item synchronization agent 114-1 may select the candidate on-premises block server as the target server even though there are more bytes to upload to the candidate on-premises block server. This selection may be made because the expected total upload time to the candidate on-premises block server is less than one-third (⅓) that of the expected total upload time to the candidate off-premises block server 130.

According to some example embodiments, candidate block servers are prioritized and the content item synchronization agent 114-1 selects one of the candidate block servers as the target block server based on their respective priorities. For example, the response to the first commit request provided by the metadata server 150 to the synchronization agent 114-1 may include a priority associated with each candidate block server identifier. The priority may be a numerical value by which all of the candidate block servers may be ordered according to their priorities. The priorities may be user-specified. For example, when assigning a content item namespace to multiple block servers, for example, by interacting with web site 170, a user may specify a priority order to the multiple block servers. For example, a user may specify that an on-premises block server (e.g., 120) is to be preferred for a given content item namespace over the off-premises block server 130, or that a first on-premises block server is to be preferred over a second on-premises block server which are both preferred over the off-premises block server 130. When multiple candidate block servers are available for selection, the candidate block server associated with the highest or best priority may be selected as the target block server. The priorities associated with the multiple candidate block servers may also first be weighted before one of the multiple candidate block servers is selected as the target block server. The weighting of priorities may be based on other information available to the content item synchronization agent 114-1 such as, for example, the number of content item blocks of the new content item that are missing from each candidate block server, network performance information for one or more of the candidate block servers provided by the metadata server 150 in the response to the first commit request, server load information for one or more of the candidate block servers provided by the metadata server 150 in the response to the first commit request, a historical average content item block upload time for one or more of the candidate block servers, and/or a historical average content item block upload throughput for one or more of the candidate block servers.

At step 1022, the content item synchronization agent 114-2 uploads any missing content item block(s) of the new content item to the target block server as in step 220 described above with respect to FIG. 2.

At step 1024, the block service (e.g., 122 or 132) of the target block server (e.g., 120 or 130) stores the missing content item block(s) in the target block server's block storage (e.g., 124 or 134) as in step 222 described above with respect to FIG. 2.

At step 1026, the target block server updates the target block server's block server block list in the metadata plane 180 with the content item block hash(es) of the uploaded content item block(s) as in step 224 described above with respect to FIG. 2.

At step 1028, the content item synchronization agent 114 sends a second commit request to the metadata server 150. The second commit request may contain the same information sent in the first commit request to the metadata server 150 at step 1010 as described above. In addition, the second commit request may specify the block server identifier of the target block server selected at step 1020 as described above. However, there is no requirement that the content item synchronization agent 114-1 send the block server identifier of the selected target block server in the second commit request.

At step 1030, the metadata server 150 may authorize the second request as it did with the first commit request in step 1012 as described above.

At step 1032, assuming the second commit request is authorized, the metadata server 150 determines if any content item block(s) identified in the new content item's block list are missing from the target block server according to the target block server's content item block list in the metadata plane 180. This time, since the missing content item block(s) were uploaded to the target block server after the first commit request, the metadata server 150 should determine that no content item block(s) for the new content item are missing at the target block server. The metadata server 150 may make this determination if the block server identifier of the target block server is specified in the second commit request. Using the target block server's identifier and the content item block hash(es) in the new content item's block list, the metadata server 150 can consult the target block server's content item block list in the metadata plane 180 to determine whether any content item hash(es) in the new content item's block list are missing from the target block server's content item block list. If so, then the new content item is not yet uploaded to the target block server, and the second commit request may be treated by the metadata server 150 like the first commit request, and the process 1000 may return to step 1014 and continue from there. In this case, determining the missing content item block(s) at the target block server as in step 1016 need not be performed again as this determination has already been made. However, the determination of missing content item block(s) at step 1016 may be made for the other candidate block server(s), if any. On the other hand, if none of the content item block hash(es) are missing, then the new content item has been completely uploaded to the target block server and the process 1000 continues with step 1034 to commit the new content item to the online content management service.

If, on the other hand, the block server identifier of the target block server is not specified in the second commit request, then, at step 1032, the metadata server 150 determines if at least one candidate block server, of the one or more candidate block servers to which the owning content item namespace specified in the second commit request is assigned, stores all content item block(s) identified in the new content item's block list. This determination may involve performing a step like 1014 described above as a sub-step of step 1032 to determine the one or more candidate block servers to which the owning content item namespace is assigned and performing a step like 1016 described above as a sub-step of step 1032 to determine if at least one candidate block server stores all content item block(s) identified in the new content item's block list. If at least one candidate block server stores all content item block(s) identified in the new content item's block list, then the new content item has been completely uploaded to at least one candidate block server and the upload process 1000 continues with step 1034 to commit the new content item to the online content management service. On the other hand, if none of the candidate block server(s) store all of the content item block(s) of the new content item, then the new content item is not yet uploaded to a candidate block server, the second commit request may be treated by the metadata server 150 like the first commit request, and the process 1000 may return to step 1014 and continue from there, skipping any determinations that have already been made.

4.1.1 Content Item Server Journal

At step 1034, the metadata server 150, after determining that no content item block(s) for the new content item are missing from the target block server or at least one candidate block server, adds a new journal entry to a content item server journal, or just "server journal" in the metadata plane 180. The content item server journal is used to track the versions of content items committed to the online content management service on a per-content item namespace basis.

Figure 11:
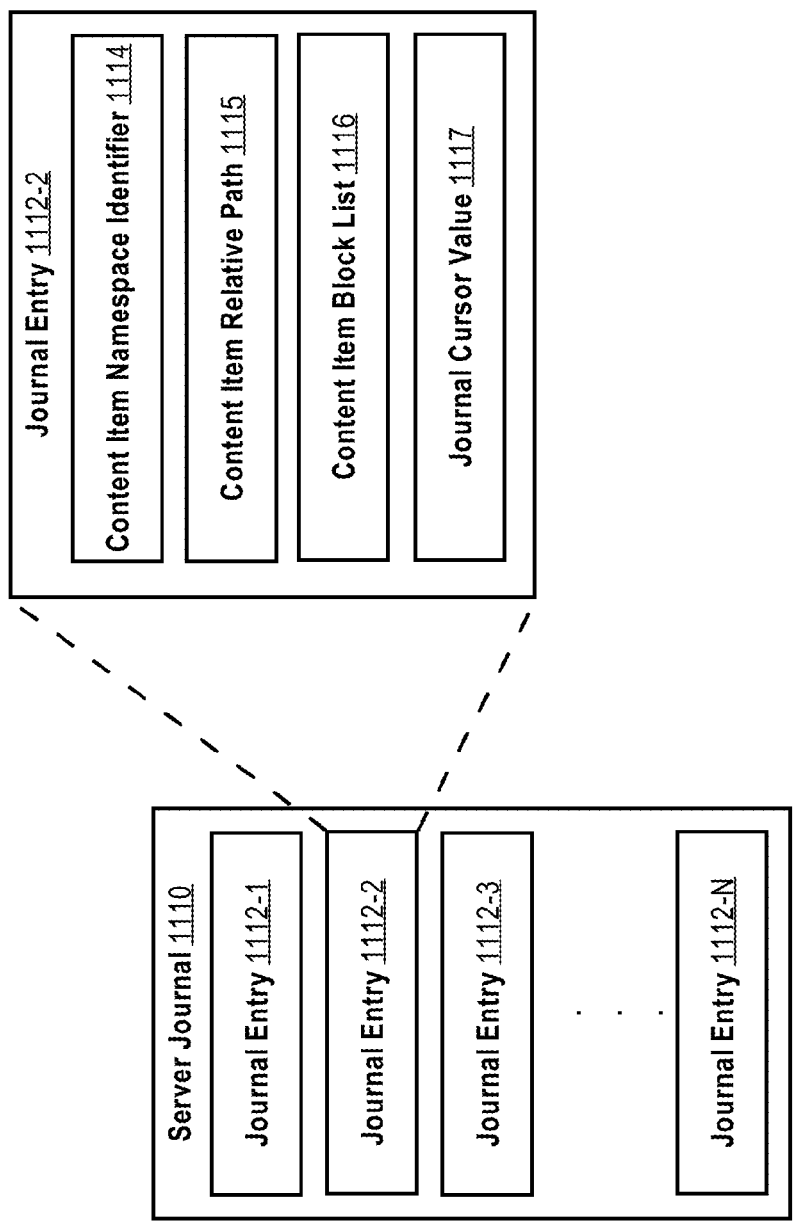
FIG. 11 is a block diagram of a content item server journal, according to some example embodiments of the present invention.

Turning briefly to FIG. 11, it is a block diagram of a server journal 1110. The server journal 1110 may be stored in the metadata plane 180. The server journal 1110 includes a number of journal entries 1112. A new journal entry 1112 is added (e.g., appended) to the server journal 1110 when a new content item is completely uploaded to a block server. For example, the metadata server 150 may add a new journal entry 1112 to the server journal 1110 after determining in response to receiving the second commit request from a content item synchronization agent 114 that no content item block(s) for the new content item are missing from the target block server.

Each journal entry 1112 in the server journal 1110 may include a content item namespace identifier 1114, a relative content item path 1115, a content item block list 1116, and a server journal cursor value 1117. The content item namespace identifier 1114 identifies the content item namespace to which the new content item belongs (i.e., the owning content item namespace). The path 1115 specifies a relative file system path of the new content item, relative to a mount point of the content item namespace to which the new content item belongs. The content item block list 1116 contains one or more content item block hashes identifying the one or more content item blocks that make up the new content item. The server journal cursor value 1117 is content item namespace specific. In particular, the metadata server 150 may maintain a separate server journal cursor for each unique content item namespace under management of the online content management service. The sever journal cursor for a content item namespace is increased (e.g., incremented) when a new content item in the content item namespace is committed to the online content management service. For example, the server journal cursor for a content item namespace may be a monotonically increasing value.

For example, if the server journal cursor value 1117 for the most recently added journal entry 1112 for content item namespace 'DEF456' is '17', then the new server journal entry 1112 added at step 1034 for a new content item belonging to the same content item namespace might have a server journal cursor value of '18'. The server journal cursors for different content item namespaces may be incremented independently of each other as new content items belonging to the different content item namespaces are committed to the online content management service.

The server journal 1110 can store server journals for multiple content item namespaces. In particular, all of the entries 1112 in the server journal 1110 having the same content item namespace identifier 1114 may be considered that content item namespace's server journal. In some alternative embodiments, a physically separate server journal is stored in the metadata plane 180 for each content item namespace under management. Other storage arrangements are possible including partitioning or sharding the server journal 1110 over multiple server computing devices of the metadata plane 180. In this case, the content item namespace identifier 1114 may be used as the partitioning key or the sharding key.

At step 1036, after adding the new journal entry 1112 to the server journal 1110, the metadata server 150 responds to the second commit request from the content item synchronization agent 114-1. In particular, the metadata server 150 sends a response that indicates to the content item synchronization agent 114-1 that the new content item was successfully committed to the online content management service. In addition, the response may include the journal cursor value 1117 for the owning content item namespace from the new server journal entry 1112 that was added.

At step 1038, the content item synchronization agent 114-1 may locally store (e.g., in local storage 112-1) the server journal cursor value 1117 for future reference. When storing locally, the content item synchronization 114-1 may associate the server journal cursor value 1117 with the owning content item namespace identifier to which the server journal cursor value 1117 pertains. In addition, now that the new content item has been successfully committed to the online content management service, the content item synchronization agent 114-1 may update a commit status indicator for the new content item depending on which target block server (e.g., 120 or 130) the missing content item block(s) of the new content item were uploaded to, as described above with respect to step 236 of upload process 200.

4.1.2 Example Upload Interactions

Figure 12:
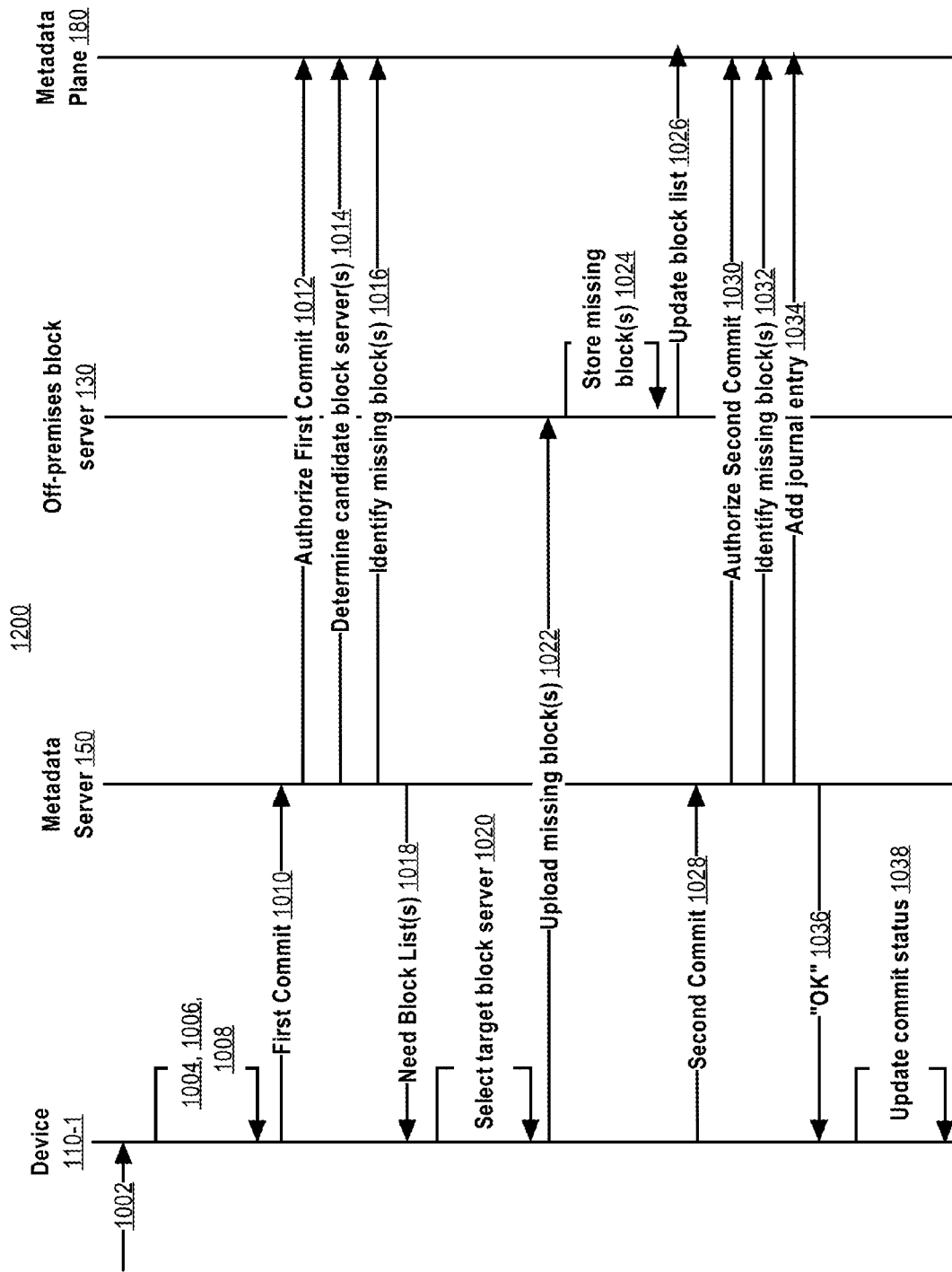
FIG. 12 is an interaction diagram of uploading a content item to an off-premises block server, according to some example embodiments of the present invention.
Figure 13:
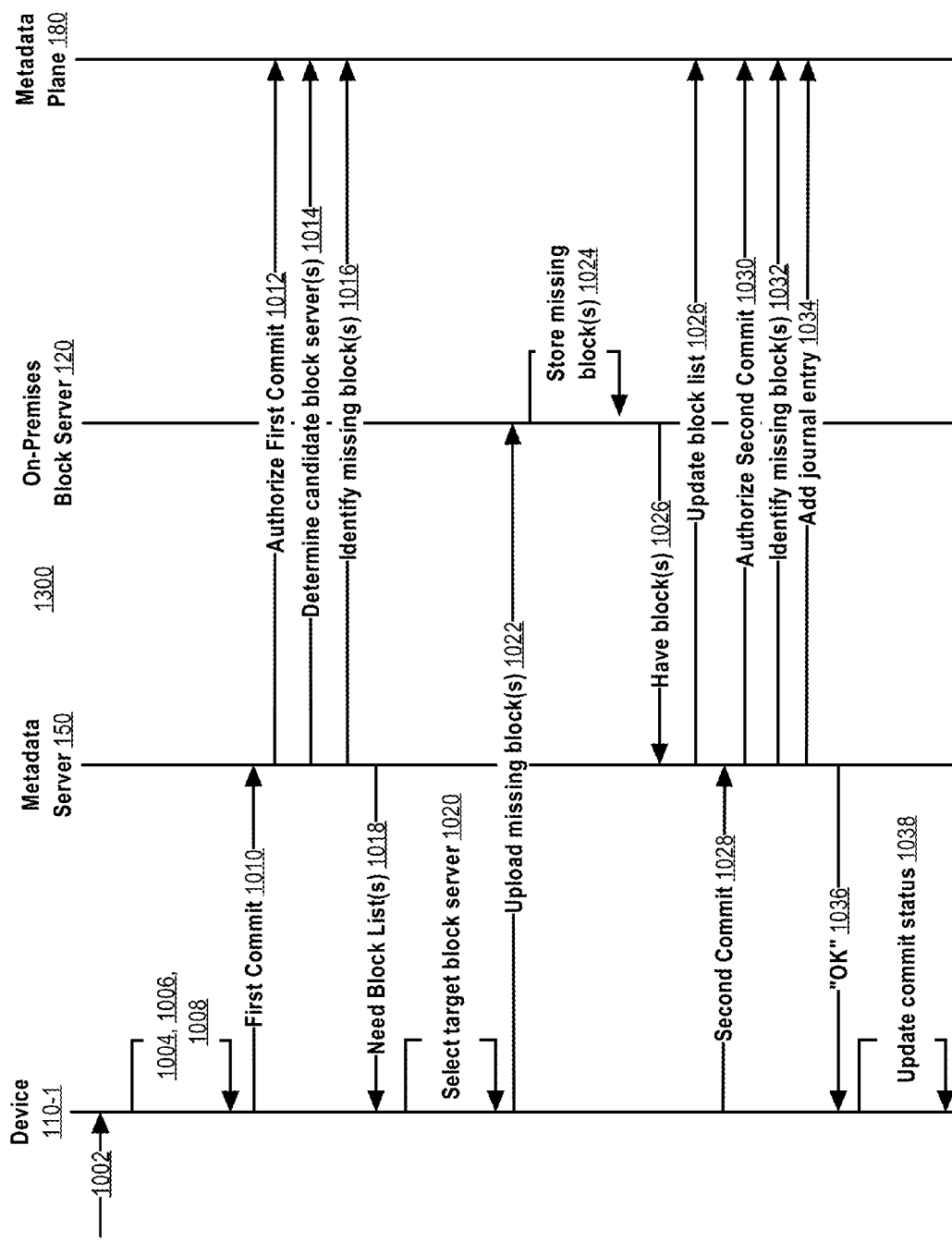
FIG. 13 is an interaction diagram of uploading a content item to an on-premises block server, according to some example embodiments of the present invention.

FIG. 12 provides an interaction diagram 1200 showing various interactions between personal computing device 110-1, the metadata server 150, the off-premises block server 130, and the metadata plane 180 when the upload process 1000 of FIG. 10 is performed to upload a new content item to the target block server, according to some example embodiments of the present invention. The interaction diagram 1200 represents upload process 1000 when the target block server is the off-premises block server 130. FIG. 13 is an interaction diagram 1300 representing the upload process 1000 when the target block server is the on-premises block server 120, according to some example embodiments of the present invention.

At step 1002, user 102-1 creates or modifies a content item at personal computing device 110-1. At step 1004, the content item synchronization agent 114-1 at the personal computing device detects the new content item. At step 1006, the content item synchronization agent 114-1 determines the owning content item namespace of the new content item. At step 1008, the content item synchronization agent 114-1 computes a content item block list for the new content item. At step 1010, the content item synchronization agent 114-1 sends a first commit request to the metadata server 150.

At step 1012, the metadata server 150 authorizes the first commit request. At step 1014, the metadata server 150 determines one or more candidate block servers for the owning content item namespace specified in the first commit request. At step 1016, the metadata server 150 determines any content item block(s) of the new content item that are missing at each of the candidate block server(s) determined at step 1014. At step 1018, the metadata server 150 responds to the first commit request with a need content item block list response identifying the missing content item block(s) at each of the candidate block server(s).

At step 1020, the content item synchronization agent 114-1 selects one of the candidate block server(s) as the target block server based on various factors such as the ones discussed above. At step 1022, the content item synchronization agent 114-1 uploads the missing content item block(s) to target block server.

At step 1024, if the target block server is the off-premises block server 130, then the off-premises block server 130 stores the uploaded content item block(s) in block storage 134 and at step 1026, the off-premises block server 130 updates the block list in the metadata plane 180 for the off-premises block server 130 with the content item block hash(es) of the uploaded content item block(s).

While interaction diagram 1200 represents the upload process 1000 when the target block server is the off-premises block server 130, if the target block server were the on-premises block server 120, then, as shown in the interaction diagram 1300 of FIG. 13, at step 1024, the on-premises block server 120 stores the uploaded content item block(s) in block storage 124 and, at step 1026, sends one or more have content item block requests to the metadata server 150. Also at step 1026, if the target block server is the on-premises block server 120, then the metadata server 150 updates the block list for the on-premises block server 120 in the metadata plane 180 with the content item block hash(es) of the uploaded content item block(s).

At step 1028, the content item synchronization agent 114-1 sends a second commit request. The second commit request may specify the identifier of the target block server selected at step 1020.

At step 1030, the metadata server 150 authorizes the second commit request. At step 1032, the metadata server 150 determines any content item block(s) of the new content item that are missing at the target block server, if the target block server is specified in the second commit request. If the target block server is not specified in the second commit request, then the metadata server 150 determines one or more candidate block servers for the owning content item namespace as in step 104 and then confirms that at least one of the candidate block server(s) is not missing any content item block(s) of the new content item. At step 1034, upon confirming that no content item blocks of the new content item are missing from the target block server or at least one candidate block server, the metadata server 150 adds a new server journal entry 1112 to the server journal 1110 for the new content item. At step 1036, the metadata server 150 responds to the second commit request with confirmation that the commit was successful. The response may include a server journal cursor value 1117 specific to the owning content item namespace.

At step 1038, the content item synchronization agent 114-1 updates the commit status indicator for the new content item to indicate that the new content item is committed to the target block server.

4.2 Downloading Process

Figure 14:
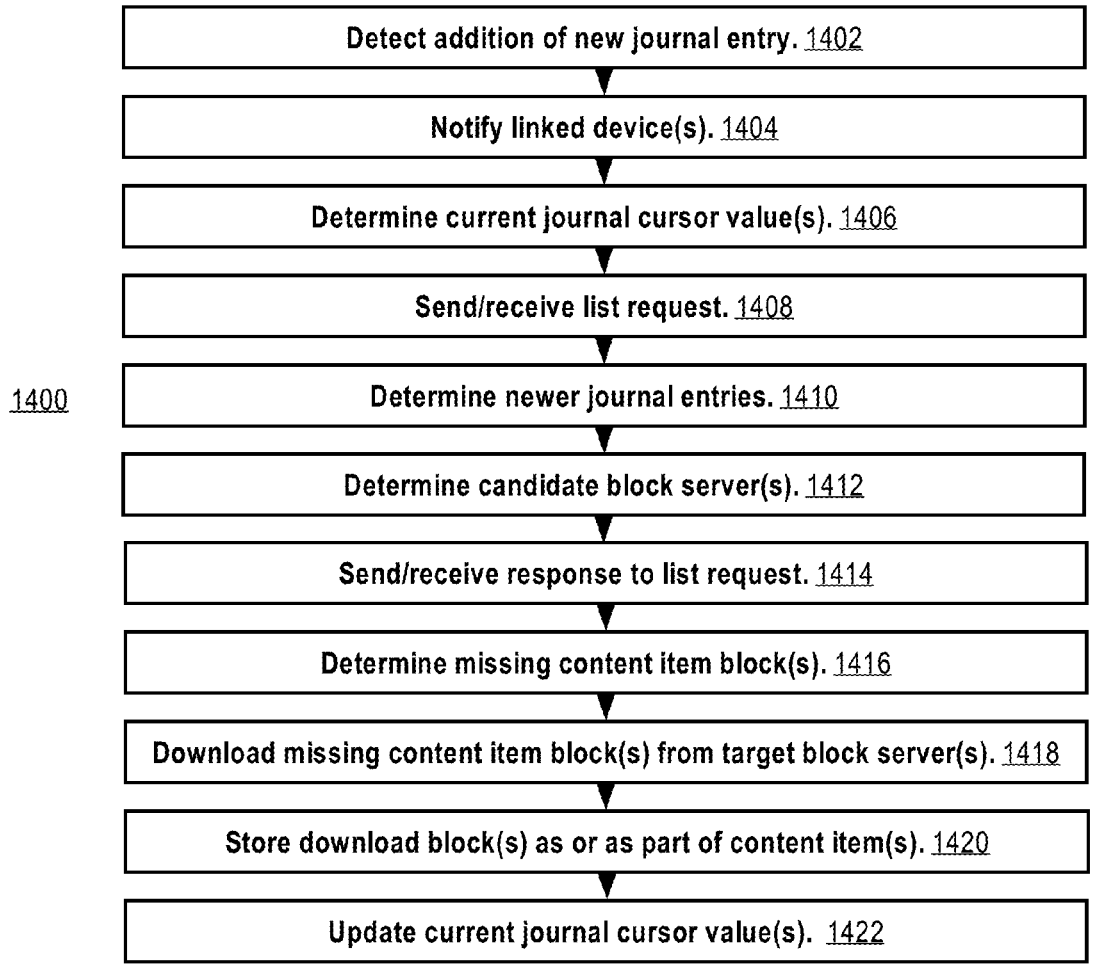
FIG. 14 is a flow diagram of a process for downloading a content item from a target block server, according to some example embodiments of the present invention.

Turning now to FIG. 14 is a flowchart of a process 1400 for downloading a content item from a target block server, according to some example embodiments of the present invention. While steps are described below and depicted in FIG. 14 in a certain order, no particular order for the steps is required, unless explicitly stated or implied otherwise. Further, there is no requirement that all steps be performed separately in time, and some steps may be performed concurrently with each other or overlap each other in time. Further still, some steps may be omitted entirely and additional steps included according to the requirements of the particular implementation at hand.

At step 1402, a new server journal entry 1112 added to the server journal 1110 is detected. Such detection can be performed by various components of the online content management service including, for example, the metadata server 150 or the notification server 140. For example, a network message may be generated by the metadata plane 180 and carried by back-end data bus to the metadata server 150 and/or the notification server 140 when a new server journal entry 1112 is added to the server journal 1110. The addition of the new server journal entry 1112 represents a new content item belonging to an owning content item namespace that was recently committed to the online content management service. The new server journal entry 1112 identifies the owning content item namespace of the new content item via content item namespace identifier 1114 of the new server journal entry 1112.

At step 1404, the notification server 140 notifies a personal computing device 110-2 at which the owning content item namespace is mounted as in step 704 of the download process 700 described above with respect to FIG. 7.

At step 1406, in response to receiving a ping message from the notification server 140, the content item synchronization agent 114-2 at personal computing device 110-2 determines the personal computing device's 110-2 current client journal cursor value(s) for the content item namespace(s) mounted at the personal computing device 110-2. In this variant of the synchronization protocol, a client journal cursor value may be content item namespace specific. Accordingly, the personal computing device's 110-2 current client journal cursor value for a content item namespace reflects how up-to-date the personal computing device 110-2 is with respect to content item changes committed to that content item namespace to the online content management service. The personal computing device 110-2 may locally store a current client journal cursor value for each content item namespace mounted at the personal computing device 110-2. The content item synchronization agent 114-2 may update the current client journal cursor value for a mounted content item namespace after successfully downloading a new content item from a block server.

At step 1408, the content item synchronization agent 114-2 sends a "list" request to the metadata server 150. In addition to a user account identifier 312 and a device identifier 812, the list request may specify, for each of one or more content item namespaces mounted at the personal computing device 110-2, the personal computing device's 110-2 current client journal cursor value for the content item namespace. Since the personal computing device's 110-2 current client journal cursor values are content item namespace specific, the list request may also specify the content item namespace identifier of the content item namespace to which the current client journal cursor value pertains. Thus, the list request may specify one or more of the personal computing device's 110-2 current client journal cursor values and, for each of those current client journal cursor values, a content item namespace identifier.

At step 1410, the metadata server 150 receives the list request and, based on information in the list request, identifies newer server journal entries 1112 in the server journal 1110. A newer server journal entry 1112 can be one where the server journal cursor value 1117 of the entry is numerically greater than the personal computing device's 110-2 current client journal cursor value and where the content item namespace identifier 1114 of the entry 1112 matches the content item namespace identifier associated with the personal computing device's 110-2 current client journal cursor value in the list request. The metadata server 150 may determine one or more newer server journal entries 1112 for each of the personal computing device's 110-2 client journal cursor values specified in the list request, assuming a newer server journal entry 1112 exists in the server journal 1110 for a given client journal cursor value.

At step 1412, the metadata server 150 determines one or more candidate block servers for each content item namespace specified in the list request to which the content item namespace is assigned. This determination may be made by consulting the namespace to block server assignments stored in the metadata plane 180 for each of the specified content item namespaces. Each of the content item namespaces may be assigned to just the off-premises block server 130, to just an on-premises block server (e.g., 120), to more than one on-premises block server, or to one or more on-premises block servers and the off-premises block server 130.

At step 1414, the metadata server 150 returns a response to the list request. The response may include information from each newer server journal entry 1112 identified at step 1410 and include information about namespace to block server assignments determined at step 1412. In particular, the response may include all of the following information for each newer server journal entry 1112, or a subset or a super set thereof:

The content item namespace identifier 1114 of the newer server journal entry 1112;

The content item relative path 1115 of the newer server journal entry 1112;

The content item block list 1116 of the newer server journal entry 1112; and The server journal cursor value 1117 of the newer server journal entry 1112.

If multiple newer server journal entries 1112 identified at step 1412 pertain to the same content item, then only the most recent of the multiple newer server journal entries 1112 may be returned in the response to the list request. Multiple newer server journal entries 1112 may pertain to the same content item if they have the same values for the content item namespace identifier 1114 and relative path 1115 fields, but have different server journal cursor values 1117. For example, two updates may have been made to the same content item since a last synchronization operation. In this case, the newer server journal entry 1112 with the highest (most recent) server journal cursor value 1117 of the multiple newer server journal entries 1112 supersedes the others of the multiple newer server journal entries 1112. That newer server journal entry 1112 with the highest (most recent) server journal cursor value 1117 may be returned in the response to the list request and the others not returned.

In addition, the response to the list request may include, for each content item namespace specified in the list request, the block server identifier(s) of one or more block servers to which the content item namespace is currently assigned. The namespace to block server assignments may be based on user input provided through web site 170 by users with the appropriate permissions to make such assignments. The permissions may be content item namespace specific. For example, a user may be able to assign to block servers only the authorized content item namespace(s) 314 of the user's account record 310.

According to some example embodiments, the information returned in the response to the list request for each newer server journal entry 1112 identifies one or more candidate block servers from which all of the content item block(s) identified by the content item block list 1116 of the newer server journal entry 1112 can be downloaded. To make this determination, the metadata server 150 may verify, for each candidate block server assigned to the content item namespace identified 1114 in the newer server journal entry 1112, that all of the content item block hashes of the content item block list 1116 of the newer server journal entry 1112 are in the candidate block server's block list stored in the metadata plane 180. If so, then all of the content item block(s) identified by the content item block list 1116 of the newer server journal entry 1112 can be downloaded from that candidate block server.

At step 1416, the content item synchronization agent 114-2 determines the content item block(s) that are missing from local storage 112-2 of the personal computing device 110-2. This determination may be based on the content item block list(s) 1116 of the newer entry or newer entries 1112 received in the response to the list request from the metadata server 150 at step 1414. This determination may also be based on a content item client journal, or just "client journal", that the content item synchronization agent 114-2 maintains locally (e.g., in local storage 112-2) to track the content item block(s) stored in local storage 112-2 of the personal computing device 110-2. In particular, the client journal may store a content item block list for each current version of each content item belonging to a mounted content item namespace stored in local storage 112-2. Each block list in the client journal may be associated in the client journal with an identifier of the owning content item namespace and the relative path to the content item. For a given newer entry 1112 received from the metadata server 150 in response to the list request, the content item synchronization agent 114-2 can compare the block list 1116 of the newer entry 1112 to a block list in the client journal that is associated in the client journal with the content item namespace identifier 1114 of the newer entry 1112 and the content item relative path 1115 of the newer entry 1112. Any content item block hash(es) in the newer entry's 1112 block list 1116 that are not in the corresponding block list in the client journal correspond to content item block(s) that are missing from the current version of the corresponding content item stored in local storage 112-2 of the personal computing device 110-2.

At step 1418, the content item synchronization agent 114-2 downloads any missing content item block(s) identified at step 1416. The missing content item block(s) may be stored at different block servers or all at the same block server as indicated in the response to the list request. In addition, the content item block(s) missing for a given content item may be available at multiple candidate block servers. In this case, the content item synchronization agent 114-2 can select one of the candidate block servers to download the missing block(s) from. This selection may be based on criteria similar to that discussed above with respect to selection of a target block server for uploading purposes. However, network performance criteria may be based on past block download times instead of past block upload times.

To download one or more missing content item blocks from a block server, the content item synchronization agent 114-2 sends a "retrieve" request to the block server specifying the content item block hash(es) of the missing content item blocks in the retrieve request. At step 1418, the content item synchronization agent 114-2 downloads the missing content item block(s) from one or more target block servers. In particular, each block server that receives a retrieve request from the content item synchronization agent 114-2 may return a response to the retrieve request containing the content item block(s) corresponding to the content item block hash(es) specified in the retrieve request. Downloading a content item block from a block server may proceed according to a delta encoding scheme such as, for example, the one employed by the known rsync algorithm. In this case, downloading a content item block from a block server may include downloading only a delta between the content item block as stored at the block server a content item block already stored at the personal computing device 110-2. Accordingly, reference to downloading a content item block from a block server encompasses both downloading the entire content item block from the block server, or just the delta between a content item block and another content item block.

At step 1420, the content item synchronization agent 114-2 stores the downloaded content item block(s) as or as part of one or more content item(s) stored in a file system of local storage 112-2. This storing may involve creating new files in the file system and/or updating existing files in the file system based on the downloaded content item block(s). For example, for a given content item block downloaded from a block server for a content item corresponding to newer server journal entry 1112 received in response to the list request, the content item synchronization agent 114-2 can determine the file in the file system to create or update with the given content item block based on the content item mount point folder at the personal computing device 110-2 of the content item namespace identified 1114 in the newer entry 1112 and the relative path 1115 in the newer entry 1112.

According to some example embodiments, all content item(s) created or updated at step 1420 based on one or more newer entries 1112 for a given content item namespace are created or updated in sequence and in order of the journal cursor value(s) 1117 of the newer entries 1112.

At step 1422, the content item synchronization agent 114-2 updates the personal computing device's 110-2 current client journal cursor value(s) for successfully created or updated content item(s) in the local storage 112-2 based on the content item block(s) successfully downloaded and stored at steps 1418 and 1420. In particular, for a given content item created or updated in the local storage 112-2 based on a corresponding newer entry 1112 received in response to a list request, the personal computing device's 110-2 current client journal cursor value for the content item namespace 1114 identified in the corresponding newer entry 1112 is updated so that it matches the journal cursor value 1117 of the corresponding newer entry 1112. As mentioned above, content item(s) created or updated at step 1420 based on one or more newer entries 1112 for a given content item namespace may be created or updated in sequence and in order of the journal cursor value(s) 1117 of the newer entries 1112. Similarly, the personal computing device's 110-2 current client journal cursor value for a given content item namespace may be incremented at step 1422 in sequence and in order of the journal cursor value(s) 1417 of one or more newer entries 1112 for a given content item namespace.

4.2.1 Example Download Interaction

Figure 15:
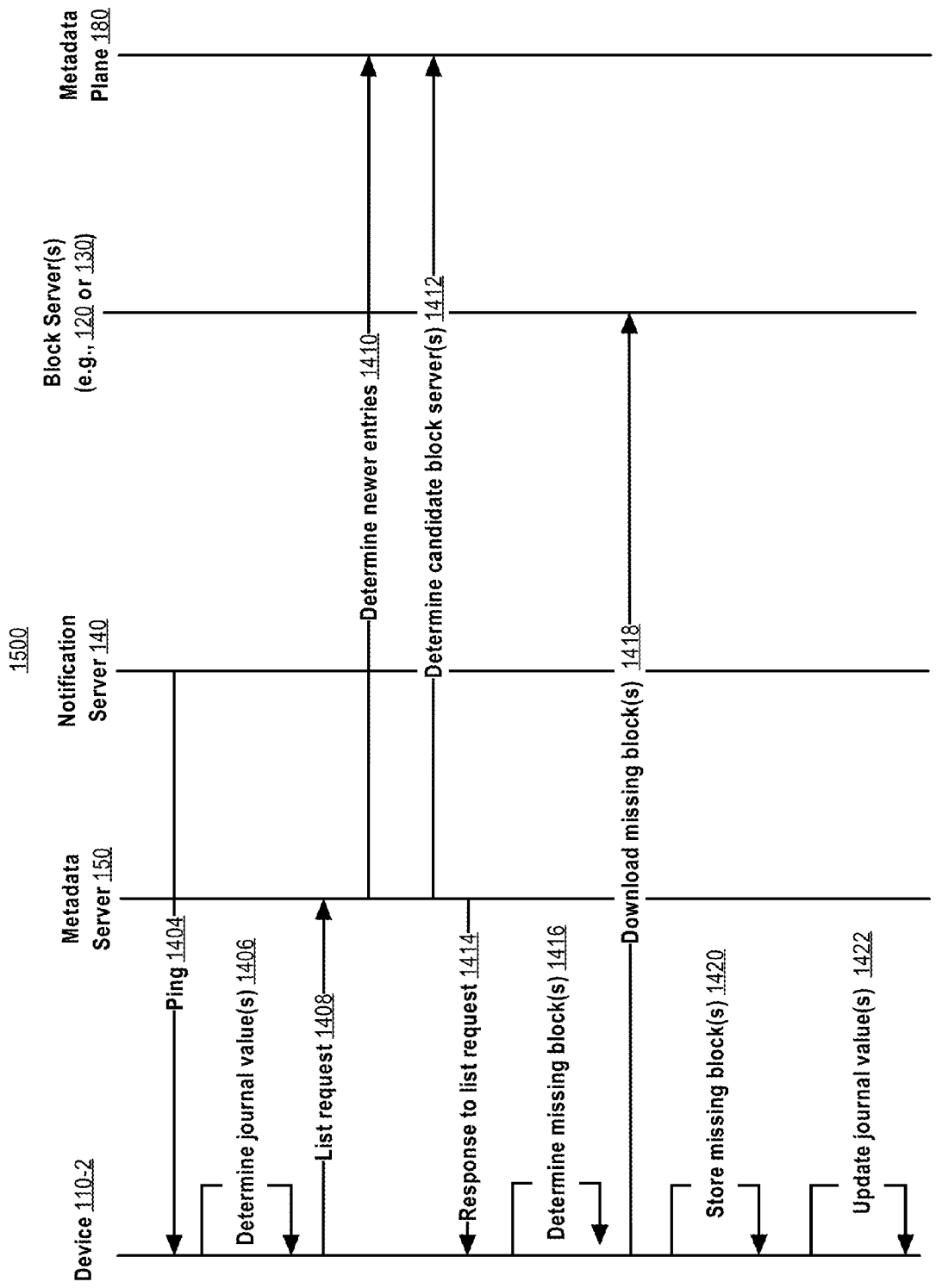
FIG. 15 is an interaction diagram of downloading a content item from a target block server, according to some example embodiments of the present invention.

Turning now to FIG. 15, it is an interaction diagram 1500 showing various interactions between personal computing device 110-2, the notification server 140, the metadata server 150, a block server 120 or 130, and the metadata plane 180 when the process 1400 of FIG. 14 is performed to download a content item from an on-premises block server (e.g., 120) or an off-premises block server 130, according to some example embodiments of the present invention.

As in step 1404, the notification server 140 sends a ping message to the content item synchronization agent 114-2 at the personal computing device 110-2.

As in step 1406, the content item synchronization agent 114-2 determines the current client journal cursor value(s) for one or more content item namespaces mounted at the personal computing device 110-2. Each such current client journal cursor value reflects how up to date the personal computing device 110-2 is with respect to changes to the content item namespace committed to the online content management service. As in step 1408, the content item synchronization agent 114-2 sends a list request to the metadata server 150.

As in step 1410, the metadata server 150 determines any newer journal entries 1112 in the journal 1110 for each current client journal cursor value specified in the list request. As in step 1412, the metadata server 150 determines one or more candidate block server(s) from which the content item block(s) of the newer journal entries 1112 can be downloaded from. As in step 1414, the metadata server 150 sends pertinent information of the list of newer journal entries 1112 to the device 110-2.

As in step 1416, the content item synchronization agent 114-2 determines any content item block(s) specified in the newer journal entries 1112 that are not already stored at the device 110-2. This determination may be based on comparing the content item block lists 1116 of the newer journal entries 1112 to content block list(s) of known content item block hashes for content item blocks that are already stored at the personal computing device 110-2. As in step 1418, the content item synchronization agent 114-2 downloads any missing content item block(s) from one or more target block servers. In particular, for each newer journal entry 1112 for which one or more content item blocks are missing at the personal computing device 110-2, the content item synchronization agent 114-2 attempts to download the missing content item block(s) from a block server at which the missing block(s) are available. As in step 1420, the content item synchronization agent 114-2 creates or updates one or more content items in a local file system of the personal computing device 110-2 based on the download content item block(s). As in step 1422, the content item synchronization agent 114-2 updates the current client journal cursor values when the newer journal entries 1112 have been successfully processed.

5.0 STREAMING DOWNLOAD OPTIMIZATION

In the above example synchronization protocol operations, the personal computing device 110-2 is notified by the notification server 140 via a ping message of a new content item after the new content item has been completely uploaded to a target block server. As a result, the personal computing device 110-2 does not begin downloading the missing block(s) of the new content item from the target block server until after all of the content item block(s) of the new content item have been upload to or are otherwise available at the target block server.

According to some example embodiments, the personal computing device 110-2 can begin downloading missing block(s) of the new content item from the target block server before the new content item has been completely uploaded to the target block server. To facilitate this streaming download optimization, some optimizations to synchronization protocol are implemented, which will now be discussed with respect to FIGS. 2 and 7 and the first example synchronization protocol operation and FIGS. 10 and 14 and the second example synchronization protocol operation.

5.1 First Example Synchronization Protocol

In the modified synchronization protocol, steps 202, 204, 206, 208, 210, 212, and 214 may proceed as described above with respect to the first example synchronization protocol operation. However, according to a streaming download optimization, the metadata server 150 maintains a pre-commit server journal in the metadata plane 180. The metadata server 150 may add an entry to the pre-commit server journal after a "failed" commit request from a content item synchronization agent. A "failed" commit request can be one in which there is at least one content item block of the new content item missing from the target block server. In particular, at step 216 of a modified upload process 200, after the metadata server 150 determines that there are one or more content item blocks of the new content item missing from the target block server, the metadata server 150 may add a new entry to the pre-commit server journal. The new pre-commit server journal entry may include a block server identifier, a content item namespace identifier, a relative path, and a content item block list. The new pre-commit server journal entry does not need to have a server journal cursor value, but it may. The block server identifier of the pre-commit server journal entry identifies the target block server for the new content item, which can be an on-premises block server (e.g., 120) or the off-premises block server 130. The content item namespace identifier of the new pre-commit server journal entry identifies the owning content item namespace for the new content item. The relative path identifies the path to the new content item name relative to a mount point of the owning content item namespace. The content item block list includes one or more content item block hashes corresponding to the one or more content item blocks of the new content item.

At step 230 of the modified upload process 200, the metadata server 150 may remove the pre-commit server journal entry from the pre-commit server journal after determining that there are no content item block(s) of the new content item missing from the target block server. According to some example embodiments, the pre-commit server journal entry is automatically removed (i.e., expires) from the pre-commit server journal after a period of time has elapsed since adding the pre-commit server journal entry to the pre-commit server journal. Pre-commit server journal entries are set to automatically expire in case the modified upload process 200 fails and the second commit request is never made. The presence of a pre-commit server journal entry in the pre-commit server journal for a new content item serves as a signal that the new content item is available for the streaming download optimization. The remaining steps of the modified upload process 200 may proceed as described above with respect to the first example synchronization protocol operation.

According to some example, the pre-commit server journal is maintained in volatile memory only of the metadata plane 180, as the synchronization protocol can still operate properly without the streaming download optimization should entries of the pre-commit server journal be erased, evicted or expire from volatile memory. For example, the pre-commit server journal may be maintained in a distributed memory caching system such as, for example, memcache.

At step 702 of a modified download process 700, a new pre-commit server journal entry added to the pre-commit server journal for a new content item is detected.

At step 704 of the modified download process 700, in response to the detection of the new pre-commit server journal entry, the notification server 140 sends a ping message to personal computing device 110-2 at which the owning content item namespace is mounted.

Steps 706 and 708 of the modified download process 700 may proceed as described above with respect to the first example synchronization protocol operation.

At step 710 of the modified download process 700, the metadata server 150, when processing the list request, in addition to determining any newer server journal entries 412 in server journal 410 as described above, may also determine any relevant pre-commit server journal entries in the pre-commit server journal. In particular, for each of the content item namespace and block server pairs associated with a current client journal cursor value in the list request, the metadata server 150 may determine one or more pre-commit server journal entries in the pre-commit server journal having a matching content item namespace identifier and block server identifier. Information of each such pre-commit server journal entry can be returned in the response to the list request at step 712 of the modified download process 700. A pre-commit server journal entry returned in the list request response may be identified as such to distinguish it from newer server journal entries 412 returned in the list request response. For example, a pre-commit server journal entry returned in the response may not be associated with a journal cursor value while a newer server journal entry 412 returned in the response may be associated with the server journal cursor value 417 of the newer server journal entry 412.

At step 714 of the modified download process 700, the content item synchronization agent 114-2 determines the content item block(s) identified by the content item block list(s) 416 of the newer server journal entries 412 that are missing from local storage 112-2 of the personal computing device 110-2 as described above with respect to the first synchronization protocol operation. In addition, the content item synchronization agent 114-2 may maintain in local storage 112-2 a pre-fetch cache of content item blocks. The pre-fetch cache may be an area of the local storage 112-2 (e.g., a particular file system folder) designated to store content item blocks downloaded from block servers at part of the streaming downloading optimization. In particular, for a pre-commit server journal entry received by the content item synchronization agent 114-2 at step 712 of the modified download process 700, the content item synchronization agent 114-2, as part of step 714 of the modified download process 700, may determine any content item block(s) of the new content item identified by corresponding content item block hash(es) in the pre-commit server journal entry that are missing at the personal computing device 110-2. At part of step 716 of the modified download process 700, the content item synchronization agent 114-2 may download any such missing content item block(s) from the target block server identified in the pre-commit server journal entry to the personal computing device 110-2 for storage in the pre-fetch cache area of local storage 112-2.

For a given new content item corresponding to a pre-commit server journal entry received at step 712 of the modified download process 700, a content item synchronization agent (e.g., 114-2) at a personal computing device (e.g., 110-2) may be downloading a content item block of the new content item from the target block server at step 716 of the modified download process 700 while another content item synchronization agent (e.g., 114-1) at another personal computing device (e.g., 110-1) is uploading a different content item block of the new content item to the target block server at step 220 of the modified upload process 200. For example, assume a new content item is composed of three content item blocks with content item block hashes 'A', 'B', and 'C'. As part of the streaming download optimization, content item synchronization agent 114-2 may begin downloading content item block 'A' from a target block server before content item synchronization agent 114-1 has begun (or finished) uploading content item block 'B' or begun (or finished) uploading content item block 'C' to the target block server.

For content item block(s) downloaded from a target block server for a new content item corresponding to a newer server journal entry 412 received at step 712 of the modified download process 700, steps 718 and 720 of the modified download process 700 may be performed for that new content item as described above with respect to the first example synchronization protocol operation.

For content item block(s) downloaded from a target block server for a new content item corresponding a pre-commit server journal entry received at step 712 of the modified download process 700, steps 718 and 720 of the modified download process 700 may be deferred for that new content item until the content item synchronization 114-2 receives another ping message as in step 702 of the modified download process 700 after the new content item has been committed to the online content management service. In this case, the content item synchronization agent 114-2 will receive at step 712 of the modified download process 700, a newer server journal entry 412 for the now committed content item, in response to the list request performed at step 708 of the modified download process 700, after receiving the ping message. Now, at step 714 of the modified download process 700, the content item synchronization agent 114-2 should be able to find any missing content item block(s) for the new content item in the pre-fetch cache as they have been previously downloaded according to the streaming download optimization. Thus, the content item synchronization agent 114-2 should not need to download any content item blocks for the new content item at step 716 of the modified download process 700. Steps 718 and 720 of the modified download process 700 may then be performed for the new content item as described above with respect to the first example synchronization protocol operation using any missing content item block(s) available in the pre-fetch cache when storing them as part of the new content item at step 718 of the modified download process 700.

5.2 Second Example Synchronization Protocol

For optimizations to the second example synchronization protocol to implement the streaming download optimization, the metadata server 150, at step 1016 of a modified upload process 1000, after determining that no candidate block server has all of the content item block(s) of the new content item specified in the first commit request, may add a new pre-commit server journal entry to the pre-commit server journal. However, for the second example synchronization protocol, the target block server may not be specified by the content item synchronization agent 114-2 in the first commit request if the content item synchronization agent 114-2 has not selected the target block server by the time the first commit request is sent. If a target block server is specified in the first commit request, then the new pre-commit server journal entry may specify the block server identifier of the target block sever. However, if a target block server is not specified by the content item synchronization agent 114-2 in the first commit request, then new pre-commit server journal entry may have an empty value or NULL value or other value for the block server identifier indicating that the target block server has not yet been selected. As an alternative, if a target block server is not specified in the first commit request, then a new pre-commit server journal entry may not be added by the metadata server 150 to the pre-commit server journal at step 1016 of the modified upload process 1000 and may be added later after a target block server has been selected by the content item synchronization agent 114-2.

At step 1020 of the modified upload process 1000, after selecting a target block server, the content item synchronization 114-2 may send a "pre-commit" request to the metadata server 150 specifying that a target block server has been selected. The pre-commit request may contain other pertinent information such as the content item namespace identifier of the owning content item namespace, the relative path for the new content item, and the content item block list for the new content item. In response to receiving the pre-commit request, the metadata server 150 can update the pre-commit server journal entry added to the pre-commit server journal in response to the first commit request with the block server identifier of the target block server. Alternatively, in response to receiving the pre-commit request, if a pre-commit server journal entry was not added to the pre-commit server journal in response to the first commit request, the metadata server 150 can add a new pre-commit server journal entry to the pre-commit server journal specifying the block server identifier of the target block server and the content item namespace identifier of the owning content item namespace, the relative path for the new content item, and the content item block list for the new content item.

At step 1032 of the modified upload process 1000, the metadata server 150 may remove a pre-commit server journal entry for a new content item from the pre-commit server journal after determining that there are no content item block(s) of the new content item missing from the target block server. Alternatively, if an identifier of the target block server is not specified in the second commit request, then the metadata server 150 may remove the pre-commit server journal entry after determining that at least one candidate block server stores all content item block(s) of the new content item. According to some example embodiments, a pre-commit server journal entry is automatically removed (i.e., expires) from the pre-commit server journal after a period of time has elapsed since adding the pre-commit server journal entry to the pre-commit server journal. This is done in case the modified upload process 1000 fails and the second commit request is never made. The presence of a pre-commit server journal entry in the pre-commit server journal for a new content item with a valid block server identifier identifying a target block server serves as a signal that the new content item is available for the streaming download optimization from that target block server. The remaining steps of the modified upload process 1000 may proceed as described above with respect to the second example synchronization protocol operation.

At step 1402 of a modified download process 1400, a pre-commit server journal entry in the pre-commit server journal with a valid block server identifier identifying a target block server is detected. The detection may be made in response to the pre-commit server journal entry being added to pre-commit server journal with the valid block server identifier or in response to the pre-commit server journal entry being modified in the pre-commit server journal to specify a valid block server identifier.

At step 1404 of the modified download process 1400, in response to the detection of the new pre-commit server journal entry, the notification server 140 sends a ping message to personal computing device 110-2 at which the owning content item namespace is mounted.

Steps 1406 and 1408 of the modified download process 1400 may proceed as described above with respect to the second example synchronization protocol operation.

At step 1410 of the modified download process 1400, the metadata server 150, when processing the list request, in addition to determining any newer server journal entries 1112 in server journal 1110 as described above, may also determine any relevant pre-commit server journal entries in the pre-commit server journal. In particular, for each of the content items associated with a current client journal cursor value in the list request, the metadata server 150 may determine one or more pre-commit server journal entries in the pre-commit server journal having a matching content item namespace identifier. Information of each such pre-commit server journal entry can be returned in the response to the list request at step 1414 of the modified download process 1400. A pre-commit server journal entry returned in the list request response may be identified as such to distinguish it from newer server journal entries 1112 returned in the list request response. For example, a pre-commit server journal entry returned in the response may not be associated with a journal cursor value while a newer server journal entry 1112 returned in the response may be associated with the server journal cursor value 1117 of the newer server journal entry 1112.

At step 1416 of the modified download process 1400, the content item synchronization agent 114-2 determines the content item block(s) identified by the content item block list(s) 1116 of the newer server journal entries 1112 that are missing from local storage 112-2 of the personal computing device 110-2 as described above with respect to the second synchronization protocol operation. In addition, for a pre-commit server journal entry received by the content item synchronization agent 114-2 at step 1414 of the modified download process 1400, the content item synchronization agent 114-2, as part of step 1416 of the modified download process 1400, may determine any content item block(s) of the new content item identified by corresponding content item block hash(es) in the pre-commit server journal entry that are missing at the personal computing device 110-2.

At part of step 1418 of the modified download process 1400, the content item synchronization agent 114-2 may download any such missing content item block(s) from the target block server identified in the pre-commit server journal entry to the personal computing device 110-2 for storage in the pre-fetch cache area of local storage 112-2.

For a given new content item corresponding to a pre-commit server journal entry received at step 1414 of the modified download process 1400, a content item synchronization agent (e.g., 114-2) at a personal computing device (e.g., 110-2) may be downloading a content item block of the new content item from the target block server at step 1418 of the modified download process 1400 while another content item synchronization agent (e.g., 114-1) at another personal computing device (e.g., 110-1) is uploading a different content item block of the new content item to the target block server at step 1022 of the modified upload process 1000. For example, assume a new content item is composed of three content item blocks with content item block hashes 'A', 'B', and 'C'. As part of the streaming download optimization, content item synchronization agent 114-2 may begin downloading content item block 'A' from a target block server before content item synchronization agent 114-1 has begun (or finished) uploading content item block 'B' or begun (or finished) uploading content item block 'C' to the target block server.

For content item block(s) downloaded from a target block server for a new content item corresponding to a newer server journal entry 1112 received at step 1414 of the modified download process 1400, steps 1420 and 1422 of the modified download process 1400 may be performed for that new content item as described above with respect to the first example synchronization protocol operation.

For content item block(s) downloaded from a target block server for a new content item corresponding to a pre-commit server journal entry received at step 1414 of the modified download process 1400, steps 1420 and 1422 of the modified download process 1400 may be deferred for that new content item until the content item synchronization 114-2 receives another ping message as in step 1402 of the modified download process 1400, after the new content item has been committed to the online content management service. In this case, the content item synchronization agent 114-2 will receive, at step 1414 of the modified download process 1400, a newer server journal entry 1412 for the now committed content item, in response to the list request performed at step 1408 of the modified download process 1400, after receiving the ping message. Now, at step 1416 of the modified download process 1400, the content item synchronization agent 114-2 should be able to find any missing content item block(s) for the new content item in the pre-fetch cache as they have been previously downloaded according to the streaming download optimization. Thus, the content item synchronization agent 114-2 should not need to download any content item blocks for the new content item at step 1418 of the modified download process 1400. Steps 1420 and 1422 of the modified download process 1400 may then be performed for the new content item as described above with respect to the second example synchronization protocol operation using any missing content item block(s) available in the pre-fetch cache when storing them as part of the new content item at step 1420 of the modified download process 1400.

6.0 PEER-TO-PEER OPTIMIZATION

In accordance with some example embodiments of the present invention, the synchronization protocol is modified to support peer-to-peer operations. In particular, at step 716 of download process 700 or at step 1418 of download process 1400, a content item synchronization agent at a personal computing device can download some or all of the missing content item block(s) from one or more "peer" personal computing devices, in addition to or instead of downloading some of the missing content item block(s) from one or more block servers. The peer-to-peer optimization to the synchronization protocol described herein can be used independently or in conjunction with the streaming download optimization described herein. Accordingly, any references in this section to modified upload process 200, modified download process 700, modified upload process 1000, and modified download process 1400 refer to the respective process with the peer-to-peer optimization as described herein and which may or may not also include the streaming download optimization.

Although not required, the peer-to-peer optimization may be especially useful in implementations where local storage space at an on-premises block server (e.g., 120) for storing content item blocks is limited or where the network connecting peer personal computing devices is higher bandwidth and/or lower latency than the network connecting those peer devices to an on-premises block server or the off-premises block sever 130.

According to some example embodiments of the present invention, the peer-to-peer optimization involves a discovery process and a peer-to-peer download process. The discovery process is performed by a content item synchronization agent at a personal computing device to discover other content item synchronization agents at other personal computing devices that are available to serve content item blocks to the discovering content item synchronization agent. Once a discovering content item synchronization agent has discovered another content item synchronization agent that is available to serve content item blocks to the discovering content item synchronization agent, then the discovering content item synchronization agent may download missing content item block(s) from the discovered content item synchronization agent in accordance with a peer-to-peer download process, which may be performed as part of a modified download process 700 or the modified download process 1400.

6.1 Discovery Process

Figure 16:
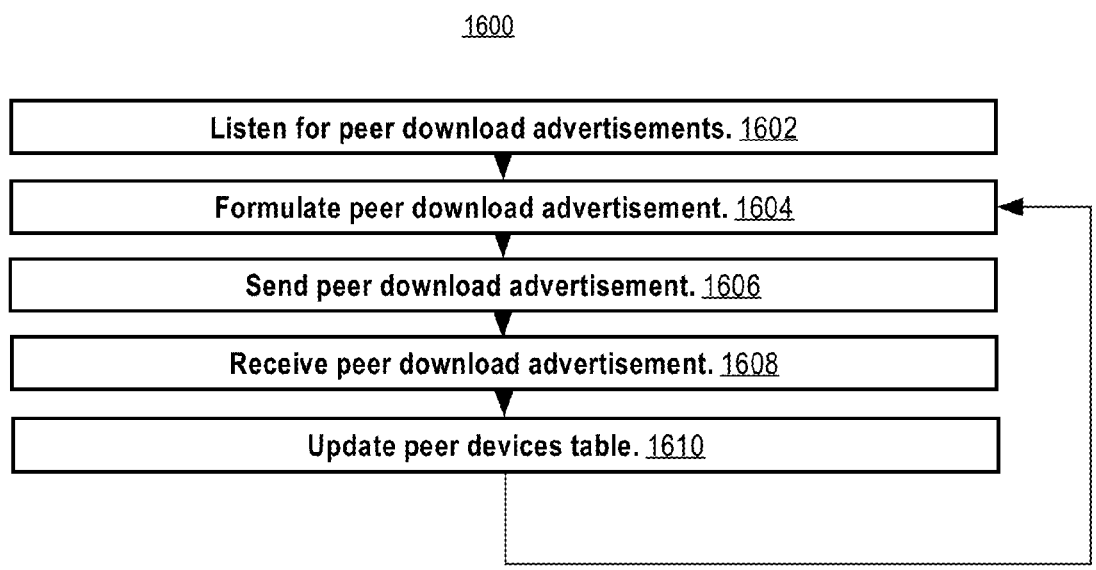
FIG. 16 is a flow diagram of a process for discovering peer personal computing devices, according to some example embodiments of the present invention.

Turning now to FIG. 16, it is a flow diagram of a process 1600 for discovering peer personal computing devices, according to some example embodiments of the present invention. According to some example embodiments, the process 1600 is performed by content item synchronization agents at personal computing devices. While steps are described below and depicted in FIG. 16 in a certain order, no particular order for the steps is required, unless explicitly stated or implied otherwise. Further, there is no requirement that all steps be performed separately in time, and some steps may be performed concurrently with each other or overlap each other in time. Further still, some steps may be omitted entirely and additional steps included according to the requirements of the particular implementation at hand.

The process 1600 will be explained by an example in which a "discovering" content item synchronization agent discovers an "advertising" content item synchronization agent. In the example, content item synchronization agent 114-1 at personal computing device 110-1 is considered the advertising content item synchronization agent and content item synchronization agent 114-2 at personal computing device 110-2 is considered the discovering content item synchronization agent. However, content item synchronization agent 114-2 can just as easily be considered the advertising content item synchronization agent and content item synchronization agent 114-1 considered to be the discovering content item synchronization agent. Further, a content item synchronization agent can be both an advertising and a discovering content item synchronization agent.

At step 1602, the discovering content item synchronization agent 114-2 listens for "peer download advertisements" on a networking port. In this context, a peer download advertisement by one content item synchronization agent serves to notify one or more other content item synchronization agents that receive the peer download advertisement that the advertising content item synchronization agent is available for peer-to-peer serving of content item blocks in accordance with the parameters of the peer download advertisement. A peer download advertisement may be made in accordance with a connection-oriented networking protocol (e.g., TCP) or a connectionless networking protocol (e.g., UDP). According to some example embodiments, the designated networking protocol is IANA port 17500 and peer download advertisements are made in accordance with a connectionless networking protocol (e.g., UDP).

At step 1604, the advertising content item synchronization agent 114-1 formulates a peer download advertisement. Formulation of the peer download advertisement may involve forming one or more networking data packets (e.g., forming a UDP packet) containing certain information.

6.2 Peer Download Advertisement

Figure 17:
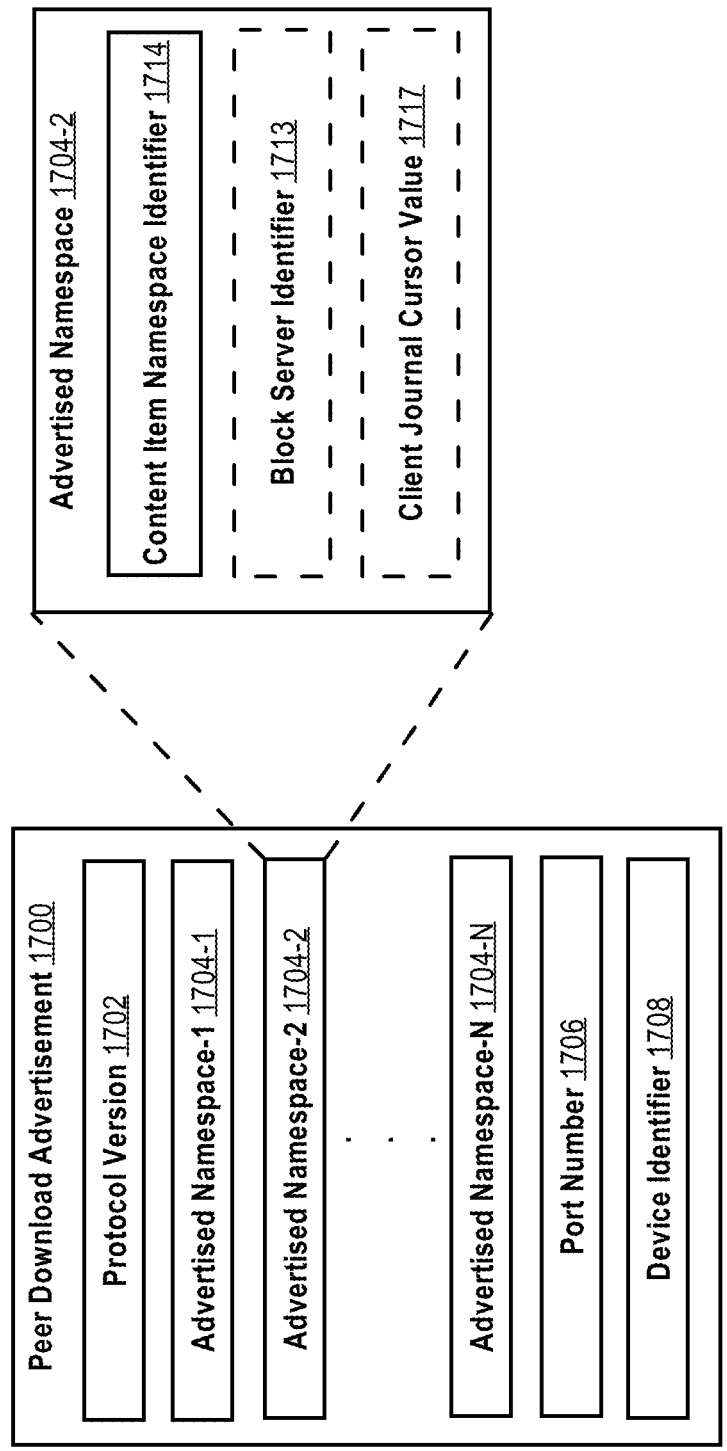
FIG. 17 is a block diagram of a peer download advertisement, according to some example embodiments of the present invention.

Turning briefly to FIG. 17, it is a block diagram of a possible peer download advertisement 1700, according to some example embodiments of the present invention. Among other information, a peer download advertisement 1700 may contain a protocol version 1702, one or more advertised content item namespaces 1704(1)-(N), a port number 1706, and a random identifier 1708. The protocol version 1702 identifies the version of the peer-to-peer synchronization protocol supported by the advertising content item synchronization agent 114-1.

Each advertised content item namespace (e.g., 1704-2) identifies a content item namespace mounted at the personal computing device 110-1 for which the content item synchronization agent 114-1 is available to serve content item blocks. At a minimum, each advertised content item namespace 1704 identifies 1714 the mounted content item namespace that it is advertising. An advertised content item namespace 1704 may also include the current client journal cursor value 1717 associated with the mounted content item namespace at the personal computing device 110-1. And if the current client journal cursor value 1717 is block server specific as in the first example synchronization protocol operation, then the advertised content item namespace 1704 may also include the block server identifier 1713 of the block server associated with the current client journal cursor value 1717 at the personal computing device 110-1. The current client journal cursor value 1717 received in an advertised content item namespace 1704 may be used by the discovering content item synchronization agent 114-2 as part of the peer-to-peer synchronization protocol as described below.

The network port number 1706 advertises the number of the network port on which the peer-to-peer synchronization protocol service is available at the personal computing device 110-1. The network port number 1706 may be used to advertise a port number that is different than a default port number (e.g., 17500) that is currently being used by another network service.

A device identifier 1708 may be used to identify the advertising personal computing device 110-1 that formulated the peer download advertisement and, more particularly, for the advertising content item synchronization agent 114-1 at the advertising personal computing device 110-1 to distinguish its own peer download advertisements from peer download advertisements sent by other personal computing devices among all of the peer download advertisements received at the personal computing device 110-1. For example, the device identifier 1708 may be a probabilistically unique sequence of characters generated by the advertising content item synchronization agent 114-1.

At step 1606, the advertising content item synchronization agent 114-1 sends the peer download advertisement 1700 formulated at step 1604 to the discovering content item synchronization agent 114-2. The peer download advertisement 1700 may be sent in one or more unicast, multicast, or broadcast network packets. In the case of multicast and broadcast, one or more other content item synchronization agents may also receive the peer download advertisement 1700, in addition to the discovering content item synchronization agent 114-2.

At step 1608, the discovering content item synchronization agent 114-2 receives the peer download advertisement 1700 sent by the advertising content item synchronization agent 114-1 at step 1606.

At step 1610, the discovering content item synchronization agent 114-2 updates a locally stored (e.g., in local storage 112-2 and/or in main memory 2806 of the personal computing device 110-2) "peer devices" table based on the received peer download advertisement 1700. The peer devices table may store a "peer device list" for each content item namespace mounted at the personal computing device 110-2. Each peer device list in the peer devices table may be keyed by the identifier of the content item namespace to which the peer device list corresponds.

6.3 Peer Devices Table

Figure 18:
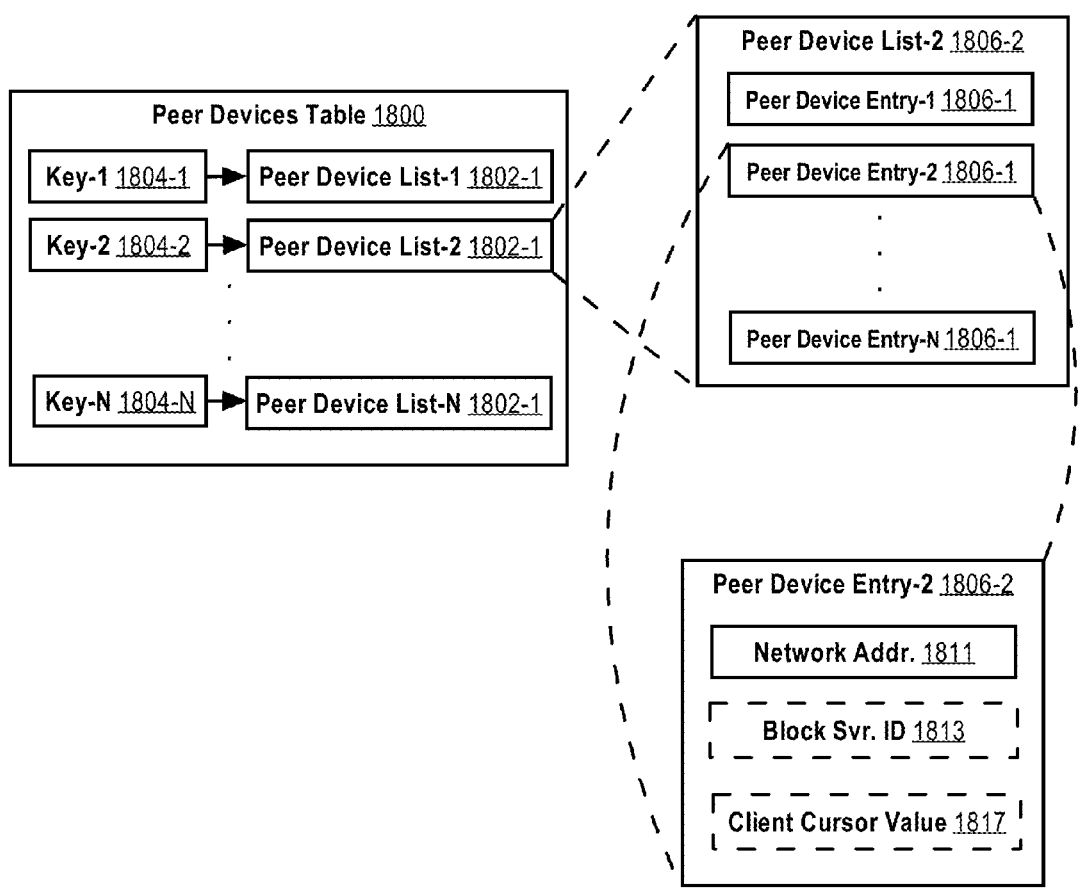
FIG. 18 is a block diagram of a peer devices table, according to some example embodiments of the present invention.

For example, FIG. 18 is a block diagram of a peer devices table 1800 according to some example embodiments of the present invention. The peer devices table 1800 includes one or more peer device lists 1802(1)-(N). There may be a peer device list 1802 in the peer devices table 1800 for each content item namespace mounted at the personal computing device 110-2. Each peer device list 1802 may be keyed in the peer devices table 1800 by a corresponding identifier 1804 of the mounted content item namespace to which the peer device list 1802 corresponds.

A peer device list 1802 may contain one or more peer device entries 1806(1)-(N). Each peer device entry 1806 of a peer device list 1802 represents a personal computing device at which the content item namespace corresponding to the peer device list 1802 is mounted. The peer devices entries 1806(1)-(N) in a peer device list 1802, if there is more than one peer device entry 1802 in the peer device list 1802, may be ordered within the peer device list 1802 according to priority. The priorities of peer device entries 1806 of a peer device list 1802 may be based on various criteria. In one implementation, the peer device entries 1806 of a peer device list 1802 are prioritized based on how recently a peer download advertisement was received from the personal computing devices represented by the peer device entries 1806 of the peer device list 1802. In particular, for the personal computing devices represented by the peer device entries 1806 of a peer device list 1802, the peer device entry 1806 representing the personal computing device from which a peer download advertisement was most recently received by the personal computing device 110-2 may be prioritized first, followed by the peer device entry 1806 representing the personal computing device from which the next most recently received peer download advertisement was received, and so on, with the lowest priority peer device entry 1806 representing the personal computing device from which the least recently received peer download advertisement was received. In another implementation, peer device entries 1806 of a peer device list 1802 are prioritized in order of their respective client journal cursor values 1817, with the peer device entry 1806 with the highest client journal cursor value 1817 is associated with the highest priority and the peer device entry 1806 with the lowest client journal cursor value 1817 is associated with the lowest priority. Prioritizing the peer device entries 1806 may be useful when the content item synchronization agent 114-2 selects one of the personal computing devices to attempt to download missing content item block(s) from, as described in greater detail below with respect to a peer-to-peer download process.

As shown in FIG. 18, each peer device entry 1806 of a peer device list 1802 may include a network address 1811 and optionally a block server identifier 1813 and a client journal cursor value 1817. The network address 1811 is for the personal computing device represented by the peer device entry 1806. The network address 1811 may be a hostname or an Internet Protocol (IP) address. The network address 1811 may be determined from the latest peer download advertisement received from the personal computing device represented by the peer device entry 1806, for example, from the peer network address of the personal computing device or from information contained in the peer download advertisement. A peer device entry 1806 may include a client journal cursor value 1817 and a block server identifier 1813 if the client journal cursor value 1817 is block server and content item namespace specific. If the client journal cursor value 1817 is not block server specific, then a peer device entry 1806 may omit a block server identifier 183. If present, the client journal cursor value 1817 represents how up-to-date the personal computing device represented by the peer device entry 1806 is with respect to changes to the content item namespace corresponding to the peer device list 1802 that have been committed to the online content management service. And if the client journal cursor value 1817 is block server specific, then the client journal cursor value 1817 represents how up-to-date the personal computing device represented by the peer device entry 1806 is with respect to changes to the content item namespace corresponding to the peer device list 1802 that have been uploaded to the block server identified by the block server identifier 1813 and committed to the online content management service. The client journal cursor value 1817 of a peer device entry 1806 may be used in accordance with a peer-to-peer download process as described in greater detail below during a modified download process 700 or a modified download process 1000 to determine whether an attempt should be made to download missing content item block(s) from the personal computing device represented by the peer device entry 1806.

As mentioned, at step 1610 of the discovery process 1600, the discovering content item synchronization agent 114-2 updates a locally stored peer devices table 1800 based on the received peer download advertisement 1700. In particular, for each advertised namespace 1704 of the peer download advertisement 1700, the content item synchronization agent 114-2 updates the corresponding peer device list 1802 in the peer devices table 1800 stored at the personal computing device 110-2. Such updating may include adding a new peer device list 1802 to the peer devices table 1800 or modifying an existing peer device list 1802 of the peer devices table 1800. A new peer device list 1802 may be added if there is currently no peer device list 1802 in the peer devices table 1800 for the content item namespace 1714 of the advertised namespace 1704. The added peer device list 1802 may be keyed 1804 by the content item namespace identifier 1714 of the advertised namespace 1704. The added peer device list 1802 may also contain a peer device entry 1806 having a network address 1811 for the advertising personal computing device 110-1. The peer device entry 1806 may also have, as the block server identifier 1813, the block server identifier 1713 of the advertised namespace 1704 and, as the client journal cursor value 1817, the client journal cursor value 1713 of the advertised namespace 1704. If there is an existing peer device list 1802 keyed 1804 by the content item namespace identifier 1704 of the advertised namespace 1704, then a similar peer device entry 1806 may be added to the existing peer device list 1802. If there is an existing peer device entry 1806 in the existing peer device list 1802 with the same network address 1811, then the existing peer device entry 1806 may be removed before adding the new peer device entry 1806 for the network address 1811. Alternatively, the existing peer device entry 1806 may be updated (e.g., the client journal cursor value 1817 updated) based on the advertised namespace 1704 as described above in the case of adding a peer device list 1802 with a single peer device entry 1806 for the advertised namespace 1704.

Process 1600 may be repeated over time. In particular, steps 1604, 1606, 1608, and 16010 may be repeated periodically so that the discovering content item synchronization agent 114-2 may keep its peer devices table 1800 up-to-date with respect to changes at advertising personal computing device 114-1 (and other peer computing devices) that are relevant to the peer-to-peer synchronization protocol. Relevant changes may include (a) when a content item namespace is mounted at the advertising personal computing device 114-1, (b) when a content item namespace is unmounted at the advertising personal computing device 114-1, and (c) when the current client journal cursor value for a content item namespace (or a content item namespace and a block server) is updated at the advertising personal computing device 114-1. Whenever any of these changes occur at the advertising personal computing device 110-1, the advertising content item synchronization agent 114-1 may send a peer download advertisement 1700 to discovering content item synchronization agent 114-2 (and other content item synchronization agent) reflecting the change. The advertising content item synchronization agent 114-1 may also, or as an alternative, send a new peer download advertisement 1700 periodically on a regular time interval such as, for example, every ten to twenty seconds. Each time a peer download advertisement 1700 is received, the discovering content item synchronization agent 114-2 may update its local peer devices table 1800 based on the received advertisement 1700.

6.4 Peer-to-Peer Download Process

Figure 19:
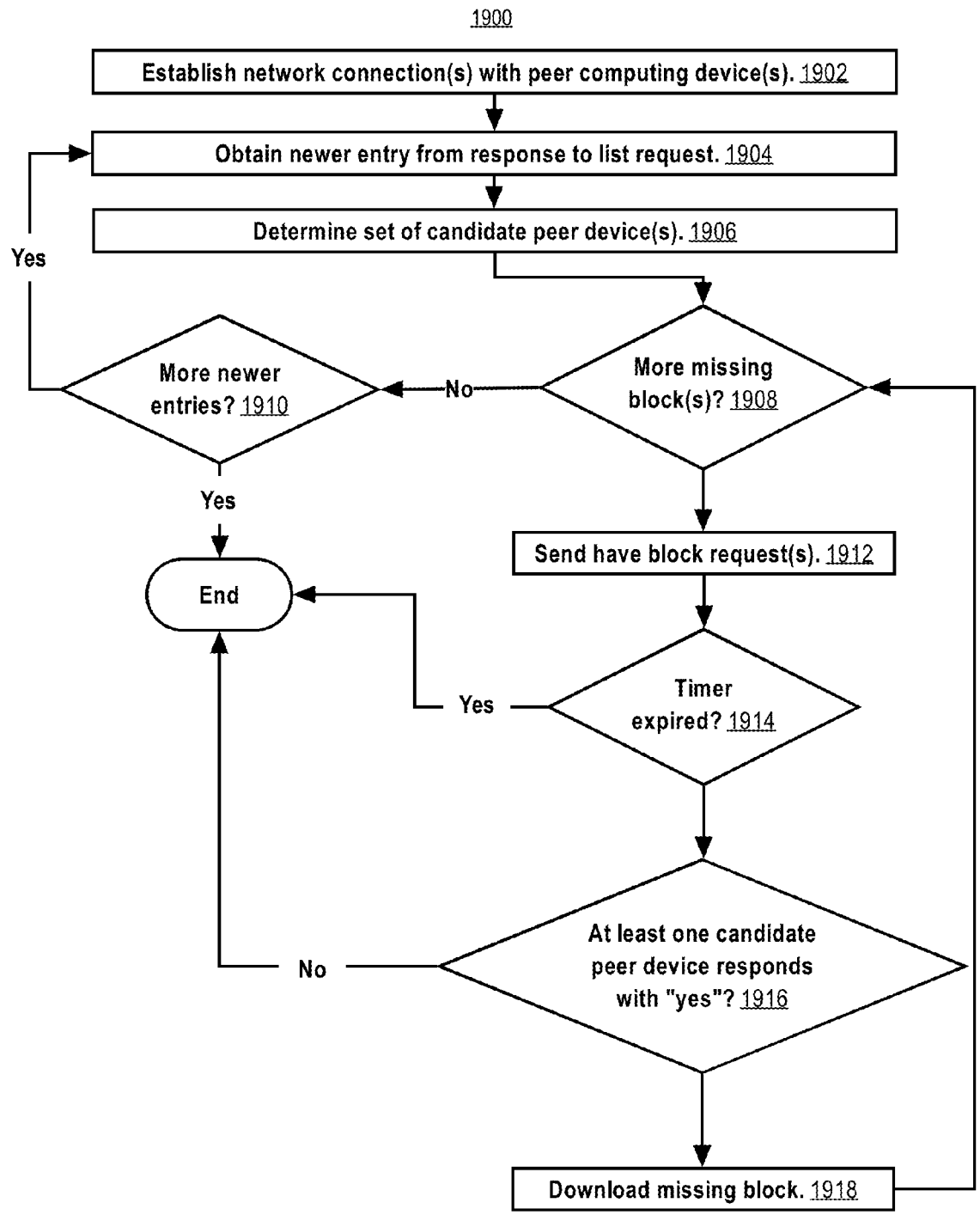
FIG. 19 is a flow diagram of a process for peer-to-peer download of missing content item blocks, according to some example embodiments of the present invention.

Turning now to FIG. 19, it is a flow diagram of a peer-to-peer download process 1900, according to some example embodiments of the present invention. Some steps of the process 1900 may be performed by a personal computing device (e.g., 110-2) as a sub-process of the download process 700 of the first example synchronization protocol operation, the download process 1400 of the second example synchronization protocol operation, or either of those processes as modified with the streaming download optimization. In particular, after the downloading personal computing device has determined one or more missing content item blocks at step 716 or step 1416, the downloading personal computing device may download some or all of the missing content item blocks from one or more peer personal computing devices, instead of downloading those missing content item blocks from one or more block servers.

As discussed above, at step 712 of download process 700, a personal computing device may receive one or more newer server journal entries 412 representing one or more content items to be created or updated at the personal computing device. Similarly, at step 1414 of download process 1400, a personal computing device may receive one or more newer server journal entries 1112 representing one or more content items to be created or updated at the personal computing device. If download process 700 or download process 1400 is modified with the streaming download optimization, then the personal computing device may also receive one or more pre-commit server journal entries at step 712 or step 1414, respectively. In all cases, each entry, whether a newer server journal entry 412, a newer server journal entry 1112, or a pre-commit server journal entry, corresponds to a new content item to be created or updated at the personal computing device and that (a) belongs to a content item namespace identified in the entry, (b) is composed of one or more content item blocks identified in the entry, one or more of which may be missing at the personal computing device, and (c) is associated with a server journal cursor value specified in entry. The server journal cursor value can be specific to the owning content item namespace or the combination of the owning content item namespace and a particular block server.

In the following description of the peer-to-peer download process 1900, reference is made to a "newer entry". Depending on whether the peer-to-peer download process 1900 is being performed in conjunction with download process 900 or download process 1400, and with or without the streaming download optimization, the newer entry may correspond to a newer server journal entry 412, a newer server journal entry 1112, or a pre-commit server journal entry.

At step 1902, content item synchronization agent 114-2 of personal computing device 110-2 establishes one or more network connections with one or more content item synchronization agents at one or more peer personal computing devices. Each such network connection may be established according to the Transmission Control Protocol (TCP) and may also be established in accordance with a cryptographic security protocol such as TLS or SSL. A network connection established between the content item synchronization 114-2 of personal computing device 110-2 and a content item synchronization agent of a peer personal computing device may be part of a network connection pool at the personal computing device 110-2 such that the network connection is reused over multiple peer-to-peer operations to avoid the overhead of establishing the network connection each time the network connection is needed for peer-to-peer operations.

According to some example embodiments, the content item synchronization agent 114-2 establishes a network connection with enough peer personal computing devices such that each content item namespace identified by a key 1804 in the peer devices table 1800 at the personal computing device 110-2 is served by at least one peer personal computing device. For example, the content item synchronization agent 114-2 may iterate over the keys 1804 in the peer devices table 180. For each key 1804, the content item synchronization agent 114-2 may attempt to establish a network connection with a content item synchronization agent at the network address 1811 of the highest priority peer device entry 1806 in the peer device list 1802 associated with that key 1804, if a network connection has not already been established with that content item synchronization agent. If the attempt is unsuccessful, then an attempt to establish a network connection with a content item synchronization agent at the network address 1811 of the next highest priority peer device entry 1806 in the peer device list 1802 may be made, and so on until a network connection is successfully established or there are no more peer device entries 1806 in the peer device list 1802.

The content item synchronization agent 114-2 may repeat step 1902 from time to time such as on a regular interval or on a periodic basis or after an event such as after an update to the peer devices table 1800.

At step 1904, the content item synchronization agent 114-2 obtains a newer entry corresponding to a new content item for which one or more content item blocks are missing at the personal computing device 110-2. As discussed above, depending on whether the content item synchronization agent 114-2 is performing step 1904 in conjunction with download process 900 or download process 1400, and with or without the streaming download optimization, the newer entry may correspond to a newer server journal entry 412, a newer server journal entry 1112, or a pre-commit server journal entry sent to the content item synchronization agent 114-2 by the metadata server 150 in response to a list request from the content item synchronization agent 114-2.

At step 1906, the content item synchronization agent 114-2 determines a set of one or more "candidate" peer personal computing devices that the content item synchronization agent 114-2 will attempt to download the missing content item block(s) of the new content item from. This determination may be based on information in the peer devices table 1800. In particular, using the content item namespace identifier of the newer entry as a key 1804 into the peer devices table 1800, the content item synchronization agent 114-2 obtains a reference to the peer devices list 1802 associated with the key 1804 in the peer devices table 1800. The content item synchronization agent 114-2 then determines, for each of one or more of the peer device entries 1806 of the peer device list 1802 associated with the content item namespace identifier of the newer entry, whether an attempt should be made to download the missing content item block(s) of the new content item from the peer personal computing device represented by the peer device entry 1806. If the content item synchronization agent 114-2 determines that an attempt should be made to download the missing content item block(s) from a given peer personal computing device, then the corresponding peer device entry 1806 is considered to be a "candidate" peer device entry 1806. Otherwise, the corresponding peer device entry 1806 is not considered a "candidate" peer device entry 1806.

According to some example embodiments, all of the peer device entries 1806 of the peer device list 1802 associated with the content item namespace identifier of the newer entry are considered to be candidate peer device entries 1806. In other example embodiments, less than all of the peer device entries 1806 of the peer device list 1802 are considered to be candidate peer device entries 1806. That is, a determination is made not to attempt to download the missing content item block(s) from the peer computing device(s) represented by one or more of the peer device entries 1806. In other words, the peer device entry 1806 is pruned from candidacy. Pruning a peer device entry 1806 may be based on a number of different criteria.

According to one criterion, a peer device entry 1806 is pruned from candidacy based on the server journal cursor value of the newer entry and the client journal cursor value 1817 of the peer device entry 1806. In particular, the peer device entry 1806 may be pruned if the client journal cursor value 1817 of the peer device entry 1806 is less than the server journal cursor value of the newer entry. In this case, according to client journal cursor value 1817 of the peer device entry 1806, the peer computing device represented by the peer device entry 1806 probably does not store the missing content item block(s) of the newer entry.

According to another criterion, a peer device entry 1806 is pruned from candidacy based on a mismatch between the block server identifier 1813 of the peer device entry 1806, if present, and the block server identifier of the newer entry. If there is a mismatch between these two identifies, this indicates a higher probability than if there is a match that the peer computing device represented by the peer device entry 1806 does not store the missing content item block(s) of the newer entry.

According to another criterion, a peer device entry 1806 is pruned from candidacy if a threshold number (e.g., three) of candidate peer device entries 1806 have already been determined.

According to another criterion, a peer device entry 1806 is pruned from candidacy if a network connection has not already been established between the content item synchronization agent 114-2 and a content item synchronization agent at the network address 1811 of the peer device entry 1806.

At step 1908, the content item synchronization agent 114-2 determines if there are more missing content item block(s) of the new content item to attempt to download from a peer computing device. If there are, then the process 1900 continues to step 1910. If not, then, at step 1910, the process 1900 returns to step 1904 to obtain the next newer entry, if there are more newer entries in the response to the list request to process according to the peer-to-peer download process 1900. If there are no more newer entries to process, then the process 1900 ends. Any newer entries in the response to the list request that are not processed by the peer-to-peer download process 1900 may be processed in accordance with the download process 700 or the download process 1400, and as possibly modified by the streaming download optimization, as described above.

At step 1912, the content item synchronization agent 114-2 sends a "have block" request to each of the candidate peer computing devices. The have block request may specify the content item block hash of a missing content item block as a parameter of the request. In conjunction with or after sending the request(s), the content item synchronization agent 114-2 may initiate a timer with a timeout value. The timeout value may be in the range of one to ten seconds, for example.

At step 1914, the content item synchronization agent 114-2 determines if the timer has expired before at least one of the candidate peer computing device(s) has responded to the have block request with a response that indicates that the missing content item block is available for download from the candidate peer computing device. If the timer has expired, then the process 1900 ends. For any missing content item block(s) of the new content item that the content item synchronization agent 114-2 is unsuccessful in downloading from a peer computing device, the content item synchronization agent 114-2 may attempt to download the missing content item block(s) from one or more block servers in accordance with the download process 700 or the download process 1400, and as possibly modified by the streaming download optimization, as described above.

If the timer has not yet expired, then at step 1916, the content item synchronization agent 114-2 determines if at least one of the candidate peer computing device(s) has responded to the have block request with a response that indicates that the missing content item block is available for download from the candidate peer computing device. If so, then the process 1900 proceeds to step 1918. Otherwise, the process 1900 returns to step 1912.

At step 1918, the content item synchronization agent 114-2 downloads the missing content item block from the candidate peer computing device by sending a retrieve request to the candidate peer computing device specifying the content item block hash of the missing content item block. The response to the retrieve request includes the requested content item block, if the content item block is stored at the candidate peer computing device, for example, in the pre-fetch cache, as part of a content item, or otherwise stored in local storage of the candidate peer computing device.

After downloading the missing content item block at step 1918, the process 1900 returns to step 1908 to download any other missing content item block(s) of the new content item. As mentioned previously, the content item synchronization agent 114-2 may attempt, as a fallback, to download any missing content item block(s) of the new content item from one or more block servers, in accordance with the download process 700 or the download process 1400, and as possibly modified by the streaming download optimization, as described above, that the content item synchronization agent 114-2 was unsuccessful in downloading from a peer computing device according to the peer-to-peer download process 1900.

7.0 CONTENT ITEM BLOCK REPLICATION

According to various example embodiments of the present invention, a content item namespace can be assigned to more than one block server. For example, a content item namespace may be assigned to one or more on-premises block servers and the off-premises block server or two or more on-premises block servers. When a new content item belonging to such a content item namespace is committed to the online content management service, the new content item block(s) of the new content item are uploaded to one or more of the block servers to which the content item namespace is assigned. However, a content item synchronization agent at a personal computing device may select to download missing content item block(s) of the new content item from an assigned block server that is different from one the new content item block(s) were uploaded to. For example, the content item synchronization agent may select an assigned block server that is closer on the network than a block server to which the missing content item block(s) were uploaded to.

According to some example embodiments of the present invention, to increase the availability of content item blocks at block servers to which a content item namespace is assigned, the block agents (e.g., 126) of on-premises block servers (e.g., 120), in co-operation with the online content management service, implement a content item block replication protocol. According to the content item block replication protocol, when new content item blocks of a new content item are uploaded to an on-premises block server, the on-premises block server can replicate the new content item blocks to other block servers that are assigned to the content item namespace to which the new content item belongs. Also according to the content item block replication protocol, when new content item blocks of a new content item are uploaded to the off-premises block server, the off-premises block server can replicate the new content item blocks to any on-premises block servers that are also assigned to the content item namespace to which the new content item belongs. In this way, new content item blocks of a new content item that are uploaded to a block server are made available at all block servers assigned to the content item namespace to which the new content item belongs.

Figure 20:
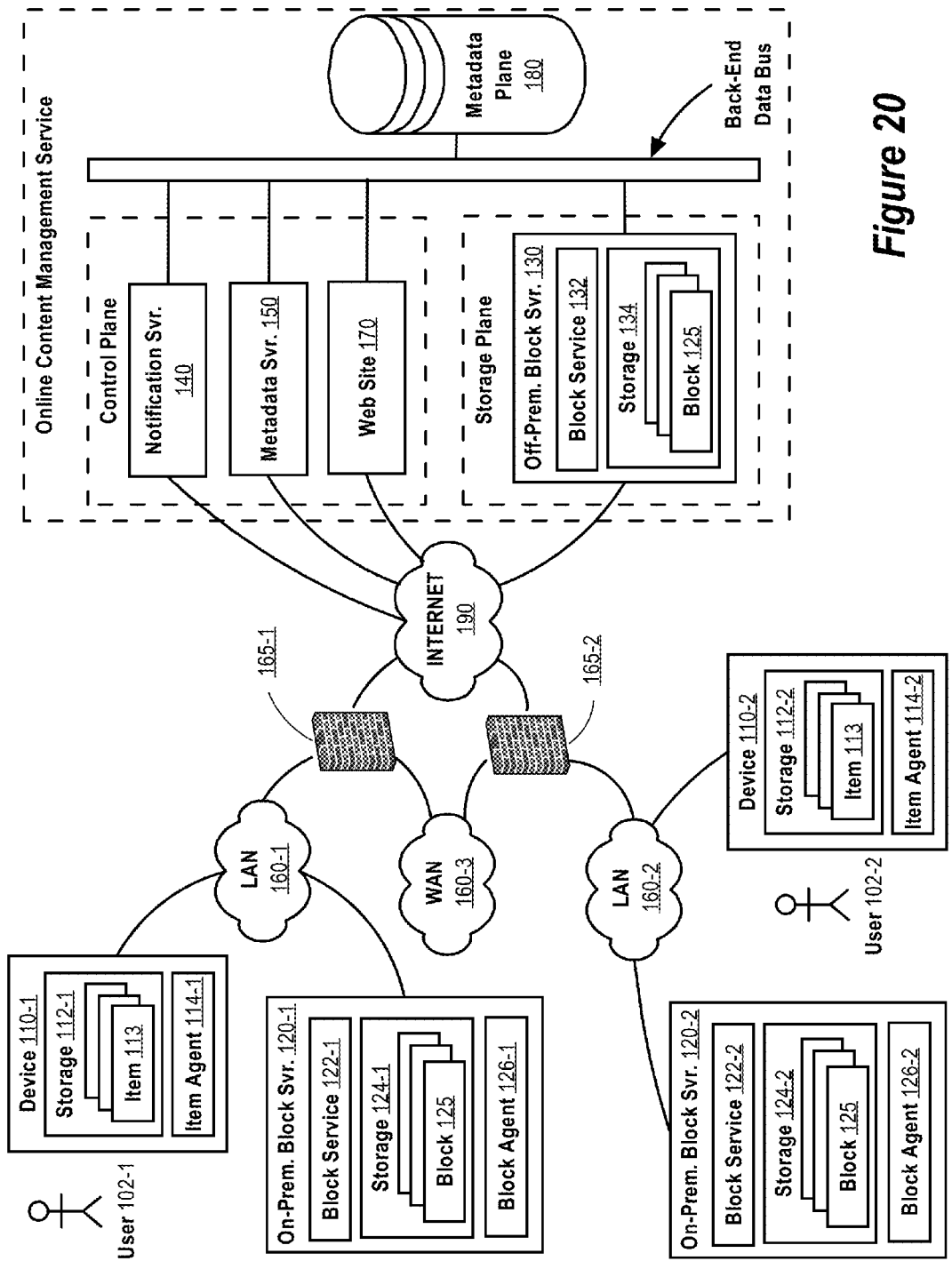
FIG. 20 is a block diagram of an example system environment in which some example embodiments of the present invention are implemented.

For example, referring now to FIG. 20, assume a certain content item namespace 'ABC123' is assigned to on-premises block server 120-1, on premises block server 120-2, and off-premises block server 130. On-premises block server 120-1 and on-premises block server 120-2 may be connected to the same local area network or different local area networks. In the example of FIG. 20, on premises block server 120-1 and on-premises block server 120-2 are connected to different local area networks, in particular, LAN 160-1 and LAN 160-2, respectively. On-premises block servers 120-1 and 120-2 and associated LANS 160-1 and 160-2 may be geographically distributed and do not necessarily reside in the same geographic area. For example, on-premises block server 120-1 and LAN 160-1 can be located in a company's San Francisco headquarters while on-premises block server 120-2 and LAN 160-2 can be located in the company's New York offices. Alternatively, on-premises block servers 120-1 and 120-2 and LANS 160-1 and 160-2 may be owned and operated by different businesses or organizations. For example, the content item namespace 'ABC123' may represent a shared folder that Company Alpha and Company Beta use for collaboration. Whether on-premises block servers 120-1 and 120-2 and LANS 160-1 and 160-2 are owned and operated by the same or different companies, with the content item block replication protocol, new content item blocks for a new content item in content item namespace 'ABC123' uploaded to on-premises block server 120-1 by personal computing device 110-1 are automatically made available for download by personal computing device 110-2 from on-premises block server 120-2 and off-premises block server 130. Similarly, new content item blocks for a new content item in content item namespace 'ABC123' uploaded to on-premises block server 120-2 by personal computing 110-2 are automatically made available for download by personal computing device 110-1 from on-premises block server 120-1 and off-premises block server 130. Additionally, new content item blocks for a new content item in content item namespace 'ABC123' uploaded to the off-premises block server 130 by either personal computing device 110-1 or personal computing device 110-2 are automatically made available for download from on-premises block server 120-1 and on-premises block server 120-2.

At a high-level, operation of the content item block replication protocol proceeds as follows. The block agent at each on-premises block server maintains a current client cursor value for each content item namespace assigned to the on-premises block server. The current client cursor value for a content namespace represents which server journal entries for the content item namespace the on-premises block server already knows about. The current client cursor value for a content item namespace is used by the block agent at an on-premises block server to determine which content item blocks of content items in the content item namespace stored at the on-premises block server should be offered to other block servers and which content item blocks of content items in the content item namespace stored at the off-premises block server should be downloaded to the on-premises block server.

The block agent at each on-premises block server may maintain a long-polling connection to the notification server (e.g., 140) of the online content management service. When a new content item in a content item namespace assigned to an on-premises block server is committed to the online content management service, a ping message may be sent to the on-premises block server over the long-polling connection, if the new content item blocks of the new content item were uploaded to the on-premises block server or the off-premises block server. For example, on-premises block server 120-1 may receive a ping message from the notification server 140 if new content item blocks of a new content item belonging to content item namespace 'ABC123' were uploaded to on-premises block server 120-1 or the off-premises block server 130.

In response to receiving a ping message from the notification server, an on-premises block server may make a "block server list" request of the metadata server (e.g., 150) of the online content management service. The block server list request may specify the current client cursor value for each content item namespace assigned to the on-premises block server. The block server list request may include other information such as a block server identifier of the on-premises block server sending the block server list request.

In response to receiving a block server list request from an on-premises block server, the metadata server may determine one or more newer server journal entries to send to the on-premises block server in a response to the block server list request. Each newer server journal entry corresponds to one of the content item namespaces assigned to the on-premises block server and specified in the block server list request. Each newer server journal entry for a content item namespace has a server journal cursor value that is greater than the current client cursor value specified by the on-premises block server for the content item namespace in the block server list request. Each newer server journal entry for a content item namespace corresponds to either a) content item blocks uploaded to the on-premises block server that the on-premises block server can offer to other block servers assigned to the content item namespace or b) content item blocks uploaded to the off-premises block server that the on-premises block server can download from the off-premises block server. The former type a) of newer server journal entry is referred to hereinafter as an "offer" newer server journal entry. The later type b) of newer server journal entry is referred to hereinafter as a "download" newer server journal entry. Processing of offer newer server journal entries and download newer server journal entries by an on-premises block server is described in greater detail below.

7.1 Replication Metadata

Figure 21:
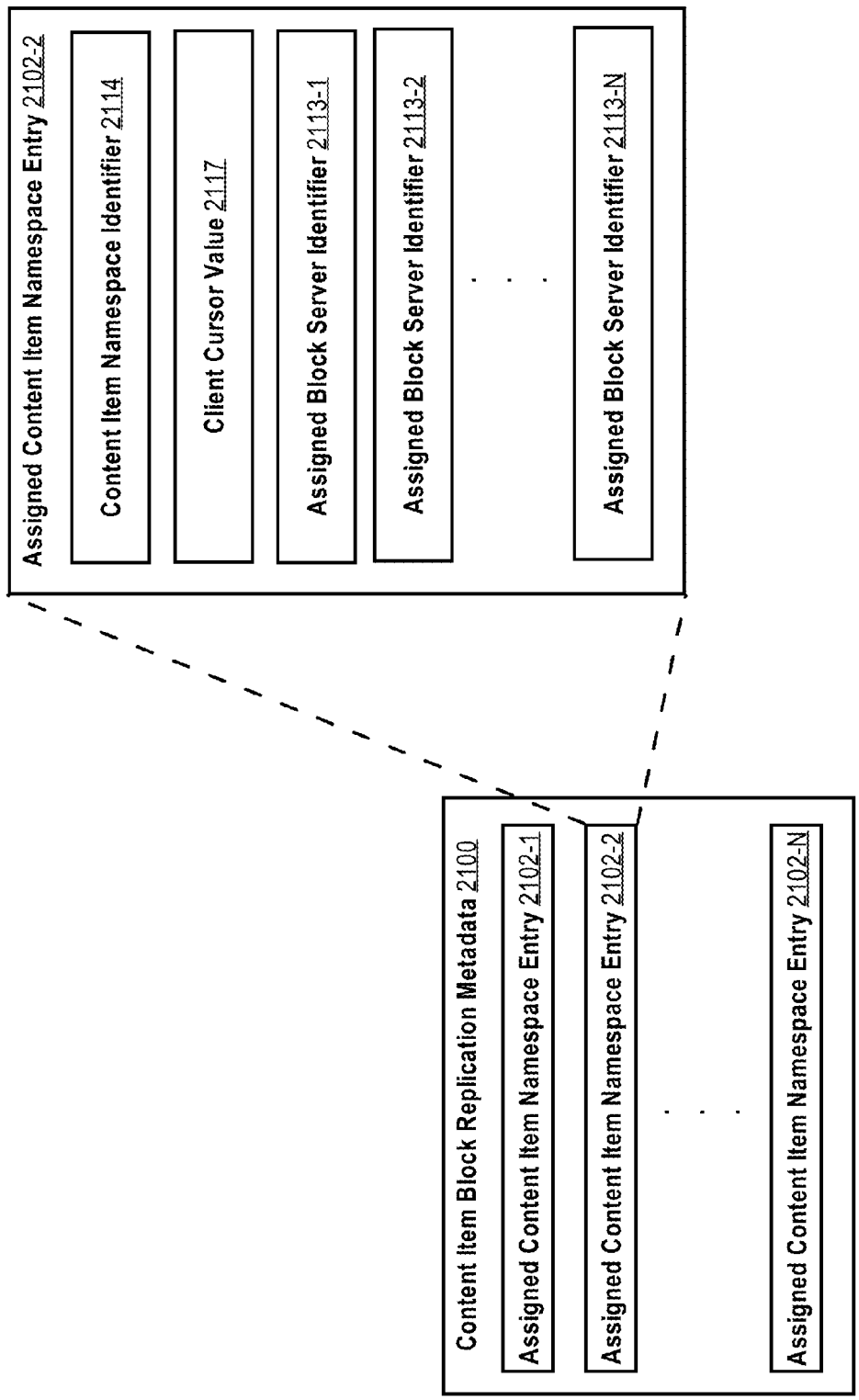
FIG. 21 is a block diagram of content item block replication metadata, according to some example embodiments of the present invention.

Turning now to FIG. 21, it is a block diagram of a content item block replication metadata 2100 that may be maintained by a block agent at an on-premises block server. The metadata 2100 may contain one or more assigned content item namespace entries 2102-1, 2102-2, . . . , 2102-N. Each entry 2102 represents a content item namespace assigned to the on-premises block server.

An entry 2102 may include an identifier 2114 of the content item namespace assigned to the on-premises block server. The entry 2102 may also include a current client cursor value 2117 for the content item namespace assigned to the on-premises block server. The current client cursor value 2117 represents the changes to content items in the content item namespace committed to the online content management service that the on-premises block server already knows about for content item block replication purposes. The entry 2102 may also include one or more assigned block server identifiers 2113-1, 2113-2, . . . , 2113-N. An assigned block server identifier 2113 identifies a block server assigned to the content item namespace.

The block agent at an on-premises block server may use maintained metadata 2100 as part of the content item block replication protocol as described in greater detail below.

7.2 Server Journal

Figure 22:
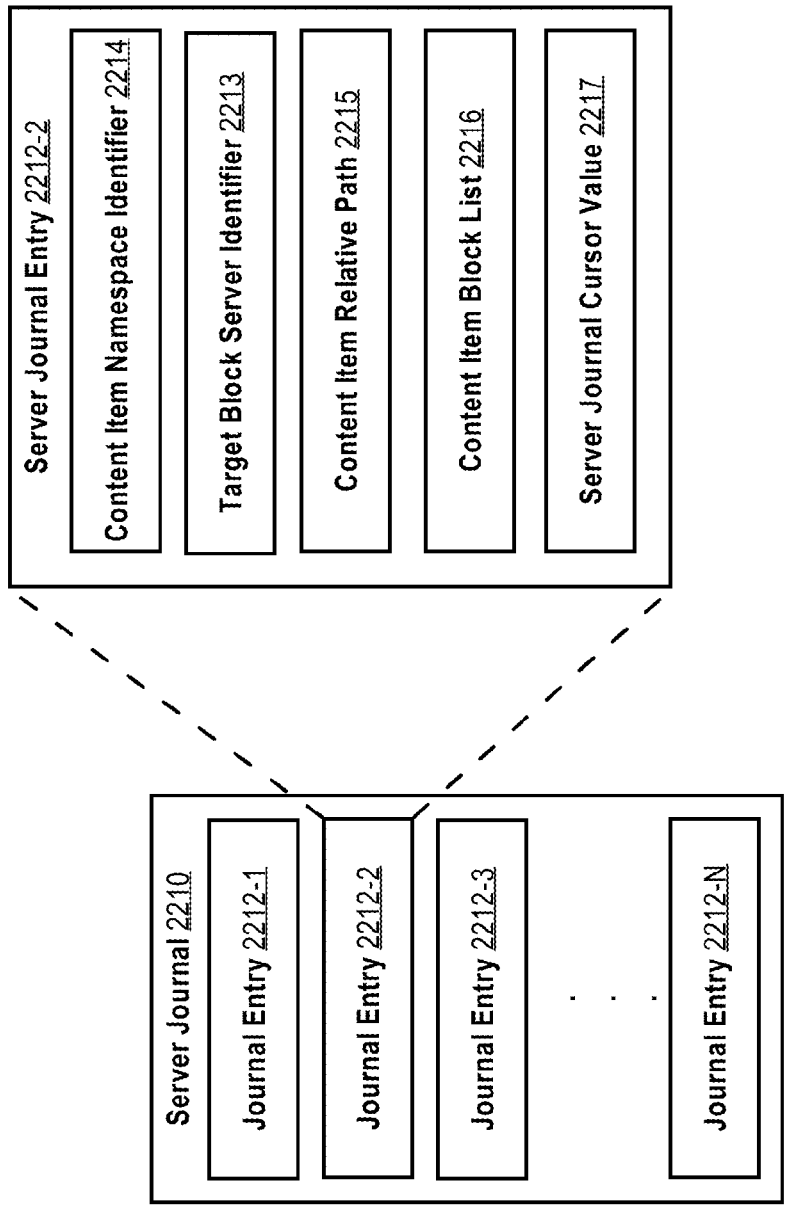
FIG. 22 is a block diagram of a content item server journal, according to some example embodiments of the present invention.

Turning now to FIG. 22, it is a block diagram of a content item server journal 2210 that may be maintained in the metadata plane of the online content management service by the metadata server. The server journal 2210 contains one or more server journal entries 2212-1, 2212-2, . . . , 2212-N. Each server journal entry 2212 represents a new content item committed to the online content management service. For example, a server journal entry 2212 may be added to the content item server journal 2210 by the metadata server 150 in response to receiving a second commit request as described above with respect to upload processes 200 and 1000.

A server journal entry 2212 may contain an identifier 2214 of a content item namespace to which the new content item represented by the server journal entry 2212 belongs. The server journal entry 2212 may also contain an identifier 2213 of the target block server the new content item blocks of the new content item were uploaded to. The target block server identifier 2213 may be specified in the second commit request from the content item synchronization agent as part of step 226 of upload process 200 or step 1028 of upload process 1000, for example. The server journal entry 2212 may also contain a relative path 2215 for the new content item. The server journal entry 2212 may also contain a content item block list for the new content item identifying the content item block(s) that make up the new content item. The server journal entry 2212 may also contain a server journal cursor value 2217. The server journal cursor value 2217 can be specific to the content item namespace identified 2214 in the entry 2212. Alternatively, the server journal cursor value 2217 can be specific to the combination of the content item namespace and the target block server identified (2214 and 2213, respectively) in the entry 2212.

7.3 Replication Log

According to some example embodiments of the present invention, an on-premises block server maintains a content item block replication log in local storage (e.g., 124-1) at the on-premises block server. The replication log stores one or more replication log entries. Each log entry represents a replication task for the block server of the on-premises block server. A replication task can involve either a) offering to send one or more content item blocks to one or more other block servers and sending one or more content item blocks to the block servers that accept the offer, or b) downloading one or more content item blocks from the off-premises block server.

Figure 23:
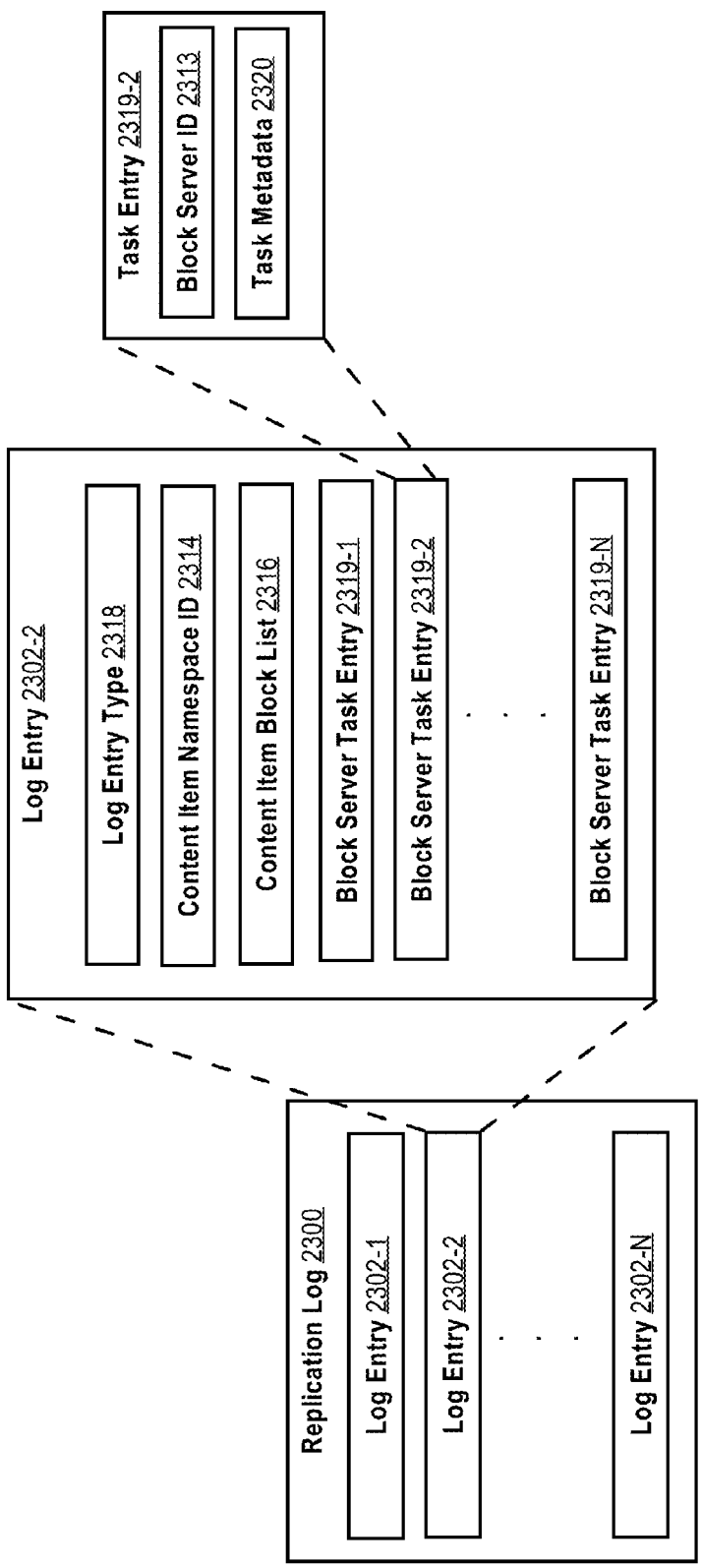
FIG. 23 is a block diagram of a content item block replication log, according to some example embodiments of the present invention.

Turning now to FIG. 23, it is a block diagram of a content item block replication log 2300 that may be stored locally at an on-premises block server. The replication log 2300 contains one or more replication log entries 2302. Each replication log entry 2302 corresponds to either an offer newer server journal entry or a download newer server journal entry determined by the metadata server 150. The block agent may add a replication log entry 2302 to the replication log 2300 for a newer server journal entry and each download newer server journal entry received from the metadata server 150.

A replication log entry 2302 may contain a replication log entry type identifier 2318, a content item namespace identifier 2314, a content item block list 2316, and one or more block server task entries 2319. The replication log entry type identifier 2318 indicates whether the corresponding newer server journal entry 2212 is an offer-type newer server journal entry or a download-type newer server journal entry. The content item namespace identifier 2314 corresponds to the content item namespace identifier 2214 of the corresponding newer server journal entry 2212. The content item block list 2316 corresponds to the content item block list 2216 of the corresponding newer server journal entry 2212. Each block server task entry 2319 represents a replication task to be performed by the block agent at the on-premises block server with another block server that is assigned to the content item namespace.

A block server task entry 2319 may identify 2313 another block server assigned to the content item namespace and contains task metadata 2320 related to performance of the replication task represented by the task entry 2319. The task metadata 2320 indicates whether the replication task has been completed or not. The task metadata 2320 may include other information such as the number of unsuccessful attempts to complete the replication task that have already been made, error codes and error messages related to unsuccessful attempts, and log messages reflecting replication task execution.

While in some example embodiments only on-premises block servers maintain a replication log, the off-premises block server 130 maintains a replication log in other embodiments in addition to or instead of an on-premises block server maintaining a replication log. In this case, a log entry in the replication log maintained by the off-premises block server can represent either a) a replication task for the off-premises block server 130 of offering to send one or more content item blocks to one or more off-premises block servers and sending one or more content item blocks to the off-premises block servers that accept the offer, or b) downloading one or more content item blocks from an off-premises block server.

7.4 Providing Replication Tasks

Figure 24:
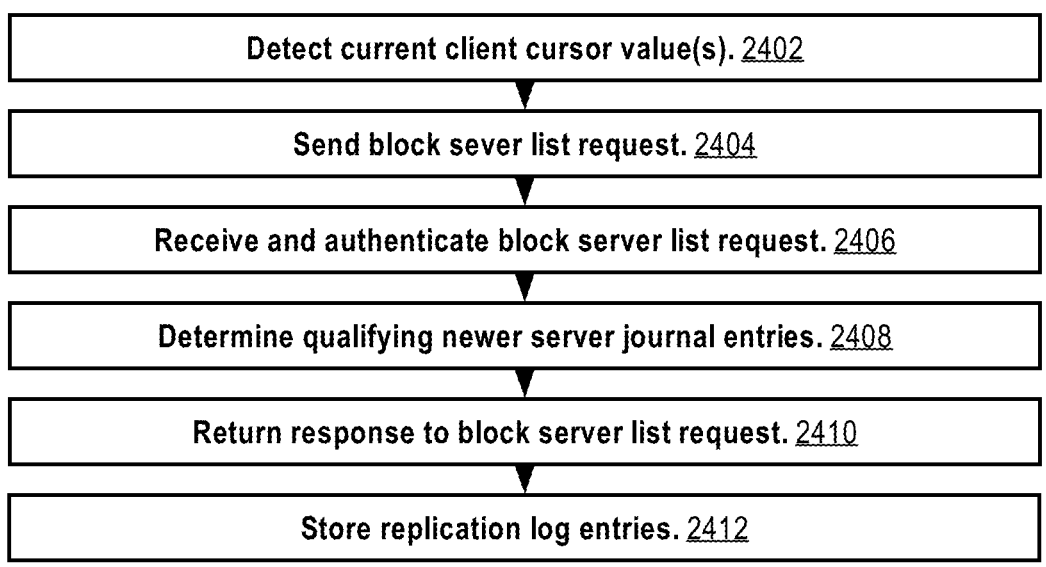
FIG. 24 is a flow diagram of a process for providing content item block replication tasks to an on-premises block server, according to some example embodiments of the present invention.

FIG. 24 is a flow diagram of a process 2400 for providing replication tasks to an on-premises block server (e.g., 120-1 or 120-2). The steps of the process 2400 are as follows. At step 2402, the block agent (e.g., 126-1 or 126-2) of the on-premises block server determines the current client cursor value (e.g., 2117) for each content item namespace assigned to the on-premises block server. As previously stated, this information may be stored as part of content item block replication metadata (e.g., 2100) stored at the on-premises block server. At step 2404, the block agent of the on-premises block server sends a block server list request to the metadata server (e.g., 150) of the online content management service. The block server list request contains the current client cursor values determined at step 2402 in association with the identifiers (e.g., 2114) of the content item namespaces to which they pertain. The block server list request may also contain a user account identifier (e.g., 312) identifying a user account that has been successfully authenticated against and a block server identifier identifying the on-premises block server making the block server list request.

At step 2406, the metadata server of the online content management service receives the block server list request and authenticates it. This may include accessing data in the metadata plane (e.g., 180) to verify that the user account identified in the block server list request is authorized to make block server list requests for the on-premises block server identified in the block server list request. If not, the metadata server may deny the block server list request thereby ending the process 2400. Authenticating the request may also include verifying that the content item namespace(s) identified in the block server list request are ones assigned to the block server identified in the request. For the remainder of the process 2400, the metadata server may ignore any content item namespaces identified in the block server list request that are not currently assigned to the on-premises block server.

At step 2408, the metadata server accesses a sever journal (e.g., 2210) in the metadata plane to determine any newer server journal entries for each content item namespace identified in the block server list request. This determination involves scanning the server journal starting at the newest server journal entry and scanning back through the server journal until all "qualifying" newer server journal entries have been collected for each content item namespace. According to some example embodiments, a qualifying newer server journal entry is one that has all of the following properties, or a subset or a superset thereof:

The content item namespace identified (e.g., 2214) in the server journal entry (e.g., 2212-2) is one of the content item namespaces identified in the block server list request;

More than one block server is assigned to the content item namespace;

The block server identified (e.g., 2213) in the server journal entry identifies either the block server making the block server list request or the off-premises block server (e.g., 130) of the online content management server; and The server journal cursor value (e.g., 2217) of the server journal entry is greater than the current client cursor value for the content item namespace specified in the block server list request.

At step 2410, the metadata server returns a response to the block server list request to the block agent of the on-premises block server. The response may include information from each qualifying newer server journal entry identified at step 2408. In particular, the information returned for each qualifying newer server journal entry may include all of the following information, or a subset or a superset thereof:

The content item namespace identifier of the qualifying newer server journal entry;

A replication task type indicator for the entry that varies depending on the target block server identifier of the qualifying newer server journal entry. In particular, if the target block server identifier of the qualifying entry identifies the block server that made the block server list request, then the replication task type indicator indicates that the replication task for the entry is the offer-type replication task. On the other hand, if the target block server identifier of the qualifying entry identifies the off-premises block server, then the replication task type indicator indicates that the replication task for the entry is the download-type replication task;

The content item block list (e.g., 2216) of the qualifying entry; or

The server journal cursor value of the qualifying entry.

At step 2412, the block agent of the on-premises block server receives the response to the block server list request from the metadata server and stores one or more replication log entries (e.g., 2302-2) in a replication log (e.g., 2300) at the on-premises block server. In particular, information for each qualifying newer server journal entry returned in the response is used to store a corresponding replication log entry in the replication log. For each content item namespace, the information for the qualifying newer server journal entries may be processed in increasing order of their server journal cursor values. For each qualifying newer server journal entry, a log entry type (e.g., 2318) based on the replication task type entry for the qualifying newer server journal entry, a content item namespace identifier (e.g., 2314) based on the content item namespace identifier of the qualifying entry, a content item block list (e.g., 2316) that is the content item block list of the qualifying entry, and one or more block server task entries (e.g., 2319-2).

A block server task entry may be created for each other block server assigned to the content item namespace identified in the log entry. For download replication task-type log entries, there may be just one block server task entry for the off-premises block server. For offer replication task-type log entries, a block server task entry may be created for each other block server assigned to the content item namespace.

The task metadata (e.g., 2320) of the block server task entry is initially set to indicate that the replication task is not yet complete. When a replication log entry is added to the replication log, the current client cursor value (e.g., 2117) for the content item namespace of the log entry in the corresponding assigned content item namespace entry (e.g., 2102-2) at the on-premises block server is set to equal the server journal cursor value of the corresponding qualifying entry. By doing so, the block agent will not receive information for the qualifying entry again in response to the next block server list request made by the block agent.

7.5 Processing Replication Tasks

Figure 25A:
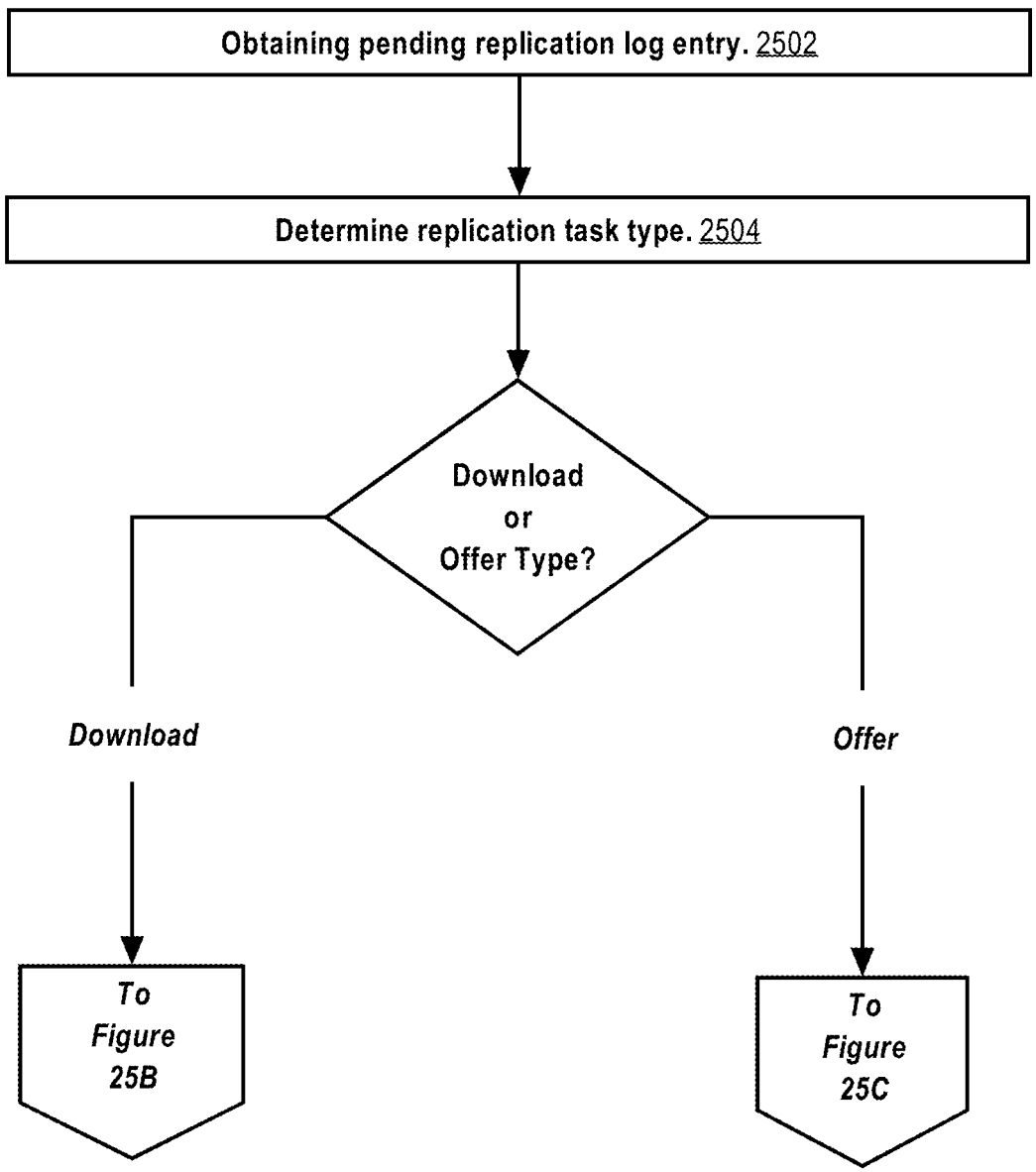
FIGS. 25A-C comprise a single flowchart illustrating operation of the block agent at an on-premises block server in processing replication tasks specified in a replication log stored at the on-premises block server, according to some example embodiments of the present invention.
Figure 25B:
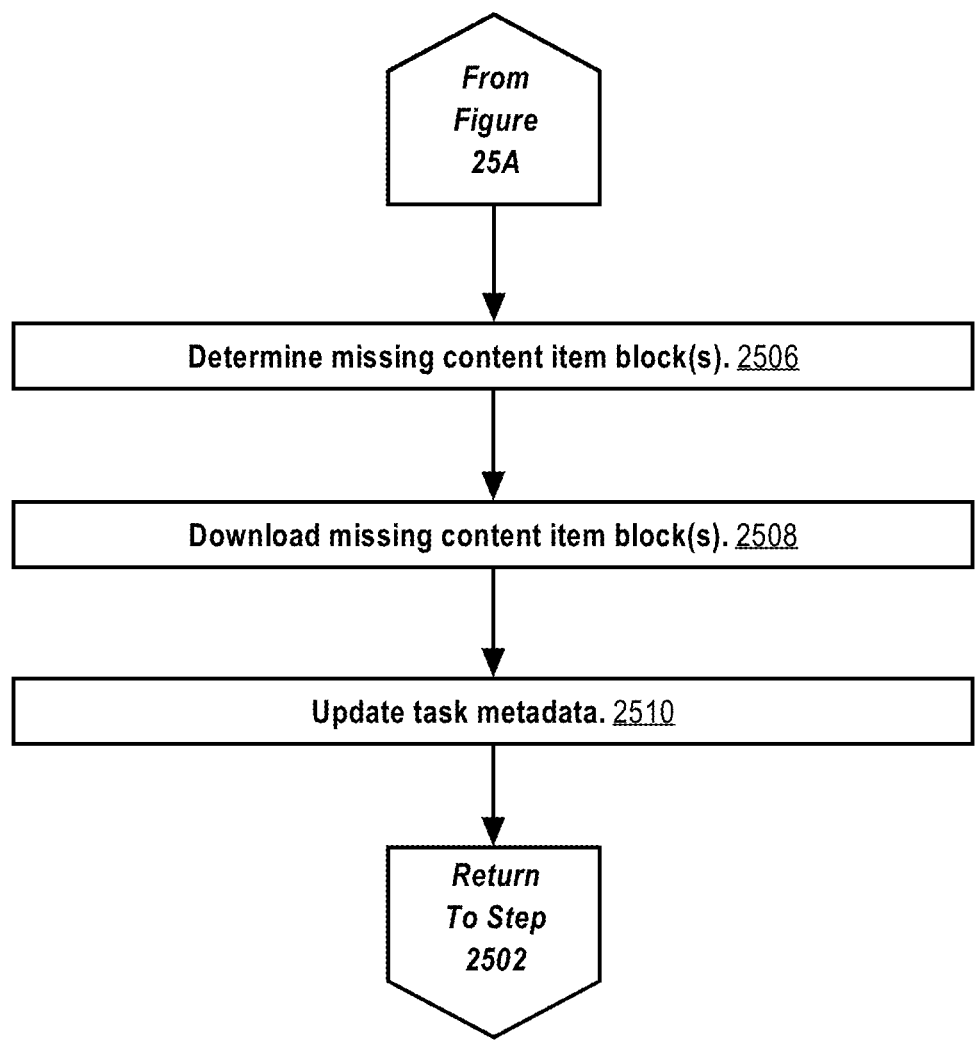
Figure 25C:
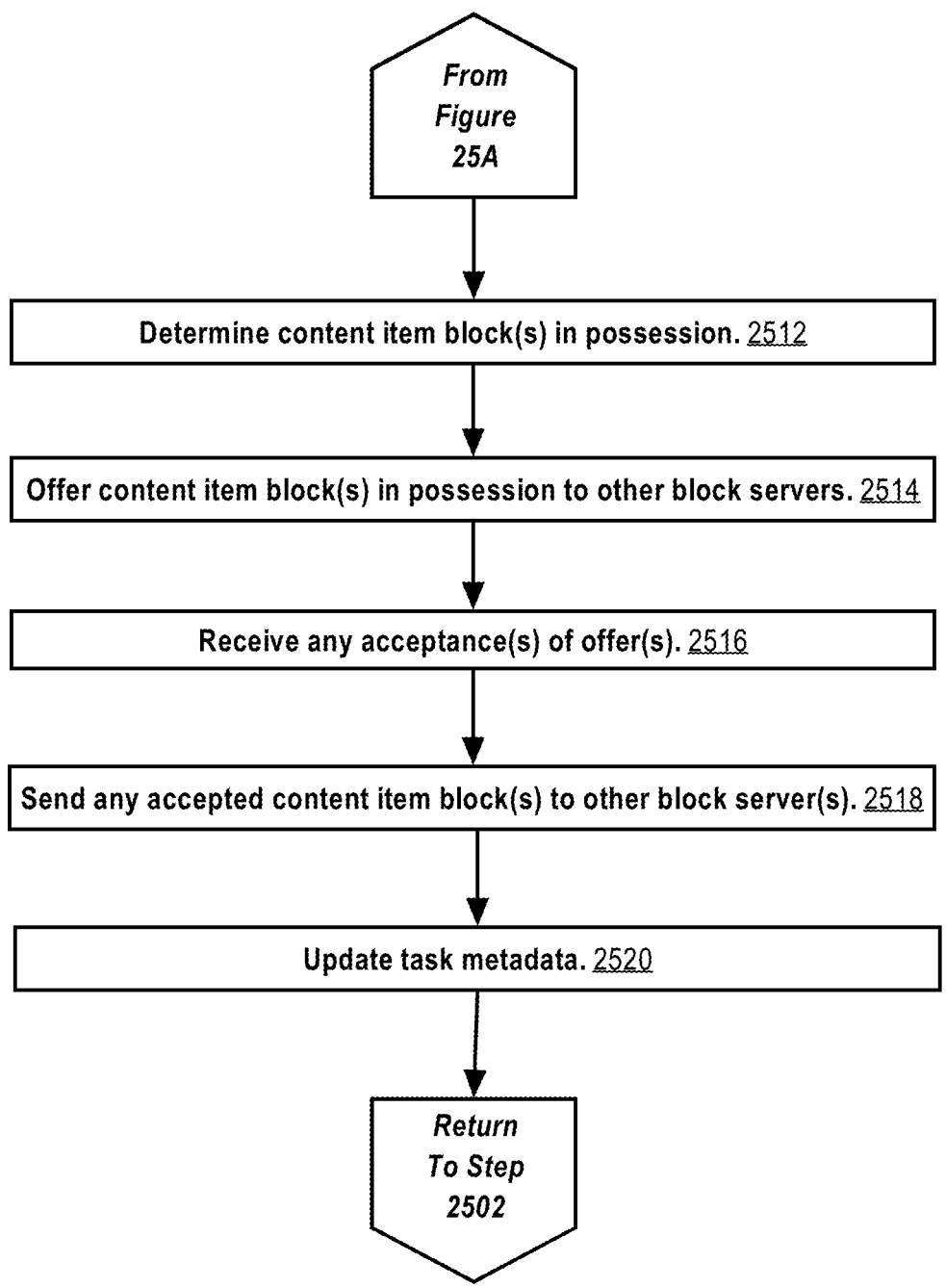

FIGS. 25A-C comprise a flow diagram 2500 illustrating operation of the block agent (e.g., 126-1) at an on-premises block server (e.g., 120-1) in processing replication tasks specified in a replication log (e.g., 2330) stored (e.g., in storage 124-1) at the on-premises block server. At step 2502, the block agent obtains a replication log entry (e.g., 2302-2) from the replication log. For example, the block agent may periodically scan the replication log for replication log entries that are pending.

A replication log entry may be pending if at least one of the block server task entries (e.g., 2319-2) of the replication log entry is pending. A block server task entry may be pending if indicated so by its task metadata (e.g., 2320). The task metadata of a block server task entry may indicate that the block server task entry is pending in a number of different ways. For example, the task metadata may contain a value or set of values that indicate that the block server task entry is pending or not complete. According to some example embodiments, the task metadata contains a value reflecting a number of attempts that the block agent has already made to complete the block server task entry. If the number is below or at a threshold, then the block server task entry is pending. If the number is above the threshold, then the block server task entry is not pending. By attempting to complete a block server task entry multiple times in the event of prior failures, greater resiliency and fault tolerance is provided.

At step 2504, the block agent determines the replication task type (e.g., 2318) of the pending log entry. The replication task type can be one of "download" or "offer". A download replication task type is performed by the block agent to download content item blocks uploaded to the off-premises block server (e.g., 130) that are not stored at the on-premises block server (i.e., are missing at the on-premises block server). An offer replication task type is performed by the block agent to offer to send content item blocks uploaded to the "offeror" on-premises block server to one or more other "offeree" block servers and send them to the other block servers that accept the offer.

An on-premises block server can only perform an offer replication task with another on-premises block server that it has a peering relationship with. A peering relationship between two on-premises block servers may exist if it is possible to establish a network connection between the block agents of the two on-premises block servers. It may not be possible to establish a network connection between two on-premises block servers because of a network firewall interposed on the network between the two on-premises block servers, or simply because there is no network that connects the two on-premises block servers. For example, referring briefly to FIG. 20, network firewall 165-1 or firewall 165-2 may prevent on-premises block server 120-1 and on-premises block server 120-2 from establishing a network connection between them over WAN 160-3 or Internet 190. Alternatively, network firewalls 165-1 and 165-2 may allow the block agents 126-1 and 126-2 to establish a network connection between them over WAN 160-3 but not Internet 190. Other network firewall configurations are possible. For example, network firewalls 165-1 and 165-2 may allow the block agents 126-1 and 126-2 to establish a network connection between them over WAN 160-3 or Internet 190. It should be noted that it is not necessary for a peering relationship to exist between a pair of on-premises block servers that both on-premises block servers of the pair be able to initiate establishment of a network connection between the on-premises block servers. For example, network firewalls 165-1 and 165-2 may allow block agent 126-1 at on-premises block server 102-1 to initiate establishment of a HTTPS connection over WAN 160-3 with block agent 126-2 at on-premises block server 102-1 but not vice versa.

According to some example embodiments, if an on-premises block server A does not have a peering relationship with on-premises block server B, then on-premises block server A may not store a block server task entry for on-premises block server B in its replication log when storing an offer-type replication log entry in the replication log. This is because, in the absence of a peering relationship, on-premises block server A cannot offer any content item blocks to on-premises block server B. The offer-type replication log entry may be omitted altogether from the replication log if all of the block server task entries of the replication log entry are for on-premises block servers that on-premises block server A does not have peering relationships with. This is because, in the absence of peering relationship, on-premises block server A cannot offer any of its content item blocks to any other on-premises block servers it does not have a peering relationship with. Alternatively, instead of omitting a block server task entry or a replication log entry in the absence of a peering relationship, a block server task entry for an on-premises block server can be stored as part of a replication log entry with task metadata that indicates that there is no peering relationship with the on-premises block server identified in the block server task entry.

If, at step 2504, the block agent determines that the pending replication log entry is a download type replication log entry, then the process 2500 proceeds to step 2506 (FIG. 25B). A download type replication log entry may contain a single block server task entry that identifies the off-premises block server of the online content management service. At step 2506, the block agent determines any missing content item blocks identified in the download-type replication log entry. This determination may be based on the content item block list (e.g., 2316) of the entry. At step 2508, the block agent downloads any missing content item blocks from the off-premises block server. At step 2510, depending on whether the download of missing content item blocks is successful, the block agent updates the task metadata of the block server task entry. For example, if not all of the content item blocks could be downloaded, then the block agent may update the task metadata to indicate so. For example, the block agent may increment an attempt counter that tracks the number of attempts that have been made to successfully download all of the missing content item blocks. On the other hand, if the block agent was successful at downloading all of the missing content item blocks, then task metadata may be updated to indicate that the block server task entry is no longer pending. After step 2510, the process 2500 may return to step 2502 to process the next pending replication log entry.

On the other hand, if, at step 2504, the block agent determines that the pending replication log entry is an offer type replication log entry, then the process 2500 proceeds to step 2512 (FIG. 25C). At step 2512, the block agent determines which of the content item blocks identified in the pending replication log entry that the on-premises block server is in possession of (i.e., are stored at the on-premises block server). This determination may be based on the content item block list of the log entry. All content item blocks identified in the content item block list of the log entry should be stored at the on-premises block serer, unless some or all of the content item blocks have been deleted or removed from the on-premises block server. For example, content item blocks may be deleted or removed from the on-premises block server according to a least recently used scheme (e.g., least recently downloaded or least recently uploaded).

At step 2514, the block agent sends an offer request to each other block server identified in a pending block server task entry of the pending replication log entry that the offeror on-premises block server has a peering relationship with. It may be assumed in some implementations that the offeror on-premises block server has a peering relationship with the off-premises block server. The offer request may identify the content item block(s) that are offered. In particular, the offer request may include the content item block hashes of the content item blocks identified in the pending replication log entry that the offeror on-premises block server is in possession of. The offer request may be sent over a network connection (e.g., a HTTPS connection) established between the block agent at the offeror on-premises block server and the block agent at an offeree block server.

At step 2516, the block agent at the offeror on-premises block server receives any acceptance responses sent by the offeree block server(s) in response to receiving an offer request from the offeror on-premises block server. Each acceptance response from an offeree block server may identify one or more of the offered content item blocks that are currently not stored at the offeree block server (i.e., are missing at the offeree block server). Any missing content item block(s) can be identified in the acceptance response by the content item block hash(es) of the missing content item block(s). An acceptance response from an offeree block server may also indicate that none of the offered content item blocks are missing at the offeree block server.

At step 2518, the block agent at the offeror on-premises block server sends (uploads) any missing content item block(s) at the offeree block server(s). In particular, for a given acceptance response from an offeree block server, the block agent at the offeror on-premises block server sends (uploads) any missing content item block(s) identified in the acceptance response from the offeree block server.

At step 2520, the block agent at the offeror on-premises block server updates the task metadata of the pending block server task entries of the pending log entry. In particular, if an acceptance response was received from an offeree block server corresponding to a block server task entry, then the task metadata of the block server task entry is updated depending on whether all missing content item block(s) were successfully sent to the offeree block server or whether the acceptance response indicated the no content item blocks are missing at the offeree block server. In either case, the task metadata may be updated to indicate that the block server task entry is no longer pending. On the other hand, if an acceptance response was not received or there was a failure in sending (uploading) a missing content item block to the offeree block server, then an attempt counter of the task metadata may be incremented, in which case the block server task entry may remain pending. After step 2520, the process 2500 may return to step 2502 to process the next pending replication log entry.

8.0 DELETING CONTENT ITEM BLOCKS

Typically, it is expected, but not required, that an on-premises block server (e.g., 120) will have significantly less local data storage space in its local storage (e.g., 124) than the off-premises block server (e.g., 130) has in its local storage (e.g., 134). For example, the total local storage at an on-premises block server may be on the order of one to a few terabytes while the total local storage at the off-premises block server may on the order of eight (8) zettabytes. Thus, the off-premises block server may have up to a billion times more storage space than a given on-premises block server. Even though a given on-premises block server may have many fewer content item namespaces assigned to it than the off-premises block server, the on-premises block server may still not have enough local storage space to store all content item blocks of all of the content items in all of the content item namespaces assigned to the on-premises block server.

According to some example embodiments, content item blocks locally stored at an on-premises block server are deleted or removed from the local storage to make local storage space at the on-premises block server available for other content item blocks. For example, the other content item blocks might be content item blocks that are being uploaded or are about to be uploaded or that will be uploaded to the on-premises block server.

Various different approaches may be employed to determine which content item blocks to delete or remove. According to some example embodiments, a least recently used (LRU) approach is employed. According to the LRU approach, if the amount of local storage space at an on-premises block server consumed by content item blocks does not satisfy a threshold, then one or more least recently used content item blocks are deleted or removed from local storage. The threshold can be based on a percentage of the total local storage space for content item blocks at the on-premises block server. Here, total local storage space refers to the current maximum total amount of storage space available for storing content item blocks irrespective of whether some or all of that storage space is currently used for storing content item blocks. If the current consumption amount is greater than the percentage, then the current consumption amount does not satisfy the threshold. The threshold can instead be based on the current maximum local storage space amount that remains after subtracting the amount of storage space currently used by content item blocks stored in the local storage. In this case, if the local storage space remaining after accounting for the current consumption amount is less than a threshold amount, then the current consumption amount does not satisfy the threshold.

A determination of whether the current consumption amount does or does not satisfy the threshold can be made at various different times. One possible time is when one or more content item blocks are uploaded to the on-premises block server. In particular, if the current consumption amount with the uploaded content item block(s) stored in local storage does not satisfy the threshold, then one or more content item blocks may be deleted or removed from the local storage according to the LRU approach.

A content item block stored in local storage may be considered to be least recently used based on its most recent upload time and/or its most recent download time. The most recent upload time for a content item block reflects a time at which the content item block was most recently uploaded to the on-premises block server. For example, the content item block stored in local storage that, according to the most recent upload time for the content item block, was least recently uploaded to the on-premises block server may be deleted or removed. The most recent download time for a content item block reflects a time at which the content item block was most recently downloaded from the on-premises block server. For example, the content item block stored in local storage that, according to the most recent download time for the content item block, was least recently download from the on-premises block server may be deleted or removed. The on-premises block server may store and maintain metadata that reflects the most recent upload and download times for content item blocks stored at the on-premises block server.

According to some example embodiments, a qualified LRU approach is used. According the qualified LRU approach, a content item block that qualifies for deletion or removal according to the LRU approach discussed above, is not deleted or removed unless additional conditions are met.

One possible additional condition is that the content item block that is a candidate for deletion or removal be stored at one or more other block servers, either the off-premises block server, one or more other on-premises block servers, or one or more other on-premises block server and the off-premises block server. If the candidate content item block is stored only at the on-premises block server at which it is a candidate for deletion or removal, then the content item block may not be deleted or removed in order to preserve the potentially only copy of the content item block.

Another possible condition is that the content item block that is a candidate for deletion or removal belongs to a content item that belongs to a content item namespace that is assigned to at least one other block server in addition to the on-premises block server at which the content item block is a candidate for deletion. If the content item namespace is assigned only to the on-premises block server at which the content item block is a candidate for deletion or removal, then the content item block may not be deleted or removed in order to preserve the potentially only copy of the content item block.

Another possible condition is that the content item block is specially marked as a "sticky" content item block. A sticky content item block is a content item block that is not deleted or removed until all non-sticky content item blocks have been deleted or removed. Designating content item blocks as sticky can help prevent deletion or removal of a content item block that is important or relatively more likely to be downloaded in the future. A content item block may be designated as sticky based on a content item namespace with which it is associated. In particular, a content item namespace may be designated as sticky by a user of the online content management service through a graphical user interface provided by the online content management service (e.g., via web site 170). Alternatively, a content item namespace may be automatically designated as sticky based on characteristics and usage of the content item namespace. For example, if a content item namespace is shared among a large number of users (e.g., ten or more), then the content item namespace may be automatically designated as sticky. This is useful to prevent the deletion or removal of content item blocks that are shared among a large number of users. In some example embodiments, a shared content item namespace is designated sticky only if there has been recent user activity in the content item namespace. This is useful to prevent retaining content item blocks that have not recently been used. Recent activity may include recently (e.g., within the past day, week, month, or year) downloading, uploading, or accessing a content item belonging to the content item namespace. A content item namespace designated as sticky as a first time may automatically no longer be designated as sticky at a later second time if the condition for designating the content item namespace as sticky no longer exists. For example, if a content item namespace designated as sticky based on recent activity at a first time no longer has recent activity at a later second time, then, at or after the second time, the content item namespace may no longer be designated as sticky. An on-premises block server may store and maintain metadata that indicates which locally stored content item blocks and/or assigned content item namespaces are designated as sticky.

According to some embodiments, there are multiple levels of stickiness and content item blocks are deleted or removed according to the qualified LRU approach in order of their level of stickiness. For example, there may be three levels of stickiness A, B, and C where level C is lower than level B and level B is lower than level A. In this case, the content item blocks that are not designated at any level of stickiness are deleted or removed before the first content item block at level C is deleted or removed. Content item blocks at level C are deleted or removed before the first content item block at level B is deleted or removed. Content item blocks at level B are deleted or removed before the first content item block at level A.

9.0 CONTENT ITEM BLOCK REPLICATION WHEN ASSIGNMENT OCCURS

A content item namespace can be assigned to a block server to which it is not currently assigned. For example, a content item namespace may be assigned to just the off-premises block server 130. Then, at a later time, the content item namespace may be assigned to the off-premises block server 130 and on-premises block server 120-1. Then, at a later time still, the content item namespace may be assigned to the off-premises block server 130, on-premises block server 120-1, and on-premises block server 120-2. As another example, a content item namespace may be assigned to on-premises block server 120-1 and then, later, assigned to the off-premises block server 120-1 and the off-premises block sever 130. Thus, the set of block servers to which a content item namespace is assigned at one time may be different than the set of block servers to which the content item namespace is assignment at another time.

When a content item namespace is assigned to a new block server, the block server may store only some or none of the content item blocks that make up the content items that belong to the content item namespace. As a result, a content item synchronization agent at a personal computing device may not be able to download from the block server a content item block of a content item in the content item namespace.

According to some example embodiments of the present invention, when a content item namespace is assigned to a new block server in a situation where the content item namespace is currently assigned to one or more other block servers, content item blocks of content items in the content item namespace are replicated to the new block server from the other block server(s). For example, if content item namespace 'ABC123' is assigned to off-premises block server 130 and then later is assigned to on-premises block server 120-1, then on-premises block server 120-1 can download from on-premises block server 130 content item blocks that make up content items in the 'ABC123' content item namespace. As another example, if content item namespace 'DEF456' is assigned to on-premises block server 120-1 and then later assigned to on-premises block server 120-2, then on-premises block server 120-1 can offer and send to on-premises block server 120-2 content item blocks that make up content items in the 'DEF456' content item namespace.

According to some example embodiments, when a content item namespace that is currently assigned to one or more block servers is assigned to a new block server, content item blocks are replicated from the currently assigned block server(s) to the new block server in accordance with the content item block replication protocol described above. In particular, the block server identifier of the new block server is added as an assigned block server identifier 2113 to the assigned content item namespace entry 2102 for the content item namespace in the content item block replication metadata 2100 maintained at each of the currently assigned on-premises block server(s) and the new block server. For example, the block agent at each of the currently assigned on-premises block server(s) and the new block server may add this information to the locally stored content item block replication metadata 2100 based on information it receives from the metadata server 150. For example, the block agent at a currently assigned on-premises block server and the new block server may receive this information from the metadata server 150 in the response to a block server list request. For example, after the content item namespace is assigned to the new block server, the notification server 140 may send a ping message to the block agent at each of the currently assigned on-premises block servers and the new block server. Responsive to receiving the ping message, the block agent at a currently assigned on-premises block server and the new block server may send a block server list request to the metadata server 150 and receive from the metadata server 150 in the response to the block server list request that the content item namespace is now assigned to the new block server.

The block agent at each of the currently assigned on-premises block server(s) may then scan its replication log 2300 for offer-type log entries 2302 with a content item namespace identifier 2314 that matches the identifier of the content item namespace newly assigned to the new block server and with a log entry type 2318 that indicates that the log entry is an offer-type log entry as opposed to a download type log-entry. A new block server task entry 2319 is added to each such offer-type log entry. The new block server task entry has a block server identifier 2313 identifying the new block server and task metadata 2320 indicating that the replication task is not yet complete. The block agent at each of the currently assigned on-premises block server(s) can then offer the content item blocks in the content item namespace that it has in its possession to the new block server in accordance with the content item block replication process 2500 described above.

Also, the block agent at the new block server may perform the content item block replication processes 2400 and 2500 described above to download from the off-premises block server any content item blocks in the content item namespace assigned to the new block server.

10.0 ON-PREMISES CONTENT MANAGEMENT SERVICE

In some example embodiments, functionality of the control plane and the metadata plane of the online content management service is provided on-premises. In particular, an on-premises control plane including a notification server (e.g., like 140), a metadata server (e.g., like 150) and a web site (e.g., like 170) may be coupled by a back-end data bus to an on-premises block server (e.g., 120) and to an on-premises metadata plane (e.g., like 180). In this case, the synchronization protocol operations described herein may be performed against an on-premises content management service for content items that are committed to an on-premises block server.

For example, the upload and download processes according to the first example synchronization protocol operation described above may be performed using an on-premises notification server, an on-premises metadata server, an on-premises metadata server, and an on-premises block server. For example, without loss of generality, in the interaction diagrams 500 of FIG. 5, 600 of FIG. 6, 900 of FIG. 9, 1200 of FIG. 12, 1300 of FIG. 13, and 1500 of FIG. 15, metadata server 150 may be substituted with an on-premises metadata server, notification server 140 may be substituted with an on-premises notification server, and metadata plane 180 may be substituted with an on-premises metadata plane, all connected together by an on-premises back-end data bus. When an on-premises control plane and/or metadata plane are used, the implementation of the on-premises components may require fewer computing resources (e.g., servers) than the computing resources required to implement the control plane and the metadata plane of the off-premises content management service, depending on the volume of content items committed to the on-premises block server when compared to the off-premises block server 130.

While in some example embodiments only the off-premises metadata server 150 maintains a server content item journal, an on-premises metadata server maintains a server content item journal in other example embodiments. For example, when an on-premises metadata server is used, the on-premises metadata server may maintain a server content item journal in an on-premises metadata plane for content items committed to an on-premises block server associated with the on-premises metadata server. For example, the on-premises metadata server may maintain a server content item journal like journal 410 of FIG. 4, journal 1110 of FIG. 11, or journal 2210 of FIG. 22.

While in some example embodiments only the off-premises metadata plane 180 stores user account records (e.g., 310), an on-premises metadata plane stores user account records in other example embodiments. For example, an on-premises metadata plane may store user account records for users that use an on-premises block server associated with the on-premises metadata plane (e.g., via an on-premises back-end data bus) to host their content items. When only the off-premises metadata plane 180 stores user account records, an on-premises metadata server may access the user account records, or information thereof, via the off-premises metadata server 150.

While in some example embodiments only the off-premises metadata plane 180 stores linked device records (e.g., 810), an on-premises metadata plane maintains linked device records in other example embodiments. For example, an on-premises metadata plane may maintain linked device records for devices that use an on-premises block server associated with the on-premises metadata plane (e.g., via an on-premises back-end data bus) to store and retrieve content item blocks. When only the off-premises metadata plane 180 stores linked device records, an on-premises metadata server may access the user account records, or information thereof, via the off-premises metadata server 150.

11.0 SELECTIVE CONTENT ITEM SYNCHRONIZATION

Historically, existing online content management services have been adequate at keeping personal content items in sync between a user's multiple devices. For example, with existing systems, user A could create or modify a document on a laptop device linked to the system and that update is automatically replicated through the system to user A's other linked devices such that all of the copies of the document at all of the linked devices are identical after the update is applied at all of the other linked devices as part of synchronization operations between the devices and the system.

In the business context, content items created by employees generally belong to the business and not the employees themselves. Further, businesses historically have viewed their content items as being centralized such as on a file server as opposed to being distributed among many personal computing devices. This centralized view made is easier for a business to segregate personal content items from content items belonging to the business. For example, an IT manager or administrator for a business could safely assume that all content items stored on the file server belong to the business. Further, owing to the centralized nature of the content items, it was easier for the business to control access to content items. For example, the IT manager or administrator can set access control permissions on content items stored on the company file server. Also, in many cases, the lifetime of content items belonging to the business exceeds the length of employment of any given employee. By storing content items belonging to it on a centralized file server, the business can provision access to content items to new employees simply by setting the appropriate access control permissions on the content items in the file server. Similarly, the business can revoke access to content items on the file server from departing employees simply by changing the access control permissions to revoke access. From the perspective of the business, the file server is viewed as the centralized repository for the business's content items that exist over time as employees come and go.

With some existing online content management services, the content item storage model is less centralized than the traditional file server model. In particular, with these systems, each user of the system has their own individual synchronization repository on their personal computing device (e.g., in local storage 112-1 of device 110-1) where content items synchronized with the system are stored. Further, each user generally maintains their individual synchronization repository independently of each other. For example, with the existing system, user Alice's synchronization repository (e.g., at device 110-1) may not provide any inherent visibility into user Bob's synchronization repository (e.g., at device 110-2). In particular, user Alice may not know what content items are stored in user Bob's synchronization repository, and vice versa. Some existing services provide mechanisms to share selected content items between synchronization repositories. For example, with some existing services, user Alice can share a folder in her synchronization repository with user Bob such that updates Bob makes to the shared folder in his synchronization repository are seen by Alice in her synchronization repository, and vice versa. However, with the existing system, ownership of the shared folder is tied to an individual. This is problematic if Alice leaves the company and decommissions her synchronization repository or simply deletes the shared folder from her synchronization repository. In this case, the folder she shared with Bob may no longer be accessible to Bob. In the worst case, all of the work accumulated in the shared folder is lost.

Another problem with shared folders on existing systems is that hierarchical information pertaining to the shared folder may be lost when the shared folder is incorporated into another's synchronization repository. For example, assume Alice has a folder in her synchronization repository with the path /AB/C. With existing systems, if user Alice shares folder /A/B/C with user Bob, the folder appears as /C in Bob's synchronization repository with the hierarchical information about parent folders "A" and "B" lost. This is problematic, especially if the names of the parent folders convey information about what is stored in the shared folder. Overall, existing cloud-based content management services, due to the individualized and distributed nature of synchronization repositories, increase coordination costs for a business when used for managing and storing content items belonging to the business.

According to some example embodiments of present invention, only a subset of the content items belonging to a "selectively synchronized" content item namespace is stored at a user device (e.g., 110-1) at a time. A user can browse a file-folder hierarchy of the content item namespace at the user device using a file system browser provided by an operating system of the device 102 (e.g., the finder on MAC OS devices or the WINDOWS EXPLORER on WINDOWS devices).

According to some embodiments, an actionable icon corresponding to the selectively synchronized content item namespace appears in a graphical user interface (GUI) at the device. For example, the icon may appear on the desktop of the GUI provided by the operating system on the device. The user may interact with the icon (e.g., double-click on the icon) to open a file explorer like-view of the file-folder hierarchy of the selectively synchronized content item namespace. Further, an icon or other indication of the selectively synchronized content item namespace may also be displayed with other shared resources in an interface provided by the operating system on the device. For example, an actionable icon or text may be presented in the GUI along with mounted drives, shared drives, network drives, or other connected resources. By doing so, the user can access the selectively synchronized content item namespace from a familiar location where the user knows to access other connected resources such as mounted drives, external disks, and network drives.

Figure 26A:
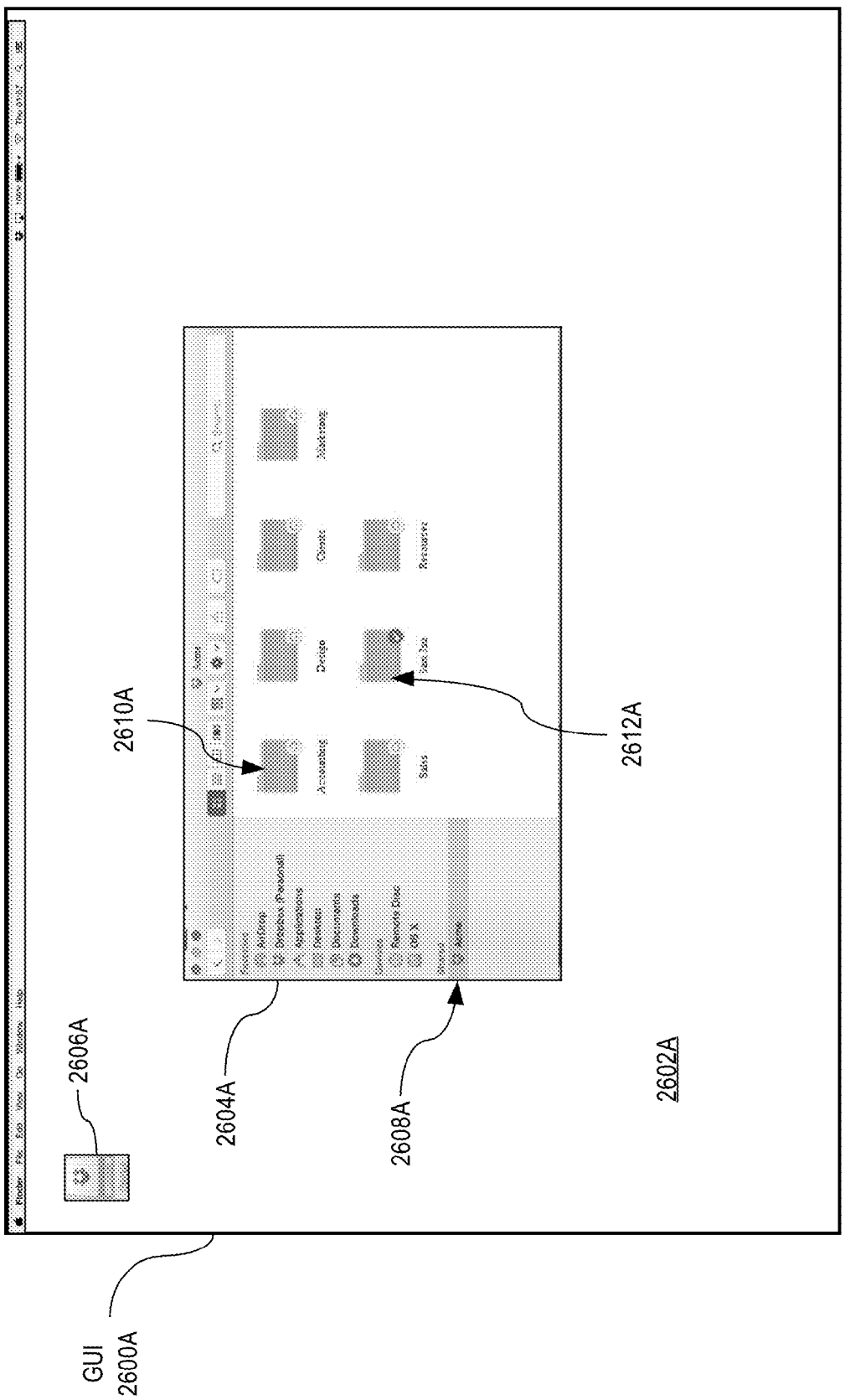
FIGS. 26A-D comprise example graphical user interfaces (GUIs) that are presented at personal computing devices, according to some example embodiments of the present invention.

FIG. 26A depicts an example GUI 2600A presented at a user device (e.g., 110-1). The GUI 2600A includes a desktop 2602A, a file system browser 2604A, and a selectively synchronized content item namespace launcher icon 2606A. The desktop 2602A may be presented by an operating system of the device. The file system browser 2604A and the launcher icon 2606A may be presented by a combination of the operating system and the content item synchronization agent (e.g., 114-1) of the device.

According to some embodiments, as shown in FIG. 26A, a selectively synchronized content item namespace is represented like a mounted drive, disk, or device or a shared resource in a file system browser provided by the operating system of the device. For example, a selectively synchronized content item namespace named "Acme" is represented in file system browser 2604A as a shared resource 2608A, which is currently selected, as indicated with highlighting. By representing a selectively synchronized content item namespace in this way, integration of the content item namespace into the desktop 2602A environment is more seamless based on the user's prior familiarity with the file system browser.

As mentioned, according to some embodiments, less than all of the content items belonging to a selectively synchronized content item namespace may be stored at the user device. However, a file-folder representation of the entire file-folder hierarchy of the content item namespace may still be provided. For example, file system browser 2604A includes a plurality of folder icons. Each folder icon (e.g., 2610A) represents a folder at the root of, or contained in another folder of, the file-folder hierarchy of the "Acme" content item namespace. Each folder icon (e.g., 2610A) includes a synchronization configuration status icon, which indicates a current synchronization configuration with respect to the content items contained in the corresponding folder.

According to some embodiments, there are at least two different synchronization configuration status icons corresponding to two different synchronization configurations. One configuration status icon represents that the content items in the content item folder are currently configured for network access. That is, when the user requests to access a content item configured network access at the device (e.g., by attempting to open a file corresponding to the content item in an application at the device), any content item blocks of the content item that are not stored locally at the device (e.g., in local storage 112-1) are downloaded by the content item synchronization agent at the device from an on-premises block server (e.g. 120) or the off-premises block server 130. The downloaded content item blocks may be stored locally for a period of time at the device on the expectation that they will be needed again in the near future. For example, downloaded content item blocks may be stored in a content item block pool maintained by the content item synchronization agent in local storage of the user device. The content item synchronization agent may delete (remove) content item blocks from the block pool as and when needed (e.g., to make more storage space available in the local storage or in the block pool).

In the example of FIG. 26A, the synchronization configuration status icon that represents this configuration has the appearance of a cloud. For example, a cloud icon appears in conjunction with the "Accounting" folder 2610A to indicate that the content items contained in that folder (and any sub-folders thereof) are configured for network access. Another configuration status icon represents that the content items contained in a folder are currently available for offline access. That is, the content items in the folder are stored locally at the device as files in the device's file system. In the example of FIG. 26A, the icon representing this configuration has the appearance of a checkmark. For example, a checkmark appears in conjunction with the "Sam Jau" content item folder 2612A to indicate that the content items of that folder are stored locally at the user device as files and thus available for access even when the user device is not connected to a communication network (e.g., 160).

By viewing the synchronization configuration status icons, the user can quickly discern whether the content items of a corresponding folder are configured for network access or available for offline access at the user's device. The same or similar icons may also be used to represent the current synchronization configuration status of a file, as opposed to a folder.

According to some embodiments, the user may interact with the GUI at the user device to change the current synchronization configuration status of a selected folder or a file in the file-folder hierarchy of a selectively synchronized content item namespace. According to some embodiments, if the synchronization configuration status for a folder is changed from network access to offline access, then the content item synchronization agent at the device downloads any missing content item blocks of the content items belonging to the folder from one or more block servers in response to detecting the change. Thereafter, so long as the synchronization configuration status for the folder remains offline access, the content item synchronization agent at the user device will keep the content items contained within the folder in sync with the current versions of content items item in accordance with a content item synchronization protocol described above.

Figure 26B:
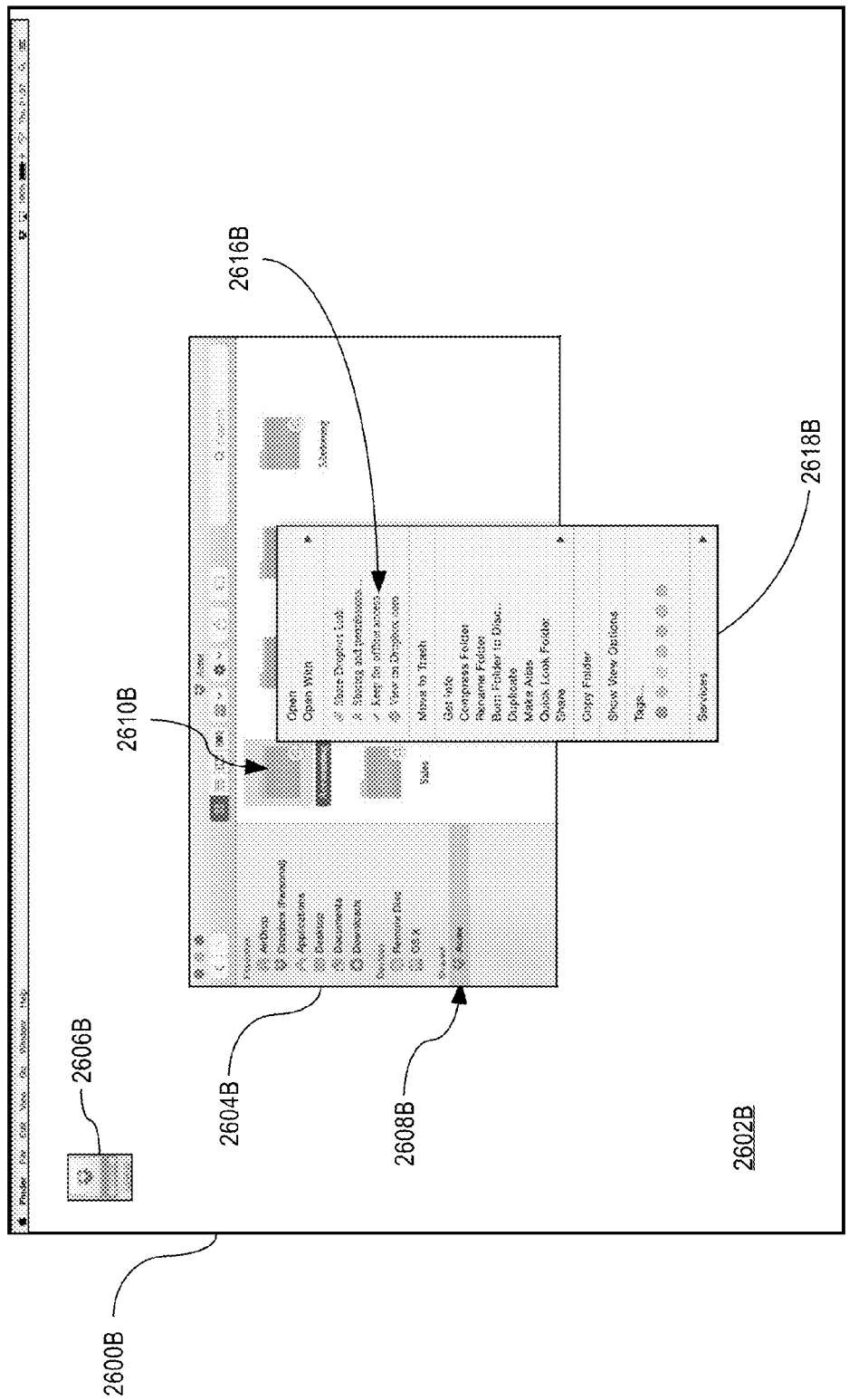

For example, in FIG. 26B, the user has right-clicked on the "Accounting" folder icon 2610B. In response, a pop-up menu 2618B is displayed in GUI 2600B. The menu 2618B provides the option 2616B to change the current synchronization configuration status for the "Accounting" folder from network access to offline-access.

Figure 26C:
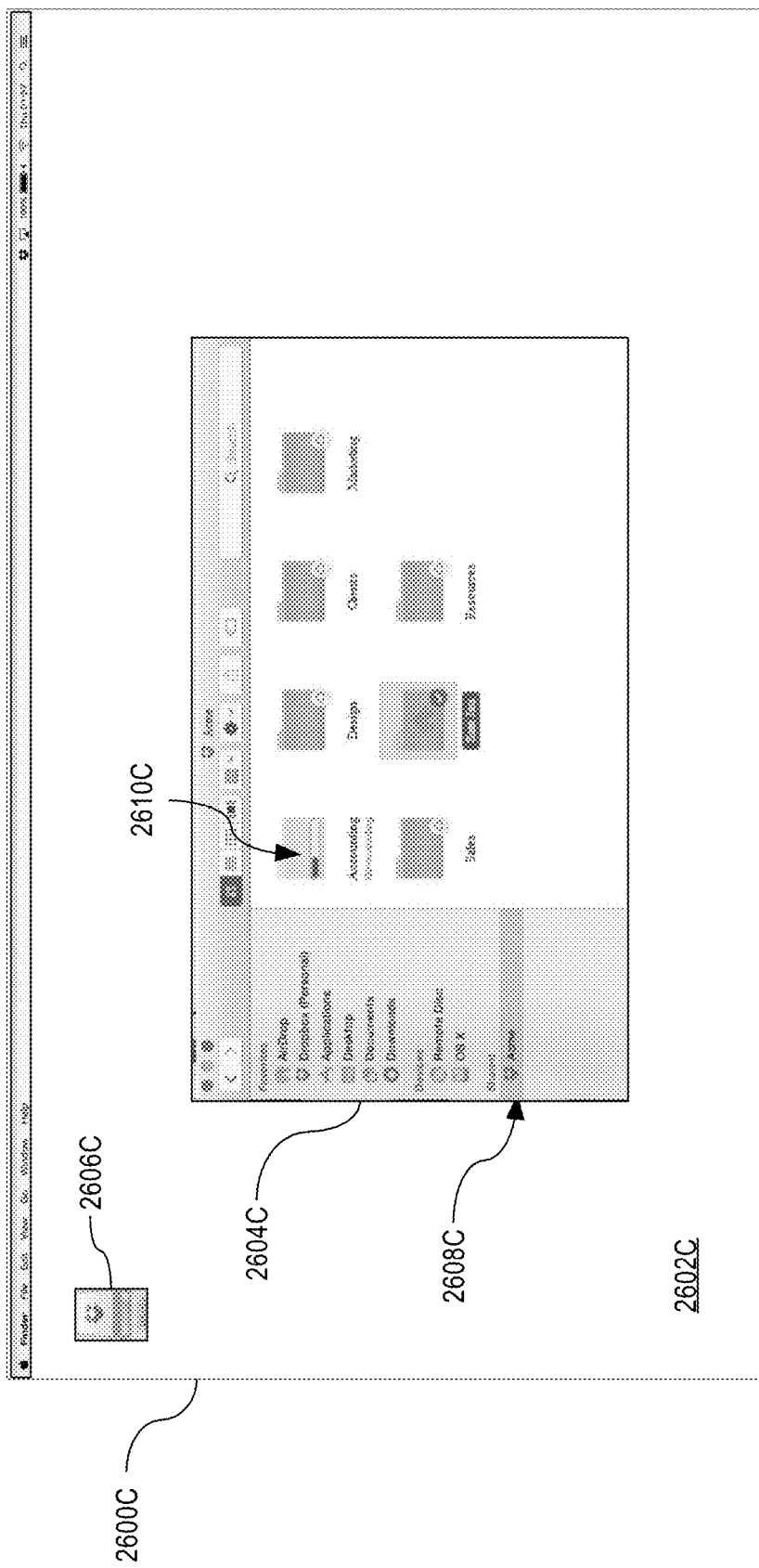
Figure 26D:
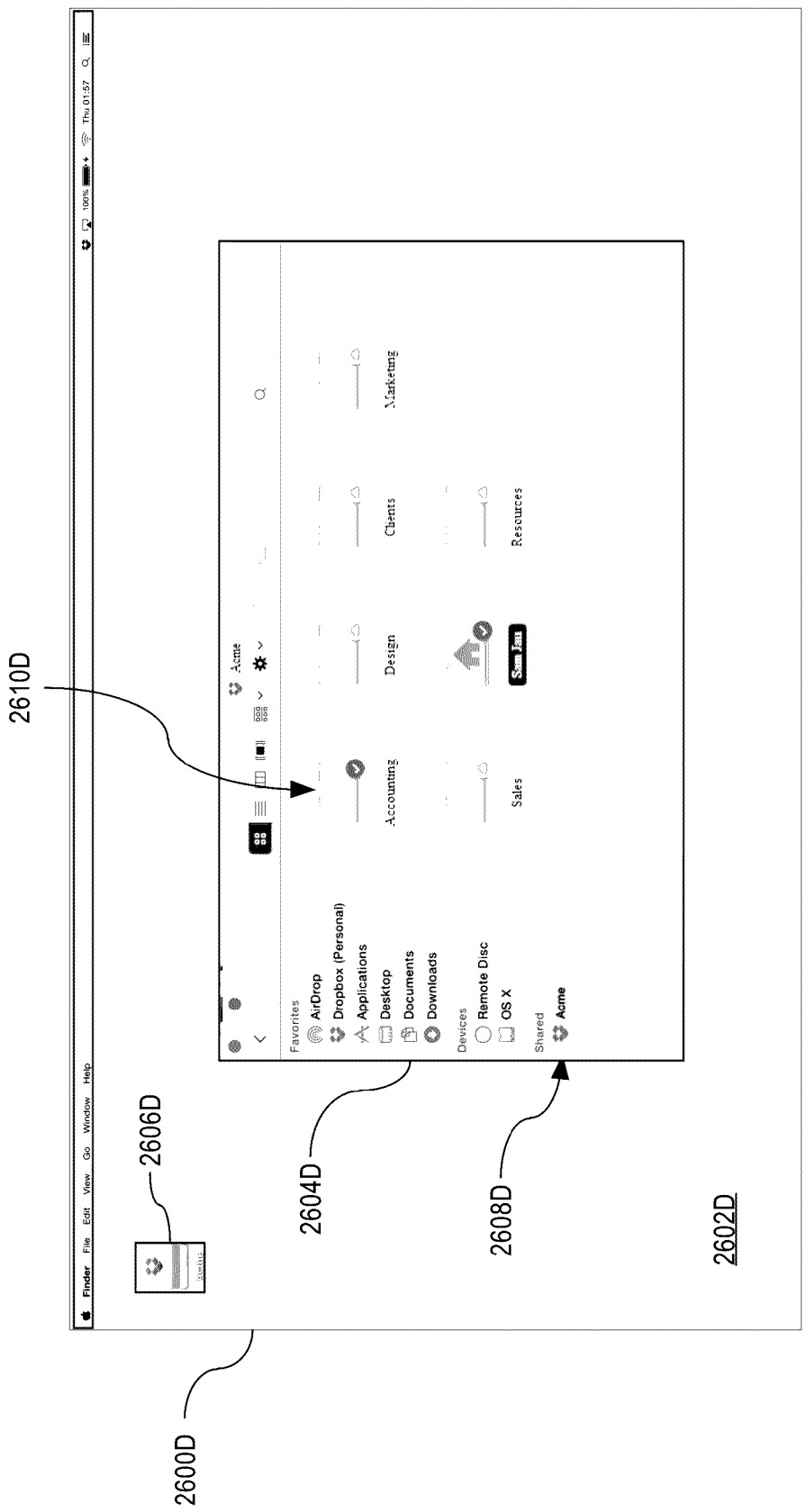

In response to selecting option 2616B, any missing content item blocks of the content items contained in the "Accounting" folder (and any sub-folders thereof) are downloaded from one or more block servers (e.g., block server 120) to the user device. While downloading the missing content item blocks, the folder icon 2601B may contain a progress bar as shown in GUI 2600C in FIG. 26C displaying the progress of the download. After the missing content item blocks of content items contained in the "Accounting" content item folder have finished downloading to the user device, the synchronization configuration status icon changes to indicate that the content items contained in the folder are now available for offline access. For example FIG. 26D shows the folder icon 2610D now with a checkmark to indicate that the content items contained in the "Accounting" content item folder are now available for offline access.

According to some embodiments, content items belonging to a selectively synchronized content item namespace can also be configured for network access or offline access. If a content item is configured for network access and the user opens the content item at the user device (e.g., by double-clicking an icon representing a file corresponding to the content item), then any missing content item blocks of the content item may be downloaded by the content item synchronization agent on the user device from one or more block servers before it the content item is opened at the user device and its contents presented to the user. Thereafter, the content item may be configured for offline access and that configuration indicated as such in the GUI at the user device. In other words, the user's request to open the content item locally at the user device may be interpreted as a request to change the synchronization configuration from network access to offline access. In some embodiments, the synchronization configuration status is only changed if the user takes some other action in addition to opening the content item. For example, the synchronization configuration status may be automatically changed from network access to offline access if the user both opens the content item and edits the content item or opens the content item multiple times within a threshold period of time (e.g., 24 hours). In the case where the synchronization configuration status is not changed from network access to offline access when the user merely opens the content item, any missing content item blocks of the content item are still downloaded to the user device and may be cached at the user device (e.g., in the block pool) for some time in anticipation of possible subsequent access by the user. However, the synchronization configuration status icon of the content item in the GUI may continue to indicate network access (e.g., with a cloud icon).

According to some embodiments, the content item synchronization agent (e.g., 114-1) at a user device (e.g., 110-1) detects when the amount of local storage space (e.g., of local storage 112-1) occupied by content items belonging to a selectively synchronized content item namespace that are configured for offline access exceeds a threshold or a threshold percentage. In response to exceeding the threshold, the content item synchronization agent may prompt the user to change the synchronization configuration status of one or more folders or files that are currently configured for offline access to network access. At the same time, the content item synchronization agent may delete, from the user device, files corresponding to content items previously configured for offline access so as to free up local storage space.

12.0 DISTRIBUTED BLOCK CACHING OPTIMIZATION

According to some example embodiments of the present invention, the block service 122 and/or the block agent 126 of an on-premises block server 120 provides a distributed block caching optimization function. The function may be used in conjunction with selectively synchronized content item namespaces. With selectively synchronized content item namespaces, a "placeholder" file may be stored at a user's device (e.g., 110-1) for a content item that belongs to a selectively synchronized content item namespace, a content item contained with a folder configured at the user's device for network access, or a file corresponding to a content item configured at the user's device for network access. The placeholder file may be a zero byte file, for example. With a placeholder file, the user can view in a graphical user interface at the user's device (e.g., provided by a file system browser application) the file name of the placeholder file and the location of placeholder file in a file system file-folder hierarchy at the user's device. However, the contents of the placeholder file (i.e., the content item) is not stored within the placeholder file at the user's device until the contents are needed by the user. The placeholder file may exist at the user device's representing the content item for some time until the user wishes to access the content item. Thus, the placeholder file for a content item provides the benefit to the user of being able to discover and locate the content item using conventional file system explorers, browsers, and search interfaces, while at the same time not consuming local storage space at the user's device until the content item is accessed.

When a user attempts to access a content item via a placeholder file at the user's device, the access attempt is intercepted by the content item synchronization agent (e.g., 114-1) at the user's device. For example, the agent may be notified via an API offered by an operating system of the device when the access attempt is made. The access attempt may be initiated by a number of different types of user interactions with the placeholder filer such as, for example, attempting to open the file in an application (e.g., a word processing application, etc.) on the user's device.

Upon intercepting the access attempt, the synchronization agent determines if the placeholder file is "filled". By filled, it is meant that all content item blocks that make up the content item represented by the placeholder file are stored and assembled within the placeholder file. In this case, the placeholder file is no longer a placeholder for the content item because the file contains the content item. On the other hand, if the placeholder file is "empty" (i.e., not filled), the some or all of the content item blocks that make up the content item may need to be downloaded to the user's device from one or more block servers, if the missing content item blocks are not already stored at the user's device (e.g., in a block pool). Users would appreciate that a placeholder file be filled as quickly as possible upon access. One way to reduce the fill time is to have all of the content item blocks of the content item already stored at the user's device when the placeholder file is accessed. This may not be possible depending on the amount of storage space available at the user's device for storing or caching content item blocks. Short of that, the fill time can be reduced by storing missing content item blocks as close as possible on the network to the user's device so that block download time is minimized. For example, it would be expected that the block download time would be shorter if the missing content item blocks were available at an on-premises block server or at a peer device (e.g., 110-2) connected to the same local area network (e.g., 160) as the user's device than if the missing blocks were downloaded over the Internet from the off-premises block server 130.

Figure 27:
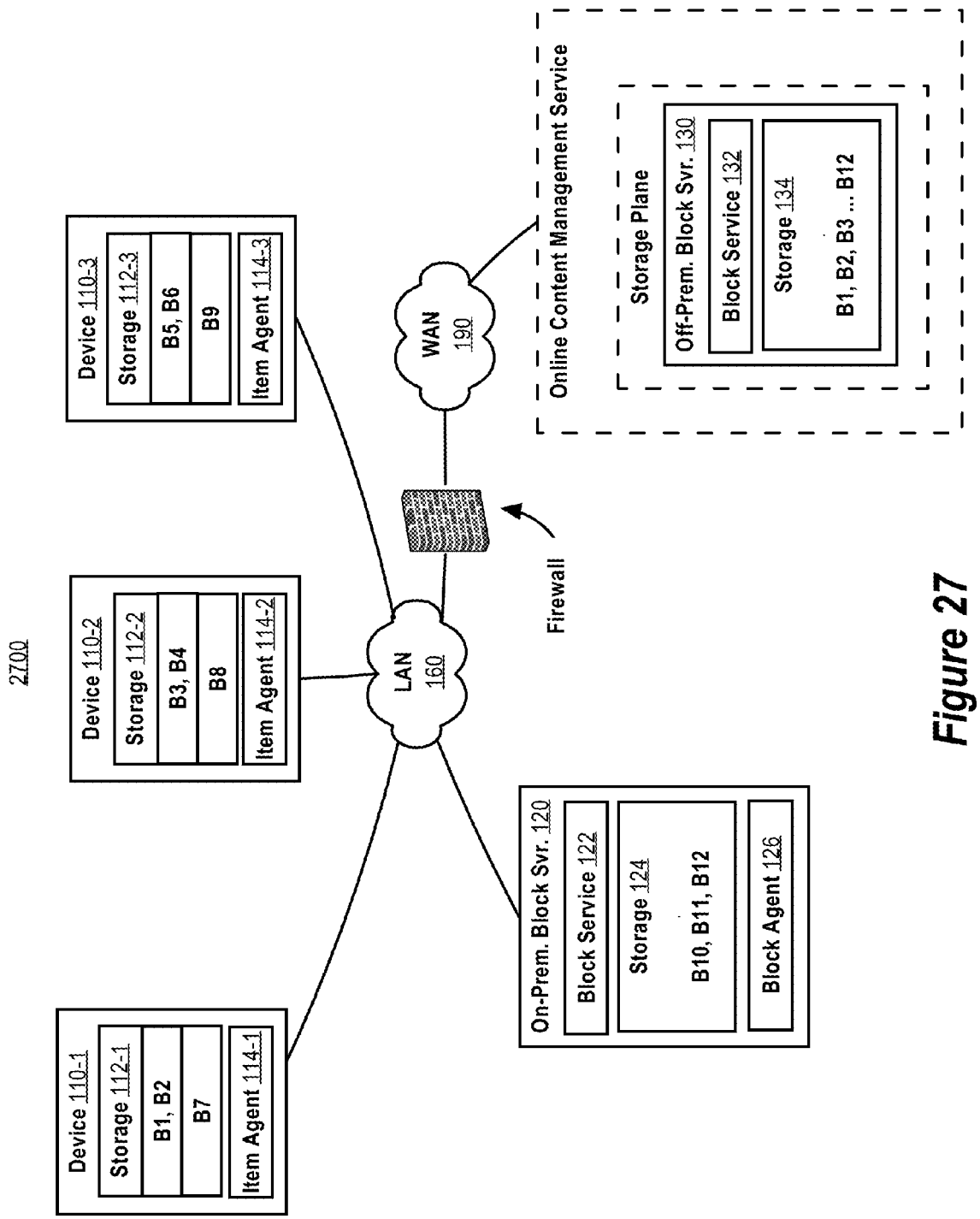
FIG. 27 is a block diagram of an example system for distributed block caching, according to some example embodiments of the present invention.

According to some example embodiments, content item blocks for selectively synchronized content items are stored on-premises to reduce time needed to fill placeholder files on access. FIG. 27 illustrates an example system configuration for distributed block caching optimization, according to some example embodiments of the present invention. The system 2700, like system 100 of FIG. 100, includes the online content management service with a storage plane and the off-premises block server 130. Although not shown in FIG. 27, system 2700 also includes the other components of the online content management service including the control plane with the notification server 140, the metadata server 150, and web site 170, the back-end data bus, and the metadata plane 180.

In this example, content items belonging to a selectively synchronized content item namespace are composed of twelve content item blocks indicated in FIG. 27 as B1 through B12. All twelve content item blocks are stored in the local storage 134 of the off-premises block server 130. Of course, in a practical embodiment, content items belonging to a selectively synchronized content item namespace may be composed of many more than twelve content item blocks (e.g., hundreds, thousands, millions, or more) depending on the number of content items that belong to the content item namespace and the sizes of the content items.

Also in this example, content item blocks B1 through B6 are stored as part of local files at personal computing devices 110-1, 110-2, and 110-3. In particular, content item blocks B1 and B2 are stored as part of one or more local files at personal computing device 110-1, content item blocks B3 and B4 are stored as part of one or more local files at personal computing device 110-2, and content item blocks B5 and B6 are stored as part one or more local files at personal computing device 110-3.

Each of personal computing devices 110-1, 110-2, and 110-3 may also store one or more placeholder files (not shown) representing content items belonging to the selectively synchronized content item namespace. The placeholder files may correspond to content items that are made up of blocks B7 though B12. These blocks are distributed among the block pools at each of the devices 110-1, 110-2, and 110-3 and the on-premises block server 120. In particular, device 110-1 stores block B7 in its block pool, device 110-2 stores block B8 in its block pool, device 110-3 stores block B9 in its block server, and the on-premises block server 120 stores blocks B10 through B12.

When a content item block is needed to fill a placeholder file accessed at a device, the synchronization agent at the device can obtain the block from its local block pool, from a peer device, or from an on-premises block server. For example, if a placeholder file accessed at device 110-1 requires block B8, then the agent 114-1 can obtain block B8 from device 110-2. Alternatively, if the placeholder file requires one or more of blocks B10 through B12, then the agent 114-1 can download the missing blocks from the on-premises block server 120.

According to some example embodiments, metadata is maintained (referred to hereinafter as a "namespace block list") at the on-premises block server 120 which identifies content item blocks by their block identifiers that make up content items belonging to a selectively synchronized content item namespace. For example, on-premises block server 120 may maintain metadata identifying blocks B1 through B12. The maintained metadata may be updated from time to time as new content items are added to the content item namespace and existing content items removed from the content item namespace.

On regular or periodic intervals or in response to detecting an event (e.g., a new content item added to or removed from the content item namespace), the block agent 126 at the on-premises block server 120 checks whether all of the content item blocks identified in the namespace block list are available at the on-premises block server 120. For example, the block agent 126 may check whether blocks B1 through B2 are stored in local storage 124 of the block server 120.

If less than all of the blocks in the namespace block list are stored at the on-premises block server 120, then the block agent 126 may attempt to download to the on-premises block server 120 from the off-premises block server 130 any missing content item blocks. For example, if the namespace block list identifies blocks B1 through B12 and the on-premises block server 120 currently stores blocks B10 through B12, then the block agent 126 may attempt to download missing blocks B1 through B9 from the on-premises block server 130.

It may be the case that there is not sufficient storage space available at the on-premises block server 120 to store the missing blocks B1 through B9. In this case, the block agent 120 may send a network message to the content item synchronization agent at one or more personal computing devices to download one or more of the missing content item blocks from the off-premises block server 130 and store the downloaded blocks in their respective block pools. In the example of FIG. 27, the block agent 126 has instructed agent 114-1 to download and store block B7, agent 114-2 to download and store block B8, and agent 114-3 to download and store block B9. The result is the all blocks B1 through B12 are available on the local area network 160 for quickly filling accessed placeholder files at devices 110-1, 110-2, and 110-3.

The distribution of blocks as well as the blocks themselves between devices 110-1, 110-2, and 110-3 and on-premises block server 120 may change from time to time. For example, the set of content items identifies in the namespace block list for a content item namespace at the on-premises block server 120 may change from time to time as new content items (and thus new content item blocks) are added to the content item namespace and existing content items (and thus existing content item blocks) are removed from the content item namespace.

13.0 BASIC COMPUTING HARDWARE AND SOFTWARE

13.1 Basic Computing Device

Figure 28:
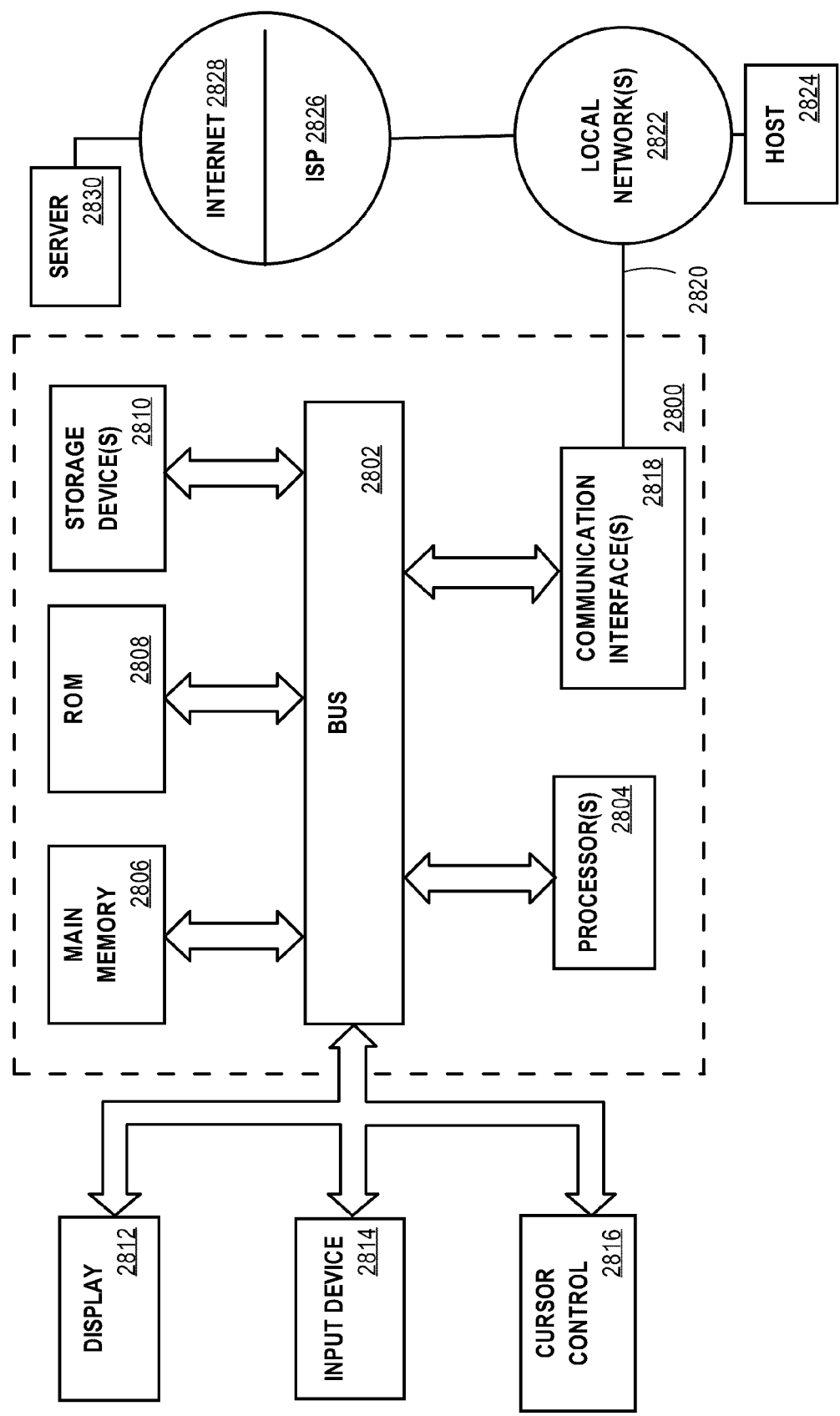
FIG. 28 is a very general block diagram of a computing device in which the example embodiment(s) of the present invention can be embodied.

Referring now to FIG. 28, it is a block diagram that illustrates a basic computing device 2800 in which the example embodiment(s) of the present invention can be embodied. Computing device 2800 and its components, including their connections, relationships, and functions, is meant to be exemplary only, and not meant to limit implementations of the example embodiment(s). Other computing devices suitable for implementing the example embodiment(s) can have different components, including components with different connections, relationships, and functions.

Computing device 2800 can include a bus 2802 or other communication mechanism for addressing main memory 2806 and for transferring data between and among the various components of device 2800.

Computing device 2800 can also include one or more hardware processors 2804 coupled with bus 2802 for processing information. A hardware processor 2804 can be a general purpose microprocessor, a system on a chip (SoC), or other processor.

Main memory 2806, such as a random access memory (RAM) or other dynamic storage device, also can be coupled to bus 2802 for storing information and software instructions to be executed by processor(s) 2804. Main memory 2806 also can be used for storing temporary variables or other intermediate information during execution of software instructions to be executed by processor(s) 2804.

Software instructions, when stored in storage media accessible to processor(s) 2804, render computing device 2800 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 2800 also can include read only memory (ROM) 2808 or other static storage device coupled to bus 2802 for storing static information and software instructions for processor(s) 2804.

One or more mass storage devices 2810 can be coupled to bus 2802 for persistently storing information and software instructions on fixed or removable media, such as magnetic, optical, solid-state, magnetic-optical, flash memory, or any other available mass storage technology. The mass storage can be shared on a network, or it can be dedicated mass storage. Typically, at least one of the mass storage devices 2810 (e.g., the main hard disk for the device) stores a body of program and data for directing operation of the computing device, including an operating system, user application programs, driver and other support files, as well as other data files of all sorts.

Computing device 2800 can be coupled via bus 2802 to display 2812, such as a liquid crystal display (LCD) or other electronic visual display, for displaying information to a computer user. In some configurations, a touch sensitive surface incorporating touch detection technology (e.g., resistive, capacitive, etc.) can be overlaid on display 2812 to form a touch sensitive display for communicating touch gesture (e.g., finger or stylus) input to processor(s) 2804.

An input device 2814, including alphanumeric and other keys, can be coupled to bus 2802 for communicating information and command selections to processor 2804. In addition to or instead of alphanumeric and other keys, input device 2814 can include one or more physical buttons or switches such as, for example, a power (on/off) button, a "home" button, volume control buttons, or the like.

Another type of user input device can be a cursor control 2816, such as a mouse, a trackball, or cursor direction keys for communicating direction information and command selections to processor 2804 and for controlling cursor movement on display 2812. This input device typically has two degrees of freedom in two axes, a first axis (e.g., x) and a second axis (e.g., y), that allows the device to specify positions in a plane.

While in some configurations, such as the configuration depicted in FIG. 28, one or more of display 2812, input device 2814, and cursor control 2816 are external components (i.e., peripheral devices) of computing device 2800, some or all of display 2812, input device 2814, and cursor control 2816 are integrated as part of the form factor of computing device 2800 in other configurations.

Functions of the disclosed systems, methods, and modules can be performed by computing device 2800 in response to processor(s) 2804 executing one or more programs of software instructions contained in main memory 2806. Such software instructions can be read into main memory 2806 from another storage medium, such as storage device(s) 2810. Execution of the software instructions contained in main memory 2806 cause processor(s) 2804 to perform the functions of the example embodiment(s).

While functions and operations of the example embodiment(s) can be implemented entirely with software instructions, hard-wired or programmable circuitry of computing device 2800 (e.g., an ASIC, a FPGA, or the like) can be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media can comprise non-volatile media and/or volatile media. Non-volatile media includes, for example, non-volatile random access memory (NVRAM), flash memory, optical disks, magnetic disks, or solid-state drives, such as storage device 2810. Volatile media includes dynamic memory, such as main memory 2806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 2802. Transmission media can also take the form of acoustic or light waves, such as those generated during radio-wave and infra-red data communications.

Various forms of media can be involved in carrying one or more sequences of one or more software instructions to processor(s) 2804 for execution. For example, the software instructions can initially be carried on a magnetic disk or solid-state drive of a remote computer. The remote computer can load the software instructions into its dynamic memory and send the software instructions over a telephone line using a modem. A modem local to computing device 2800 can receive the data on the telephone line and use an infra-red transmitter to convert the data to an infra-red signal. An infra-red detector can receive the data carried in the infra-red signal and appropriate circuitry can place the data on bus 2802. Bus 2802 carries the data to main memory 2806, from which processor(s) 2804 retrieves and executes the software instructions. The software instructions received by main memory 2806 can optionally be stored on storage device(s) 2810 either before or after execution by processor(s) 2804.

Computing device 2800 also can include one or more communication interface(s) 2818 coupled to bus 2802. A communication interface 2818 provides a two-way data communication coupling to a wired or wireless network link 2820 that is connected to a local network 2822 (e.g., Ethernet network, Wireless Local Area Network, cellular phone network, Bluetooth wireless network, or the like). Communication interface 2818 sends and receives electrical, electromagnetic, or optical signals that carry digital data streams representing various types of information. For example, communication interface 2818 can be a wired network interface card, a wireless network interface card with an integrated radio antenna, or a modem (e.g., ISDN, DSL, or cable modem).

Network link(s) 2820 typically provide data communication through one or more networks to other data devices. For example, a network link 2820 can provide a connection through a local network 2822 to a host computer 2824 or to data equipment operated by an Internet Service Provider (ISP) 2826. ISP 2826 in turn provides data communication services through the world wide packet data communication network now commonly referred to as the "Internet" 2828. Local network(s) 2822 and Internet 2828 use electrical, electromagnetic or optical signals that carry digital data streams. The signals through the various networks and the signals on network link(s) 2820 and through communication interface(s) 2818, which carry the digital data to and from computing device 2800, are example forms of transmission media.

Computing device 2800 can send messages and receive data, including program code, through the network(s), network link(s) 2820 and communication interface(s) 2818. In the Internet example, a server 2830 might transmit a requested code for an application program through Internet 2828, ISP 2826, local network(s) 2822 and communication interface(s) 2818.

The received code can be executed by processor 2804 as it is received, and/or stored in storage device 2810, or other non-volatile storage for later execution.

13.2 Basic Software System

Figure 29:
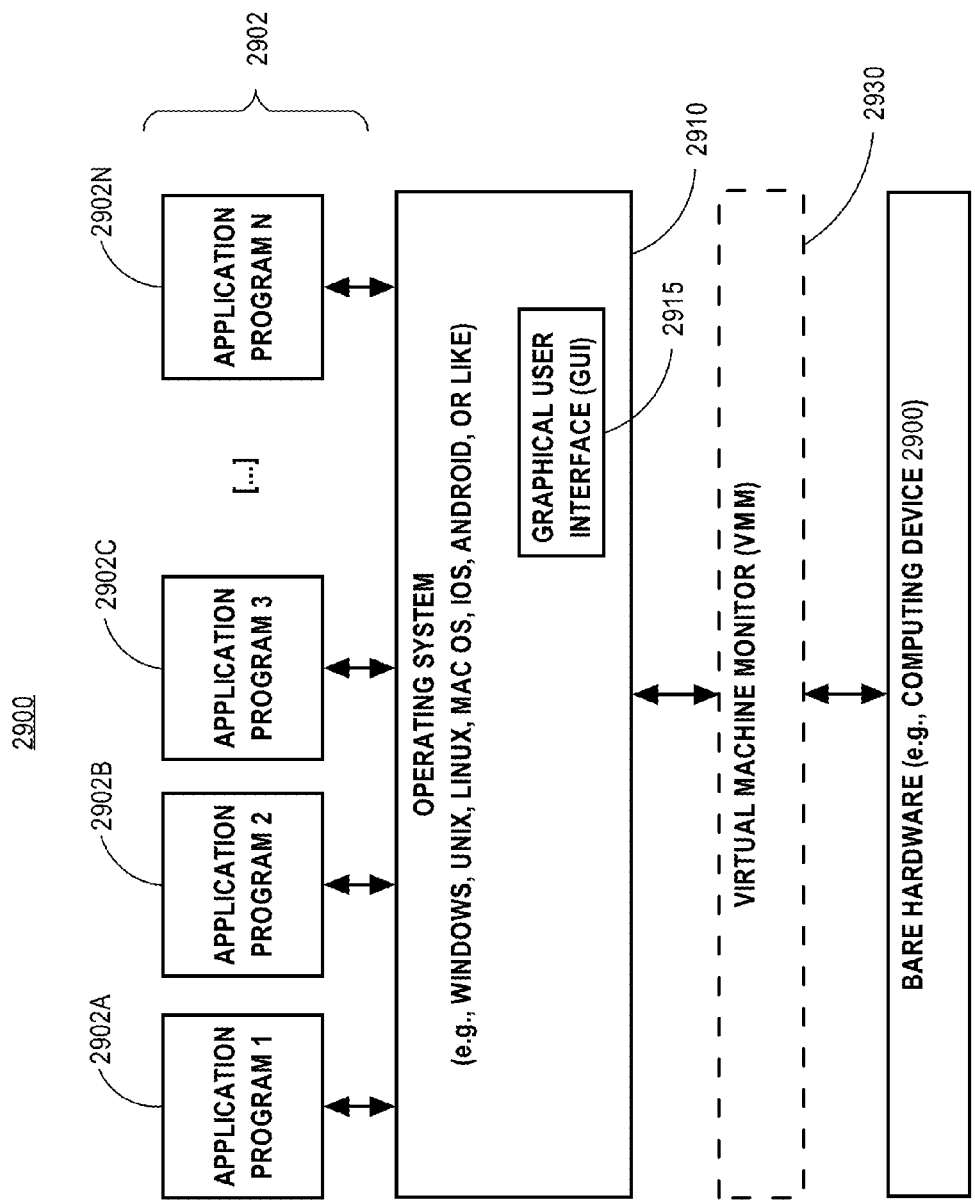
FIG. 29 is a block diagram of a basic software system for controlling the operation of the computing device.

FIG. 29 is a block diagram of a basic software system 2900 that can be employed for controlling the operation of computing device 2800. Software system 2900 and its components, including their connections, relationships, and functions, is meant to be exemplary only, and not meant to limit implementations of the example embodiment(s). Other software systems suitable for implementing the example embodiment(s) can have different components, including components with different connections, relationships, and functions.

Software system 2900 is provided for directing the operation of computing device 2800. Software system 2900, which can be stored in system memory (RAM) 2806 and on fixed storage (e.g., hard disk or flash memory) 2810, includes a kernel or operating system (OS) 2910.

The OS 2910 manages low-level aspects of computer operation, including managing execution of processes, memory allocation, file input and output (I/O), and device I/O. One or more application programs, represented as 2902A, 2902B, 2902C . . . 2902N, can be "loaded" (e.g., transferred from fixed storage 2810 into memory 2806) for execution by the system 2900. The applications or other software intended for use on device 2900 can also be stored as a set of downloadable computer-executable instructions, for example, for downloading and installation from an Internet location (e.g., a Web server, an app store, or other online service).

Software system 2900 includes a graphical user interface (GUI) 2915, for receiving user commands and data in a graphical (e.g., "point-and-click" or "touch gesture") fashion. These inputs, in turn, can be acted upon by the system 2900 in accordance with instructions from operating system 2910 and/or application(s) 2902. The GUI 2915 also serves to display the results of operation from the OS 2910 and application(s) 2902, whereupon the user can supply additional inputs or terminate the session (e.g., log off).

OS 2910 can execute directly on the bare hardware 2920 (e.g., processor(s) 2804) of device 2800. Alternatively, a hypervisor or virtual machine monitor (VMM) 2930 can be interposed between the bare hardware 2920 and the OS 2910. In this configuration, VMM 2930 acts as a software "cushion" or virtualization layer between the OS 2910 and the bare hardware 2920 of the device 2800.

VMM 2930 instantiates and runs one or more virtual machine instances ("guest machines"). Each guest machine comprises a "guest" operating system, such as OS 2910, and one or more applications, such as application(s) 2902, designed to execute on the guest operating system. The VMM 2930 presents the guest operating systems with a virtual operating platform and manages the execution of the guest operating systems.

In some instances, the VMM 2930 can allow a guest operating system to run as if it is running on the bare hardware 2920 of device 2800 directly. In these instances, the same version of the guest operating system configured to execute on the bare hardware 2920 directly can also execute on VMM 2930 without modification or reconfiguration. In other words, VMM 2930 can provide full hardware and CPU virtualization to a guest operating system in some instances.

In other instances, a guest operating system can be specially designed or configured to execute on VMM 2930 for efficiency. In these instances, the guest operating system is "aware" that it executes on a virtual machine monitor. In other words, VMM 2930 can provide para-virtualization to a guest operating system in some instances.

The above-described basic computer hardware and software is presented for purpose of illustrating the basic underlying computer components that can be employed for implementing the example embodiment(s). The example embodiment(s), however, are not necessarily limited to any particular computing environment or computing device configuration. Instead, the example embodiment(s) can be implemented in any type of system architecture or processing environment that one skilled in the art, in light of this disclosure, would understand as capable of supporting the features and functions of the example embodiment(s) presented herein.

14.0 EXTENSIONS AND ALTERNATIVES

In the foregoing specification, the example embodiment(s) of the present invention have been described with reference to numerous specific details. However, the details can vary from implementation to implementation according to the requirements of the particular implement at hand. The example embodiment(s) are, accordingly, to be regarded in an illustrative rather than a restrictive sense.

The invention claimed is:

1. A method, comprising:
at a computing device comprising one or more processors and storage media storing one or more computer programs executed by the one or more processors to perform the method, performing operations comprising:
detecting creation or modification of a content item;
determining a content item namespace to which the content item belongs;
obtaining an identifier of a block server to which the content item namespace is assigned;
uploading any content item blocks of the content item to the block server that are not already stored at the block server;
determining a current client journal cursor value, the current client journal cursor value representing how up-to-date the content item namespace mounted at the computing device is with respect to any newer content item changes in the content item namespace that are committed to an online content management service and uploaded to the block server to which the content item namespace is assigned;
providing, to a server, the current client journal cursor value in association with an identifier of the content item namespace and an identifier of the block server to which the content item namespace is assigned;
receiving, from the server, a list of one or more server journal entries, each server journal entry in the list identifying one or more content item blocks of a content item represented by the server journal entry, each server journal entry in the list having a server journal cursor value that is greater than the current client journal cursor value of the computing device; and
for each server journal entry in the list of one or more server journal entries, downloading, from the block server, any content item blocks of the content item represented by the server journal entry that are not already stored at the computing device.

2. The method of claim 1, wherein the operation of detecting the content item comprises the operation of receiving a notification from an operating system of the computing device when a file in a file system corresponding to the content item is added or modified.

3. The method of claim 1, wherein the operation of determining the content item namespace to which the new content item belongs is based on a file system path to the content item in a file system of the computing device.

4. The method of claim 1, wherein the operation of obtaining the block server identifier comprises the operation of accessing a mapping stored at the computing device that associates each identifier of one or more identifiers of one or more content item namespaces mounted at the computing device with an identifier of a block server to which the identified content item namespace is assigned.

5. The method of claim 1, wherein the operations further comprise:
   determining a first list of one or more content item block hashes of one or more content item blocks that constitute the content item;
   providing the first list to a server;
   obtaining a second list from the server, the second list identifying one or more content item block hashes in the first list corresponding to one or more content item blocks that are not already stored at the block server; and
   uploading the one or more content item blocks that are not already stored at the block server.

6. The method of claim 1, wherein:
   the content item is a first content item;
   the block server is a first block server;
   the content item namespace is a first content item namespace;
   the operations further comprise:
      detecting creation or modification of a second content item that is not the first content item;
      determining a second content item namespace, that is not the first content item namespace, to which the second content item belongs;
      obtaining an identifier of a second block server, that is not the first block server, to which the second content item namespace is assigned; and
      uploading any content item blocks of the second content item that are not already stored at the second block server.

7. The method of claim 1, the operations further comprising resolving the identifier of the block server to a network address of the block server.

8. The method of claim 1, wherein the block server is connected to the same local area network as the computing device.

9. The method of claim 1, wherein the block server is operated by an online content management service.

10. A computing device, comprising:
    one or more processors; and
    storage media storing one or more computer programs comprising instructions configured for:
    detecting creation or modification of a content item;
    determining a content item namespace to which the content item belongs;
    obtaining an identifier of a block server to which the content item namespace is assigned;
    uploading any content item blocks of the content item to the block server that are not already stored at the block server;
    determining a current client journal cursor value, the current client journal cursor value representing how up-to-date the content item namespace mounted at the computing device is with respect to any newer content item changes in the content item namespace that are committed to an online content management service and uploaded to the block server to which the content item namespace is assigned;
    providing, to a server, the current client journal cursor value in association with an identifier of the content item namespace and an identifier of the block server to which the content item namespace is assigned;
    receiving, from the server, a list of one or more server journal entries, each server journal entry in the list identifying one or more content item blocks of a content item represented by the server journal entry, each server journal entry in the list having a server journal cursor value that is greater than the current client journal cursor value of the computing device; and
    for each server journal entry in the list of one or more server journal entries, downloading, from the block server, any content item blocks of the content item represented by the server journal entry that are not already stored at the computing device.

11. The computing device of claim 10, wherein the block server is operated by an online content management service.

12. The computing device of claim 10, wherein the instructions configured for detecting the content item comprise instructions configured for receiving a notification from an operating system of the computing device when a file in a file system corresponding to the content item is added or modified.

13. The computing device of claim 10, wherein the instructions configured for determining the content item namespace to which the new content item belongs is based on a file system path to the content item in a file system of the computing device.

14. The computing device of claim 10, wherein the instructions configured for obtaining the block server identifier comprise instructions configured for accessing a mapping stored at the computing device that associates each identifier of one or more identifiers of one or more content item namespaces mounted at the computing device with an identifier of a block server to which the identified content item namespace is assigned.

15. The computing device of claim 10, wherein the instructions are further configured for:
    determining a first list of one or more content item block hashes of one or more content item blocks that constitute the content item;
    providing the first list to a server;
    obtaining a second list from the server, the second list identifying one or more content item block hashes in the first list corresponding to one or more content item blocks that are not already stored at the block server; and
    uploading the one or more content item blocks that are not already stored at the block server.

16. The computing device of claim 10, wherein:
    the content item is a first content item;
    the block server is a first block server;
    the content item namespace is a first content item namespace;
    the instructions are further configured for:
       detecting creation or modification of a second content item that is not the first content item;
       determining a second content item namespace, that is not the first content item namespace, to which the second content item belongs;

obtaining an identifier of a second block server, that is not the first block server, to which the second content item namespace is assigned; and uploading any content item blocks of the second content item that are not already stored at the second block server.

17. The computing device of claim 10, the instructions are further configured for resolving the identifier of the block server to a network address of the block server.

18. The computing device of claim 10, wherein the block server is connected to the same local area network as the computing device.

* * * * *